US010863761B2

(12) United States Patent
Brown et al.

(10) Patent No.: US 10,863,761 B2
(45) Date of Patent: Dec. 15, 2020

(54) METHODS AND COMPOSITIONS FOR CONSUMABLES

(71) Applicant: Impossible Foods Inc., Redwood City, CA (US)

(72) Inventors: Patrick O'Reilly Brown, Stanford, CA (US); Marija Vrljic, San Mateo, CA (US); Ranjani Varadan, Fremont, CA (US); Michael Eisen, Berkeley, CA (US); Sergey Solomatin, Mountain View, CA (US)

(73) Assignee: Impossible Foods Inc., Redwood City, CA (US)

( * ) Notice: Subject to any disclaimer, the term of this patent is extended or adjusted under 35 U.S.C. 154(b) by 74 days.

(21) Appl. No.: 15/985,697

(22) Filed: May 21, 2018

(65) Prior Publication Data

US 2018/0368453 A1  Dec. 27, 2018

Related U.S. Application Data

(63) Continuation of application No. 13/941,211, filed on Jul. 12, 2013, now abandoned, which is a
(Continued)

(51) Int. Cl.
*A23L 27/26* (2016.01)
*A23L 13/40* (2016.01)
(Continued)

(52) U.S. Cl.
CPC ............... *A23L 27/26* (2016.08); *A23J 1/12* (2013.01); *A23J 1/14* (2013.01); *A23J 3/14* (2013.01);
(Continued)

(58) Field of Classification Search
CPC ...... A23J 1/12; A23J 1/14; A23J 3/227; A23L 27/00; A23L 27/20; A23L 33/185; A23L 27/26; A23L 13/424
See application file for complete search history.

(56) References Cited

U.S. PATENT DOCUMENTS 2,934,435 A    4/1960  May
2,934,436 A    4/1960  May
(Continued)

FOREIGN PATENT DOCUMENTS

CN    1252231 A    5/2000
CN    1301811 A    7/2001
(Continued)

OTHER PUBLICATIONS

Proulx et al., "Iron Bioavailability of Hemoglobin from Soy Root Nodules Using a Caco-2 Cell Culture Model". J. Agric. Food Chem. 54, pp. 1518-1522. (Year: 2006).*
(Continued)

*Primary Examiner* — Erik Kashnikow
*Assistant Examiner* — Assaf Zilbering
(74) *Attorney, Agent, or Firm* — Fish & Richardson P.C.

(57) ABSTRACT

Disclosed herein are improved methods and compositions which more accurately replicate the characteristics that consumers value in the preparation and consumption of meat and which overcome the shortcomings and drawbacks of current meat substitutes.

17 Claims, 11 Drawing Sheets

Specification includes a Sequence Listing.

Related U.S. Application Data continuation-in-part of application No. PCT/US2012/046560, filed on Jul. 12, 2012.

(60) Provisional application No. 61/671,069, filed on Jul. 12, 2012, provisional application No. 61/572,205, filed on Jul. 12, 2011.

(51) Int. Cl.
| | |
|---|---|
| *A23J 3/22* | (2006.01) |
| *A23J 1/12* | (2006.01) |
| *A23J 1/14* | (2006.01) |
| *A23J 3/14* | (2006.01) |
| *A23L 27/00* | (2016.01) |
| *A23L 27/10* | (2016.01) |
| *A23L 27/20* | (2016.01) |
| *A23L 33/185* | (2016.01) |

(52) U.S. Cl.
CPC ............. *A23J 3/227* (2013.01); *A23L 13/424* (2016.08); *A23L 13/426* (2016.08); *A23L 27/00* (2016.08); *A23L 27/10* (2016.08); *A23L 27/20* (2016.08); *A23L 33/185* (2016.08)

(56) References Cited

U.S. PATENT DOCUMENTS

| | | |
|---|---|---|
| 2,934,437 A | 4/1960 | Morton et al. |
| 2,955,041 A | 10/1960 | Broderick |
| 3,157,516 A | 11/1964 | Huber |
| 3,271,167 A | 9/1966 | Perret |
| 3,316,099 A | 4/1967 | Hoersch |
| 3,365,306 A | 1/1968 | Perret |
| 3,394,015 A | 7/1968 | Giacino et al. |
| 3,394,016 A | 7/1968 | Bidmead |
| 3,394,017 A | 7/1968 | Giacino et al. |
| 3,480,447 A | 11/1969 | Hack |
| 3,493,395 A | 2/1970 | Soeters |
| 3,519,437 A | 7/1970 | Giacino et al. |
| 3,524,747 A | 8/1970 | O'Hara |
| 3,532,514 A | 10/1970 | May |
| 3,532,515 A | 10/1970 | Broderick |
| 3,578,465 A | 5/1971 | van der Zijden |
| 3,615,600 A | 10/1971 | Zevenaar |
| 3,620,772 A | 11/1971 | Nagayoshi |
| 3,642,497 A | 2/1972 | Gunther |
| 3,645,753 A | 2/1972 | Gasser |
| 3,645,754 A | 2/1972 | Wiener |
| 3,658,550 A | 4/1972 | Hawley |
| 3,660,114 A | 5/1972 | Thomas |
| 3,689,289 A | 9/1972 | Perret |
| 3,693,533 A | 9/1972 | Liepa |
| 3,697,295 A | 10/1972 | van der Ouweland |
| 3,716,379 A | 2/1973 | de la Potterie |
| 3,716,380 A | 2/1973 | de la Potterie |
| 3,719,499 A | 3/1973 | Hai et al. |
| 3,741,775 A | 6/1973 | Lee |
| 3,761,287 A | 9/1973 | Jaeggi et al. |
| 3,804,953 A | 4/1974 | Bentz et al. |
| 3,829,582 A | 8/1974 | Guadagni et al. |
| 3,840,674 A | 10/1974 | Joseph et al. |
| 3,857,970 A | 12/1974 | Tsumura |
| 3,870,801 A | 3/1975 | Tombs |
| 3,879,561 A | 4/1975 | Smith et al. |
| 3,881,022 A | 4/1975 | Gasser |
| 3,928,643 A | 12/1975 | Ishiguro et al. |
| 3,930,046 A | 12/1975 | Baugher |
| 3,966,985 A | 6/1976 | Jonas |
| 3,973,043 A | 8/1976 | Lynn |
| 4,045,587 A | 8/1977 | Katz et al. |
| 4,066,793 A | 1/1978 | Eguchi |
| 4,076,852 A | 2/1978 | Van Delft et al. |
| 4,094,997 A | 6/1978 | Aishima et al. |
| 4,098,913 A | 7/1978 | Baugher |
| 4,132,809 A | 1/1979 | Desrosier |
| 4,161,550 A | 7/1979 | Bernhardt et al. |
| 4,165,391 A | 8/1979 | Corbett nee Rolison |
| 4,197,324 A | 4/1980 | Ziminski et al. |
| 4,218,487 A | 8/1980 | Jaeggi |
| 4,324,807 A | 4/1982 | Kim et al. |
| 4,411,915 A | 10/1983 | Eriksson |
| 4,435,438 A | 3/1984 | Lehnhardt et al. |
| 4,604,290 A | 8/1986 | Lee et al. |
| 4,678,676 A | 7/1987 | Ishizuka et al. |
| 4,994,285 A | 2/1991 | Hisano et al. |
| 5,039,543 A | 8/1991 | Lee et al. |
| 5,055,310 A | 10/1991 | Nonaka et al. |
| 5,264,239 A | 11/1993 | Cornet et al. |
| 5,443,852 A | 8/1995 | Shahidi et al. |
| 5,597,594 A | 1/1997 | Matsuura et al. |
| 5,650,554 A | 7/1997 | Moloney et al. |
| 5,753,295 A | 5/1998 | Goldman |
| 5,807,601 A | 9/1998 | Carpenter et al. |
| 5,856,452 A | 1/1999 | Moloney et al. |
| 5,922,392 A | 7/1999 | Kelly et al. |
| 6,093,424 A | 7/2000 | Han et al. |
| 6,146,645 A | 11/2000 | Deckers et al. |
| 6,183,762 B1 | 2/2001 | Deckers et al. |
| 6,210,742 B1 | 4/2001 | Deckers et al. |
| 6,228,418 B1 | 5/2001 | Gluck |
| 6,242,036 B1 | 6/2001 | Han et al. |
| 6,287,620 B1 | 9/2001 | Van Den Ouweland et al. |
| 6,372,234 B1 | 4/2002 | Deckers et al. |
| 6,372,961 B1 | 4/2002 | Tarczynski |
| 6,379,738 B1 | 4/2002 | Dingman et al. |
| 6,383,531 B1 | 5/2002 | Gottemoller |
| 6,399,135 B2 | 6/2002 | Gottemoller |
| 6,413,569 B1 | 7/2002 | Borders et al. |
| 6,416,797 B1 | 7/2002 | Han et al. |
| 6,420,148 B2 | 7/2002 | Yamaguchi |
| 6,495,184 B1 | 12/2002 | Zheng et al. |
| 6,495,187 B1 | 12/2002 | Borders et al. |
| 6,509,453 B1 | 1/2003 | Moloney |
| 6,582,710 B2 | 6/2003 | Deckers et al. |
| 6,596,287 B2 | 7/2003 | Deckers et al. |
| 6,599,513 B2 | 7/2003 | Deckers et al. |
| 6,692,788 B1 | 2/2004 | Mottram et al. |
| 6,761,914 B2 | 7/2004 | Deckers et al. |
| 6,908,634 B2 | 6/2005 | Hwang |
| 6,936,749 B1 | 8/2005 | Guy et al. |
| 7,052,879 B2 | 5/2006 | Shaw et al. |
| 7,332,587 B2 | 2/2008 | Moloney |
| 7,407,786 B2 | 8/2008 | Giver et al. |
| 7,479,472 B1 | 1/2009 | Harbury et al. |
| 7,585,645 B2 | 9/2009 | Deckers et al. |
| 7,622,290 B2 | 11/2009 | Brunstedt et al. |
| 7,666,618 B2 | 2/2010 | Miasnikov et al. |
| 7,666,628 B2 | 2/2010 | Moloney |
| 7,674,953 B2 | 3/2010 | Mulet Salort et al. |
| 7,709,044 B2 | 5/2010 | Ishimoto |
| 7,807,870 B2 | 10/2010 | Geigenberger et al. |
| 7,931,925 B2 | 4/2011 | Nielsen |
| 8,012,732 B2 | 9/2011 | Brunstedt et al. |
| 8,021,695 B2 | 9/2011 | Gruber et al. |
| 8,188,415 B2 | 5/2012 | Kats et al. |
| 8,304,522 B2 | 11/2012 | Kungitani |
| 8,597,694 B2 | 12/2013 | Guth et al. |
| 9,011,949 B2 | 4/2015 | Brown et al. |
| 9,700,067 B2 | 7/2017 | Fraser |
| 9,808,029 B2 | 11/2017 | Fraser et al. |
| 9,826,772 B2 | 11/2017 | Fraser et al. |
| 9,943,096 B2 | 4/2018 | Fraser et al. |
| 10,039,306 B2 | 8/2018 | Vrljic et al. |
| 10,172,380 B2 | 1/2019 | Varadan et al. |
| 10,172,381 B2 | 1/2019 | Vrljic et al. |
| 2001/0024677 A1 | 9/2001 | Bringe |
| 2001/0049132 A1 | 12/2001 | Kringelum et al. |
| 2002/0034570 A1 | 3/2002 | Krammer et al. |
| 2003/0198700 A1 | 10/2003 | Gruber |
| 2003/0212281 A1 | 11/2003 | Sinha et al. |
| 2003/0224476 A1 | 12/2003 | Chou |
| 2004/0151778 A1 | 8/2004 | Richard et al. |
| 2004/0161513 A1 | 8/2004 | Akashe et al. |

(56) References Cited

U.S. PATENT DOCUMENTS

| | | |
|---|---|---|
| 2005/0037111 A1 | 2/2005 | Berry |
| 2005/0112271 A1 * | 5/2005 | Pickarski ............... A23J 3/227 426/656 |
| 2006/0035003 A1 | 2/2006 | McMindes et al. |
| 2006/0035006 A1 | 2/2006 | McMindes et al. |
| 2006/0204644 A1 | 9/2006 | Cavallini et al. |
| 2006/0233721 A1 | 10/2006 | Tamarkin et al. |
| 2007/0269567 A1 | 11/2007 | McMindes et al. |
| 2007/0269571 A1 | 11/2007 | Akita et al. |
| 2007/0269583 A1 | 11/2007 | McMindes et al. |
| 2008/0026128 A1 | 1/2008 | Yamaguchi |
| 2008/0226810 A1 | 9/2008 | Passe et al. |
| 2008/0254168 A1 | 10/2008 | Mueller et al. |
| 2008/0254199 A1 | 10/2008 | Orcutt et al. |
| 2008/0268112 A1 | 10/2008 | Rolan et al. |
| 2008/0292749 A1 | 11/2008 | Goodwins et al. |
| 2008/0299254 A1 | 12/2008 | Kim et al. |
| 2009/0264520 A1 | 10/2009 | Bhagat et al. |
| 2009/0274817 A1 | 11/2009 | Yamaguchi et al. |
| 2010/0074998 A1 | 3/2010 | Vega et al. |
| 2010/0136201 A1 | 6/2010 | Bigeard et al. |
| 2010/0196575 A1 | 8/2010 | Sanchez |
| 2010/0233347 A1 | 9/2010 | Uhrhan |
| 2010/0249560 A1 | 9/2010 | Levinson et al. |
| 2010/0281765 A1 | 11/2010 | Schwartz |
| 2010/0310738 A1 | 12/2010 | Ludwig |
| 2010/0311950 A1 | 12/2010 | Kugitani |
| 2011/0008502 A1 | 1/2011 | Hosomi et al. |
| 2011/0064862 A1 | 3/2011 | McCready et al. |
| 2011/0081386 A1 | 4/2011 | Guth et al. |
| 2011/0081435 A1 | 4/2011 | Guth et al. |
| 2011/0117180 A1 | 5/2011 | Yan et al. |
| 2011/0286992 A1 | 11/2011 | Gruber et al. |
| 2011/0287467 A1 | 11/2011 | Crane et al. |
| 2011/0288389 A9 | 11/2011 | Levinson et al. |
| 2012/0059150 A1 | 3/2012 | Moloney et al. |
| 2012/0093994 A1 | 4/2012 | Hsieh et al. |
| 2013/0004617 A1 | 1/2013 | Zhang et al. |
| 2014/0011347 A1 | 1/2014 | Yerushalmi et al. |
| 2014/0220217 A1 | 8/2014 | Brown et al. |
| 2015/0289541 A1 | 10/2015 | Brown et al. |
| 2015/0296834 A1 | 10/2015 | Geistlinger et al. |
| 2015/0296835 A1 | 10/2015 | Anderson et al. |
| 2015/0366233 A1 | 12/2015 | Brown et al. |
| 2016/0305361 A1 | 10/2016 | Akita |
| 2017/0105438 A1 | 4/2017 | Ajami et al. |
| 2017/0172169 A1 | 6/2017 | Grzanich |
| 2017/0188612 A1 | 7/2017 | Varadan et al. |
| 2017/0321204 A1 | 11/2017 | Kale et al. |
| 2018/0027851 A1 | 2/2018 | Vrljic et al. |
| 2018/0168209 A1 | 6/2018 | Fraser et al. |
| 2018/0192680 A1 | 7/2018 | Fraser et al. |
| 2018/0199605 A1 | 7/2018 | Fraser et al. |
| 2018/0199606 A1 | 7/2018 | Fraser et al. |
| 2019/0008192 A1 | 1/2019 | Brown et al. |
| 2019/0116855 A1 | 4/2019 | Vrljic et al. |
| 2019/0133162 A1 | 5/2019 | Varadan et al. |
| 2019/0133163 A1 | 5/2019 | Varadan et al. |
| 2019/0200658 A1 | 7/2019 | Vrljic et al. |

FOREIGN PATENT DOCUMENTS

| | | | | |
|---|---|---|---|---|
| CN | 1407108 A | 4/2003 | | |
| CN | 1466903 | 1/2004 | | |
| CN | 1557188 | 12/2004 | | |
| CN | 1593223 A | 3/2005 | | |
| CN | 1634524 A | 7/2005 | | |
| CN | 101138405 | 3/2008 | | |
| CN | 101156632 | 4/2008 | | |
| CN | 101489422 | 7/2009 | | |
| CN | 101541187 A | 9/2009 | | |
| CN | 101606574 A | 12/2009 | | |
| CN | 101861895 | 10/2010 | | |
| CN | 101897418 | 12/2010 | | |
| CN | 102440302 | 5/2012 | | |
| CN | 102578544 | 7/2012 | | |
| CN | 102835460 | 12/2012 | | |
| DE | 102007061256 | 6/2009 | | |
| DE | 202011002097 | 3/2011 | | |
| EP | 0136428 | 4/1985 | | |
| EP | 0500132 | 8/1992 | | |
| EP | 0815736 | 1/1998 | | |
| EP | 1166653 | 1/2002 | | |
| EP | 1254601 | 11/2002 | | |
| EP | 0680751 | 11/2004 | | |
| EP | 1529444 | 5/2005 | | |
| EP | 1759593 | 3/2007 | | |
| EP | 1759593 A1 * | 3/2007 | ................ | A23J 3/10 |
| EP | 1361264 | 4/2007 | | |
| EP | 1952695 | 8/2008 | | |
| EP | 2138052 | 12/2009 | | |
| EP | 2943072 | 11/2015 | | |
| GB | 836694 | 6/1960 | | |
| GB | 858333 | 1/1961 | | |
| GB | 858660 | 1/1961 | | |
| GB | 1032334 | 6/1966 | | |
| GB | 1069104 | 5/1967 | | |
| GB | 1076948 | 7/1967 | | |
| GB | 1082504 | 9/1967 | | |
| GB | 1084619 | 9/1967 | | |
| GB | 1099711 | 1/1968 | | |
| GB | 1115610 | 5/1968 | | |
| GB | 1126889 | 9/1968 | | |
| GB | 1130631 | 10/1968 | | |
| GB | 1135123 | 11/1968 | | |
| GB | 1146337 | 3/1969 | | |
| GB | 1148449 | 4/1969 | | |
| GB | 1182976 | 3/1970 | | |
| GB | 1198398 | 7/1970 | | |
| GB | 1205882 | 9/1970 | | |
| GB | 1206265 | 9/1970 | | |
| GB | 1221482 | 2/1971 | | |
| GB | 1224989 | 3/1971 | | |
| GB | 1232719 | 5/1971 | | |
| GB | 1234927 | 6/1971 | | |
| GB | 1256462 | 12/1971 | | |
| GB | 1283913 | 8/1972 | | |
| GB | 1284357 | 8/1972 | | |
| GB | 1302525 | 1/1973 | | |
| GB | 1311638 | 3/1973 | | |
| GB | 1313830 | 4/1973 | | |
| GB | 1318460 | 5/1973 | | |
| GB | 1325335 | 8/1973 | | |
| GB | 1357091 | 6/1974 | | |
| GB | 1364747 | 8/1974 | | |
| GB | 1382335 | 1/1975 | | |
| GB | 1384332 | 2/1975 | | |
| GB | 1447730 | 8/1976 | | |
| GB | 1471907 | 4/1977 | | |
| GB | 1515961 | 6/1978 | | |
| GB | 1515962 | 6/1978 | | |
| GB | 1525541 | 9/1978 | | |
| GB | 2016255 | 9/1979 | | |
| JP | S42-22194 | 10/1942 | | |
| JP | S49-39824 | 10/1974 | | |
| JP | S51-63971 | 10/1975 | | |
| JP | 52156962 | 12/1977 | | |
| JP | S53115846 | 10/1978 | | |
| JP | S54122766 | 9/1979 | | |
| JP | S5959151 | 4/1984 | | |
| JP | S6283842 | 4/1987 | | |
| JP | H08140627 | 6/1996 | | |
| JP | H08173024 | 7/1996 | | |
| JP | H08289761 | 11/1996 | | |
| JP | H0970272 | 3/1997 | | |
| JP | H11-508448 | 7/1999 | | |
| JP | 2001/037434 | 2/2001 | | |
| JP | 2001/061415 | 3/2001 | | |
| JP | 2001/346533 | 12/2001 | | |
| JP | 2002/101835 | 4/2002 | | |
| JP | 2005/021163 | 1/2005 | | |
| JP | 2005/530483 | 10/2005 | | |
| JP | 2009-516522 | 4/2009 | | |

(56) References Cited

FOREIGN PATENT DOCUMENTS

| | | |
|---|---|---|
| JP | 2009/171877 | 8/2009 |
| JP | 2009/284893 | 12/2009 |
| JP | 2010/512788 | 4/2010 |
| JP | 2010-523125 | 7/2010 |
| JP | 2011/000073 | 1/2011 |
| JP | 2012/016336 | 1/2012 |
| JP | 2013-192528 | 9/2013 |
| JP | 2014/113112 | 6/2014 |
| KR | 10-2009-0009990 | 1/2009 |
| RU | 2144293 | 1/2000 |
| RU | 2010137628 | 3/2012 |
| SU | 291395 | 6/1971 |
| SU | 301014 | 1/1974 |
| WO | WO 1993/025697 | 12/1993 |
| WO | WO 1994/017673 | 8/1994 |
| WO | WO 1996/017981 | 6/1996 |
| WO | WO 1997/01961 | 1/1997 |
| WO | WO 1998/012913 | 4/1998 |
| WO | WO 1998/053698 | 12/1998 |
| WO | WO 2001/022829 | 4/2001 |
| WO | WO 2001/022830 | 4/2001 |
| WO | WO 2003/070172 | 8/2003 |
| WO | WO 2004/113543 | 12/2004 |
| WO | WO 2005/013713 | 2/2005 |
| WO | WO 2005/046354 | 5/2005 |
| WO | WO 2005/097059 | 10/2005 |
| WO | WO 2006/042608 | 4/2006 |
| WO | WO 2007/060288 | 5/2007 |
| WO | WO 2007/115899 | 10/2007 |
| WO | WO 2007/137125 | 11/2007 |
| WO | WO 2007/137128 | 11/2007 |
| WO | WO 2007/118751 | 12/2007 |
| WO | WO 2008/017499 | 2/2008 |
| WO | WO 2008/030089 | 3/2008 |
| WO | WO 2008/083117 | 7/2008 |
| WO | WO 2009/060678 | 5/2009 |
| WO | WO 2010/101625 | 9/2010 |
| WO | WO 2012/106751 | 8/2012 |
| WO | WO 2012/110797 | 8/2012 |
| WO | WO 2012/116703 | 9/2012 |
| WO | WO 2010/110493 | 10/2012 |
| WO | WO 2012/157544 | 11/2012 |
| WO | WO 2013/010037 | 1/2013 |
| WO | WO 2013/010042 | 1/2013 |
| WO | WO 2013/013292 | 1/2013 |
| WO | WO 2013/138793 | 9/2013 |
| WO | WO 2014/110532 | 7/2014 |
| WO | WO 2014/110540 | 7/2014 |
| WO | WO 2015/127388 | 8/2015 |

OTHER PUBLICATIONS

Brewer, "The Chemistry of Beef Flavor—Executive Summary". Available online at http://beefresearch.org/CMDocs/BeefResearch/The%20Chemistry%20of%20Beef%20Flavor.pdf (Year: 2006).*
Asgar et al., "Nonmeat Protein Alternatives as Meat Extenders and Meat Analogs". Comprehensive Reviews in Food Science and Food Safety vol. 9. (Year: 2010).*
Analysis of soy hydrolysate, Avomen Analytical Services Laboratory Test Results, Jul. 25, 2019.
Biede, et al., "Swiss cheese flavor: I. chemical analysis," Journal of Dairy Science, 1979, 62:227-237.
Declaration of Dr. Jorge Ruiz-Carrascal, dated Jul. 29, 2019, 72 pages.
EP Opposition Letter from Opponent in EP Appln. No. 14737766.7 dated Aug. 6, 2019, 55 pages.
Estevez, et al., "Analysis of volatiles in meat from Iberian pigs and lean pigs after refrigeration and cooking by using SPME-GC-MS," Journal of Agricultural and Food Chemistry, 2003, 51:3429-3435.
Friedman and Brandon, "Nutritional and health benefits of soy proteins," J. Agric. Food Chem., 2001, 49(3):1069-1086.
Ibrahim, et al., "Mechanism of the CO-sensing heme protein CooA: new insights from the truncated heme domain and UVRR spectroscopy, Journal of Inorganic Biochemistry," 2007, 101:1776-1785.
Kendrick and Watts, "Acceleration of inhibition of lipid oxidation by heme compounds," Lipids, 1969, 4:454-458.
Mahajan, et al., "Aroma compounds in sweet whey powder," Journal of Dairy Science, 2004, 87:4057-4063.
Meisinger, et al., Flavor relationships among muscles from the beef chuck and round, Journal of Animal Science, 2006, 84:2826-2833.
Singh, et al., "Functional and edible uses of soy protein products," Comp. Rev. Food Sci. Food Safety, 2008, 7:14-28.
Vaghefi, et al., "Influence of the extent of hemoglobin hydrolysis on the digestive absorption of heme iron. An in vitro study," Journal of Agricultural and Food Chemistry, 2002, 50:4969-4973.
Yeast Metabolom Database, "Heme (YMDB0041)," (http://www.ymdb.ca/compounds/YMDB00041).
Young and Pellett, "Plant proteins in relation to human protein and amino acid nutrition," Am. J. Clin. Nutr., 1994, 59(Suppl):1203S-1212S.
"Heterologous," Merriam-Webster Dictionary, retrieved on Sep. 10, 2015, http://www.merriam-webster.com/dictionary/heterologous, 1 page.
"Rethink Meat," Presented at the 6th Annual Sustainable Innovation Forum, Paris, France, Dec. 7-8, 2015, retrieved on Feb. 1, 2016, https://amp.twimg.com/v/7c7f7084-b173-42cb-bc12-723f35994dff, 1 page (Video Submission).
"Silicon Valley gets a taste for food," The Economist Technology Quarterly, Mar. 7, 2015, http://cdn.static-economist.com/sites/default/files/sponsorships/accenture_tq_march2015/20150307_tq_mailout.pdf, pp. 11-13.
"Veggie burgers that look, taste, and bleed like real meat," CBS News, Aug. 9, 2016, retrieved Aug. 25, 2016 <http://www.cbsnews.com/news/food-trend-veggie-burgers-that-look-bleed-taste-like-real-meat/>, 4 pages.
"Watch Momofuku Cook Impossible Foods' Plant-Based Burger that 'Bleeds'," Vice, Jul. 27, 2016, retrieved Aug. 25, 2016, <https://munchies.vice.com/en/videos/watch-momofuku-cook-impossible-foods-plant-based-burger-that-bleeds>, 3 pages.
[No Author Listed] Impossible Foods Inc. "GRAS Notification for Soybean Leghemoglobin Protein Derived from Pichia Pastoris." GRAS notice 000737, Retrieved from internet <<URL:https://www.fda.gov/downloads/Food/IngredientsPackagingLabeling/GRAS/NoticeInventory/default.htmf>, 1063 pages (Oct. 2, 2017).
"Acidified Milk Products and Protein Stabilisation," Herbstreith & Fox, retrieved on Mar. 3, 2014, http://www.herbstreith-fox.de/en/informative-literature/informative-literature-from-rd-and-tech-application.html, 15 pages.
"Ice Cream and Ice Cream Desserts," Herbstreith & Fox, retrieved on Mar. 3, 2014, http://www.herbstreith-fox.de/en/informative-literature/informative-literature-from-rd-and-tech-application.html, 5 pages.
"Innovation at Its Best: 5 Years of Food Valley Awards," Food Valley, retrieved on Mar. 7, 2014, http://www.foodvalley.nl/English/Afbeeldingen/FVAjubileumuitgave/Innovation%20at%20Its%20Best%20-%205%20Years%20of%20Food%20Valley%20Awards.pdf, 51 pages.
"Low Methylester Amidated Pectins," Herbstreith & Fox, retrieved on Mar. 3, 2014, http://www.herbstreith-fox.de/en/informative-literature/informative-literature-from-rd-and-tech-application.html, 13 pages.
"Stabilisation of Whey and Whey Mix Products with Pectin," Herbstreith & Fox, retrieved on Mar. 3, 2014, http://www.herbstreith-fox.de/en/informative-literature/informative-literature-from-rd-and-tech-application.html, 6 Pages.
"Texturising of Fermented Milk Products," Herbstreith & Fox, retrieved on Mar. 3, 2014, http://www.herbstreith-fox.de/en/informative-literature/informative-literature-from-rd-and-tech-application.html, 6 pages.
Alemán et al., "Oxidative stability of a heme iron-fortified bakery product: Effectiveness of ascorbyl palmitate and co-spray-drying of heme iron with calcium caseinate," Food Chemistry, 2016, 196:567-576.

(56) References Cited

OTHER PUBLICATIONS

Asgar et al., "Nonmeat Protein Alternatives as Meat Extenders and Meat Analogs," Comprehensive Reviews in Food Science and Food Safety, 2010, 9:513-529.
Aubrey, "Food For Thought: Saving The Planet, One Burger At A Time: This Juicy Patty Is Meat-Free," The Salt, Feb. 11, 2017, retrieved on Feb. 14, 2017, retrieved from <http://www.npr.org/sections/thesalt/2017/02/11/514544431/saving-the-planet-one-burger-at-a-time-this-juicy-patty-is-meat-free>, 14 pages.
Australian Patent Examination Report No. 1 in Australian Application No. 2012281064, dated Jan. 25, 2016, 5 pages.
Australian Patent Examination Report No. 1 in Australian Application No. 2012281069, dated Sep. 25, 2015, 5 pages.
Baek, "Process Flavors," Handbook of Meat, Poultry and Seafood Quality, Second Edition, 2012, Chapter 7, 91-104.
Baohua, "Animal products processing,", China agricultural science and technology press, 2008, pp. 224-222, English Translation.
Bastide et al., "Heme iron from meat and risk of colorectal cancer: a meta-analysis and a review of the mechanisms involved.", Cancer Prev Res; 4(2); 177-84, 2011.
Bastide et al., "Heme Iron from Meat and Risk of Colorectal Cancer: A Meta-analysis and a Review of the Mechanisms Involved," Cancer Prevention Research, 2011, vol. 4, pp. 177-184.
Battaglia et al., "The Enigmatic LEA Proteins and Other HydroPhilins1[W]," Plant Physiology, Sep. 2008, 148:6-24.
Belitz et al., "Aroma Compounds," Food Chemistry, Springer 2009, pp. 340-402.
Belitz et al., Food Chemistry, 3rd revised edition. Springer-Verlag, Berlin (2006), p. 368.
Beuchat et al., "Fermentation of Peanut Milk with Lactobacillus bulgaricus and L. acidophilus," J. Food Sci, 1978, 43:1109-1112.
Beyond Better Order page and Nutritional Facts, retrieved on Feb. 6, 2014, http://www.beyond-better.com/order.html, 8 pages.
Beyond Meat, posted on or before Feb. 24, 2001, accessed Jan. 7, 2014, http://beyondmeat.com/, 2 pages.
Boca Bruschetta Tomato Basil Parmesan Veggie Patties Package Ingredients, posted on or before Jul. 22, 2008, accessed on Jan. 7, 2014, http://www.bocaburger.com/products/nutrition-info.aspx?product=5928360103, 1 page.
Boca Flame Grilled Meatless Burgers Package Ingredients, posted on or before Jul. 14, 2008, accessed on Jan. 7, 2014, http://www.bocaburger.com/products/nutrition-info.aspx?product=5928367321, 1 page.
Boca Original Meatless Chik'n Nuggets Package Ingredients, posted on or beforeJul. 22, 2008, accessed Jan. 7, 2014, http://www.bocaburger.com/products/nutrition-info.aspx?product=5928360012, 1 page.
Boca Original Vegan Meatless Burgers Package Ingredients, posted on or before Jul. 14, 2008, accessed Jan. 7, 2014, http://www.bocaburger.com/products/nutrition-info.aspx?product=5928333445, 1 page.
Boral and Bohidar , "Effect Of Ionic Strength On Surface-Selective Patch Binding-Induced Phase Separation And Coacervation In Similarly Charged Gelatin-Agar Molecular Systems," Journal of Physical Chemistry B, 2010, 114(37): 12027-35.
Bradshaw, "Food 2.0: the future of what we eat," FT Magazine, Oct. 31, 2014, retrieved on Nov. 11, 2014, http://www.ft.com/cms/s/2/bfa6fca0-5fbb-11e4-8c27-00144feabdc0.html#axzz3InGaCldL, 6 pages.
Brewer, "The Chemistry of Beef Flavor," Dec. 2006, retrieved on Aug. 30, 2016, <http://beefresearch.org/CMDocs/BeefResearch/The%20Chemistry%20of%20Beef%20Flavor.pdf>, 16 pages.
Brooks et al., "Prediction of beef flavor by precursor and volatile compounds Principal Investigators: Funded by The Beef Checkoff," Texas Tech University, May 31, 2012, retrieved Aug. 30, 2016, <http://www.beefresearch.org/CMDocs/BeefResearch/PE_Project_Summaries_FY11Prediction_of_beef_flavor.pdf>.
Brown et al., "The structure and function of mammalian and plant globins," International Review of Scientific Synthesis, Sep. 2013, 2014, 21 pages.
Bunge et al., "Quest Heats up for Alternatives to Beef," The Wall Street Journal, Business News, Nov. 4, 2016, p. B5.
Burdock, "Fenaroli's handbook of flavor ingredients," CRC press, 17 pages (2016).
Bute Island Foods, "Sheese," posted on or before Dec. 5, 2006, retrieved on Feb. 6, 2014, http://www.buteisland.com/a_sheese_home.htm, 2 pages.
Cadwallader and Macleod, "16 Instrumental methods for analyzing the flavor of muscle foods," Flavor of Meat, Meat Products and Seafoods, 18 pages (1998).
Calkins et al., "A fresh look at meat flavor," Meat Science, 77(1):63-80 (2007).
Carlsen et al., "Heme-iron in lipid oxidation," Coordination Chemistry Review, 2005, 249:485-498.
Cerny et al., "Formation of Aroma Compounds from Ribose and Cysteine during the Maillard Reaction," J. Agric. Food Chem., 2003, 51, pp. 2714-2721.
Chamlee, "Why Do People Want Veggie Burgers That Bleed?," Eater, Jul. 25, 2016, retrieved Aug. 25, 2016, <http://www.eater.com/2016/7/25/12270698/lab-grown-meat-beyond-burger-impossible-foods>, 11 pages.
Chau, "Uncanny Patty," The Ringer, Feb. 27, 2017, retrieved on Feb. 28, 2017, retrieved from <https://theringer.com/impossible-burger-last-meal-on-earth-week-food-f9f14acdb99d#.vocb2hi6e>, 19 pages.
Chaudhari et al., "The cell biology of taste," 190(3):285-296 (Aug. 2010).
Chen et al., "Effect of Urea on Volatile Generation from Maillard Reaction of Cysteine and Ribose," J. Agric. Food Chem., 48:3512-3516 (2000).
Chen et al., "Influence of DNA on Volatile Generation from Maillard Reaction of Cysteine and Ribose," Nutraceutical Beverages, American Chemical Society, pp. 427-442 (Dec. 2003).
Chicago Vegan Foods, accessed on Jan. 7, 2014, http://chicagoveganfoods.com/products/teese-vegan-cheese/, 8 pages.
Christlbauer et al., "Characterization of the Key Aroma Compounds in Beef and Pork Vegetable Gravies á la Chef by Application of the Aroma Extract Dilution Analysis," J. Agric. Food Chem., 2009, 57:9114-9122.
Clare et al., "Effects of Transglutaminase Catalysis on the Functional and Immunoglobulin Binding Properties of Peanut Flour Dispersions Containing Casein," J. Agric. Food Chem., 2008, 56(22):10913-10921.
Connelly and Piper, "Person of the Year: Tal Ronnen," VegNews, Nov./Dec. 2013, 29-32.
Cott et al., "The 'Impossible' Veggie Burger: A Tech Industry Answer to the Big Mac," Business Day, Jan. 13, 2017, retrieved on Jan. 17, 2017, <https://mobile.nytimes.com/2017/01/13/business/veggie-burger-impossible-burger.html?referer=http://www.drudgereport.com/>, 7 pages.
Cross et al., "Developing a heme iron database for meats according to meat type, cooking method and doneness level", Food Nutr Sci., 3(7): 905-913, 2012.
Dai, "David Chang Adds Plant Based 'Impossible Burger' to Nishi Menu," Jul. 26, 2016, retrieved Jul. 27, 2016 <http://ny.eater.com/2016/7/26/12277310/david-chang-impossible-burger-nishi>, 6 pages.
Daiya, Deliciously Dairy Free, "Say Cheese, Dairy-Free cheesy deliciousness," posted on or before Jan. 26, 2010, accessed Jan. 7, 2014, http://www.daiyafoods.com, 6 pages.
Datar, I. et al., "Possibilities for an in vitro meat production system" Innovative Food Science and Emerging Technologies, vol. 11, 13-22, 2010.
Davis et al., "Some Rheological Properties of Aqueous Peanut Flour Dispersions," J. Texture Studies, 2007, 38:253-272.
Deliciously Healthy Nacheez, Products and Nutrition Facts, posted on or before Jan. 23, 2011, retrieved on Feb. 7, 2014, http://nacheez.com/, 9 pages.
Dixie Diner's Club, Cheese (Not!) Sauce Nutrition Facts, posted on or before Sep. 3, 2009, retrieved on Feb. 7, 2014, http://www.dixiediner.com/cheese-notA™-sauce-regular-cheese-p-69.html, 2 pages.
D'Onfro, "I tried the plant-based meat that Google wanted to buy and I never want to eat a 'real' hamburger again" Business Insider,

(56) References Cited

OTHER PUBLICATIONS

Jun. 12, 2016, retrieved Jun. 14, 2016, <http://www.businessinsider.com/impossible-burgers-taste-test-2016-6>, 14 pages.
Donnelly, "Meet the Impossible Burger: It Looks and Tastes Like the Real Thing But Is Totally Meat-Free," Vogue, Aug. 1, 2016, retrieved Aug. 25, 2016 <http://www.vogue.com/13462891/impossible-burger-meat-free-vegan-david-chang/>, 6 pages.
Door 86 Vegan Cheese, Discover a New World of Vegan Cheese and Menu, posted on or before Dec. 5, 2013, retrieved Feb. 7, 2014, http://door86vegancheese.wix.com/door-86-vegan-cheese#, 14 pages.
Dr. Cow, Natural Living & Organic Foods, "Aged Cashew & Brazil Nut Cheese," posted on or before Sep. 22, 2008, accessed Feb. 7, 2014, http://www.dr-cow.com/products/aged-cashew-brazil.html, 1 page.
Dr. Cow, Natural Living & Organic Foods, "Aged Cashew & Crystal Algae Cheese," posted on or before Sep. 22, 2008, accessed Feb. 7, 2014, http://www.dr-cow.com/products/aged-cashew-crystal.html, 1 page.
Dr. Cow, Natural Living & Organic Foods, "Aged Cashew & Dulse Cheese," posted on or before Sep. 22, 2008, accessed Feb. 7, 2014, http://www.dr-cow.com/products/aged-cashew-dulse.html, 1 page.
Dr. Cow, Natural Living & Organic Foods, "Aged Cashew & Hemp Seeds Cheese," posted on or before Sep. 22, 2008, accessed Feb. 7, 2014, http://www.dr-cow.com/products/aged-cashew-hemp.html, 1 page.
Dr. Cow, Natural Living & Organic Foods, "Aged Cashew Nut Cheese," posted on or before Sep. 22, 2008, accessed Feb. 7, 2014, http://www.dr-cow.com/products/aged-cashew-nut-cheese.html, 1 page.
Dr. Cow, Natural Living & Organic Foods, "Aged Macadamia & Hemp Seeds Cheese," posted on or before Sep. 22, 2008, accessed Feb. 7, 2014, http://www.dr-cow.com/products/aged-macadam-hemp.html, 1 page.
Dr. Cow, Natural Living & Organic Foods, "Aged Macadamia Nut Cheese," posted on or before Sep. 22, 2008, accessed Feb. 7, 2014, http://www.dr-cow.com/products/aged-macadam-nut-cheese.html, 1 page.
Dr. Cow, Natural Living & Organic Foods, "Cashew Nut Cream Cheese," posted on or before Sep. 22, 2008, accessed Jan. 7, 2014, http://www.dr-cow.com/products/cashew-nut-cream-cheese.html, 1 page.
Duane, "Engineering the Future of Artisanal Vegan Cheese," Food & Wine, Nov. 2013, http://www.foodandwine.com/articles/engineering-the-future-of-artisanal-vegan-cheese, 5 pages.
DuFosse et al., "Importance of lactones in food flavours," Sciences Des Aliments, 14:17-25 (1994).
Dwivedi, Basant K. et al., "Meat flavor" Critical Reviews in Food Science & Nutrition, vol. 5, 487-535, 1975.
Edris et al., "Application of headspace-solid-phase microextraction and HPLC for the analysis of the aroma volatile components of treacle and determination of its content of 5-hydroxymethylfurfural (HMF)", Food Chemistry vol. 104, Issue 3, pp. 1310-1314, 2007.
Elise, "Classic Meatloaf Recipe," Simply Recipes, 2009, https://www.simplyrecipes.com/recipes/classic_meatloaf/, downloaded Nov. 22, 2017, 11 pages.
Ellfolk, Nils, "Crystalline Leghemoglobin" ACTA Chemica Scandinavica, vol. 15, 545-554, 1961.
Ellis et al., "Structure of ferric soybean leghemoglobin a nicotinate at 2.3 A resolution," Acta Crystallographica, May 1997, Section D, 53(3):302-310.
Elmore et al., "Effect of the Polyunsaturated Fatty Acid Composition of Beef Muscle on the Profile of Aroma Volatiles," J. Agric. Food Chem. 47:1619-1625 (1999).
Elzerman et al., Exploring meat substitutes: consumer 2013 experiences and contextual factors: British Food Journal, vol. 115 Issue: 5, pp. 700-710, 705, 2013.
EPO Opposition, "Proprietor's observations and amendments under Rule 79(1) EPC," Feb. 27, 2019, 50 pages.
Etienne, "Eating the plant-derived Impossible Burger cooked by Momofuku's David Chang," Tech Crunch, Jul. 26, 2016, retrieved Aug. 25, 2016, <https://techcrunch.com/2016/07/26/eating-the-plant-derived-impossible-burger-cooked-by-momofukus-david-chang/>, 9 pages.
European Search Report (Supplementary) in European Application No. 12810661.4, dated Mar. 12, 2015, 14 pages.
European Search Report (Supplementary) in European Application No. 12811683.7, dated Mar. 12, 2015, 9 pages.
European Search Report for International Application No. EP 14737766, dated Jul. 15, 2016, 11 pages.
European Search Report for International Application No. EP 17210528, dated May 14, 2018, 10 pages.
Fang et al., "Food Nutrition health theory and technology," China light industry press, p. 448, Jan. 31, 1997 (English Translation).
Fantastic World Foods, "Fantastic Foods Nature's Burger (Meatless Burger Mix)," posted on or before Jan. 6, 2009, accessed on Jan. 7, 2014, http://fantasticfoods.elsstore.com/view/product/?id=8715&cid=1967, 2 pages.
Felt, "Raw Vegan Almond Ricotta Cheese," FeedYourSkull, Mar. 12, 2012, https://feedyourskull.com/2012/03/12/raw-vegan-almond-ricotta-cheese/, 15 pages.
Fengyi et al., "Soybean protein production and application,", China light industry press, 2004, pp. 275-277, English Translation.
Field et al., "Heme Pigment Content of Bovine Hemopoietic Marrow and Muscle," J. Food Sci., 45:1109-1112, 1980.
Follow Your Heart Homepage, posted on or before Nov. 28, 1999, accessed Jan. 7, 2014, http://www.followyourheart.com, 3 pages.
Follow Your Heart, Products and Nutrition Facts, posted on or before Nov. 28, 1999, accessed Feb. 7, 2014, http://www.followyourheart.com/products/, 26 pages.
Foo, "Beef and Scallop Stir-Fry," Food & Wine, Jul. 2001, retrieved on Sep. 10, 2015, http://www.foodandwine.com/recipes/beef-and-scallop-stir-fry/print, 3 pages.
Food for Lovers, Vegan Queso Original & Vegan Queso Mild, posted on or before Oct. 27, 2011, retrieved Feb. 7, 2014, http://www.foodforlovers.com/products, 3 pages.
Fountoulakis and Lahm, "Hydrolysis and amino acid composition analysis of proteins", J. Chromatogr A, 826: 109-134, 1998.
Fourth Chinese Office Action in Chinese Application No. 201280041713.1, dated Nov. 11, 2016, 18 pages (with translation).
Free & Easy Dairy Free Cheese Flavour Sauce Mix, Holland & Barrett, posted on or before Jun. 22, 2013, retrieved Feb. 7, 2014, http://www.hollandandbarrett.com/pages/product_detail.asp?pid=2686, 2 pages.
Fromson, "The Race to Build a Fake-Meat Burger That Just Might Save the World, Free the cows!" New York Magazine, Jun. 1-7, 2015, 46-48.
Galaxy Foods Vegan Soy Grated Parmesan, ShopRite, retrieved Feb. 7, 2014, http://www.shoprite.com/pd/Galaxy-Nutritional-Foods/Vegan-Grated-Soy-Topping-Parmesan-Flavor/4-oz/077172640006/, 6 pages.
Gardein The Ultimate Beefless Burger Package Ingredients, posted on or before 2013, accessed Jan. 7, 2014, http://gardein.com/products/beefless-burger/, 12 pages.
Gardenburger The Original Veggie Burger Package Ingredients, posted on or before Oct. 5, 2008, accessed Jan. 7, 2014, http://www.gardenburger.com/product.aspx?id=11630, 1 page.
GenBank Accession No. AAA02168.1, May 21, 1993, 1 page.
GenBank Accession No. AFK42304.1, unknown [Medicago truncatula], May 25, 2012, 1 page.
Gharst, "Biochemical and Rheological Characteristics of Peanut Proteins Crosslinked with Microbial Transglutaminase," A dissertation submitted to the Graduate Faculty of North Carolina State University, Raleigh NC, 2007, 149 pages.
Gharst, "Effects of Transglutaminase Catalysis on the Functional and Immunoglobulin Binding Properties of Peanut Flour Dispersions Containing Casein," J. Agric. Food Chem., 2008, 56:10913-10921.
Gharst, "The Effect of Transglutaminase Crosslinking on the Rheological Characteristics of Heated Peanut Flour Dispersions," J. Food Sci., 2007, 72(7):C369-C375.
Gilbert et al., "The revolutionary meatless burger from Impossible Foods is perfect for vegetarians and carnivores alike," Tech Insider,

(56) References Cited

OTHER PUBLICATIONS

Aug. 4, 2016, retrieved on Aug. 25, 2016, <http://www.techinsider.io/the-impossible-foods-burger-review-vegetarian-2016-8>, 9 pages.
Go Veggie!, "0% Dairy. 100% Yum.," posted on or before 2013, accessed Jan. 7, 2014, http://goveggiefoods.com/our-products/dairy-free-cheese-alternative-products/, 1 page.
Go Veggie!, Dairy Free Products and Nutrition Facts, posted on or before 2013, accessed Feb. 7, 2014, http://goveggiefoods.com/our-products/dairy-free-cheese-alternative-products/, 13 pages.
Gordinier, "Masters of Disguise Among Meatless Burgers," The New York Times, Mar. 22, 2011, accessed Jan. 7, 2014, http://www.nytimes.com/2011/03/23/dining/23meatless.html?pagewanted=all&_r=0, 5 pages.
Griffths, "XCIII. The Action of Gastric Juice on Beef Muscle-Globulin, With References to Anaemia," Biochemistry Journal, 28:671-675 (1934).
Grigorakis et al., "Organoleptic and volatile aroma compounds comparison of wild and cultured gilthead sea bream (*Sparus aurata*): sensory differences and possible chemical basis," Aquaculture 225:109-119 (2003).
Grobart, "Making a Steak Without a Cow," Bloomberg Technology, Jun. 21, 2016, retrieved Jun. 23, 2016 <http://www.bloomberg.com/news/articles/2016-06-21/making-a-steak-without-the-cow>, 2 pages.
Grosch, "Evaluation of the Key Odorants of Food by Dilution Experiments, Aroma Models and Omission," Chem. Senses 26:533-545 (Jun. 2001).
Grounds for Opposition Against European Patent No. EP 2 943 072, dated Sep. 27, 2018, 44 pages.
Grunwald et al., "Mechanisms of Heme Protein-Mediated Lipid Oxidation Using Hemoglobin and Myoglobin Variants in Raw and Heated Washed Muscle," J. Agric. Food Chem., 2006, 54:8271-8280.
Hanlon, "Fake Meat: is science fiction on the verge of becoming fact?," The Guardian, Jun. 22, 2012, http://www.theguardian.com/science/2012/jun/22/fake-meat-scientific-breakthroughs-research, 7 pages.
Hannah, "A fermented feast," Bittersweet, retrieved on Nov. 3, 2016, retrieved from <https://bittersweetblog.com/2010/06/09/a-fermented-feast/>, 2 pages.
Heller, "Barbecued Soybeans," Vegetarian Soybean Recipes, Mother Earth News, Jan./Feb. 1985, http://motherearthnews.com/real-food/vegetarian-soybean-recipes-zmaz85asie.aspx.
Heme Protein Database, "Welcome to the Heme Protein Database," posted on or before Apr. 14, 2013, accessed Dec. 18, 2013, http://hemeprotein.info/heme.php, 1 page.
Heritage Health Food Creamy Veeta Cheese Sauce Mix, Vegan Essentials, posted on or before Aug. 13, 2013, retrieved Feb. 7, 2014, http://store.veganessentials.com/creamy-veeta-cheeze-sauce-mix-by-heritage-health-food-p3945.aspx, 1 page.
Herper, "Mission Impossible Burger: Tasting The Fake Meat That Wants To Save The World," Forbes, Jul. 28, 2016, retrieved on Aug. 25, 2016, <http://www.forbes.com/sites/matthewherper/2016/07/28/mission-impossible-burger-tasting-the-fake-meat-that-wants-to-save-the-world/#57781d823c43>, 6 pages.
Herper, "Drop that Burger," Forbes Online, Nov. 12, 2009, http://www.forbes.com/forbes/2009/1130/thought-leaders-mcdonalds-global-warming-drop-that-burger.html, 4 pages.
Homma et al. "Cheese-like food production from various nuts," Food Preservation Science, Japan 2009, Abstract.
Hoshaw, "Silicon Valley's Bloody Plant Burger Smells, Tastes and Sizzles Like Meat" the salt, Jun. 21, 2016, retrieved Jun. 21, 2016 <http://www.npr.org/sections/thesalt/2016/06/21/482322571/silicon-valley-s-bloody-plant-burger-smells-tastes-and-sizzles-like-meat>, 8 pages.
Hui et al., "Handbook of meat and meat processing," CRC Press, 2012, retrieved on Dec. 5, 2016, retrieved from <https://www.crcpress.com/Handbook-of-Meat-and-Meat-Processing-Second-Edition/Hui/p/book/9781439836835>, 3 pages.
International Preliminary Report on Patentability in International Application No. PCT/US2014/011361, dated Jul. 14, 2015, 13 pages.
International Preliminary Report on Patentability in International Application No. PCT/US2012/046560, dated Jan. 23, 2014, 12 pages.
International Preliminary Report on Patentability in International Application No. PCT/US2012/46552, dated Jan. 23, 2014, 9 pages.
International Preliminary Report on Patentability in International Application No. PCT/US14/11347, dated Jul. 14, 2015, 10 pages.
International Preliminary Report on Patentability in International Application No. PCT/US14/11362, dated Jul. 23, 2015, 10 pages.
International Search Report and Written Opinion in International Application No. PCT/US2012/046560, dated Dec. 14, 2012, 11 pages.
International Search Report and Written Opinion in International Application No. PCT/US2012/46552, dated Nov. 19, 2012, 12 pages.
International Search Report and Written Opinion in International Application No. PCT/US14/11347, dated Jul. 3, 2014, 20 pages.
International Search Report and Written Opinion in International Application No. PCT/US14/11361, dated Jun. 16, 2014, 26 pages.
International Search Report and Written Opinion in International Application No. PCT/US14/11362, dated Jun. 13, 2014, 19 pages.
International Search Report and Written Opinion in International Application No. PCT/US2015/017147, dated May 1, 2015, 15 pages.
International Search Report and Written Opinion in International Application No. PCT/US2015/023679, dated Aug. 28, 2015, 26 pages.
Invitation to Pay Fees in International Application No. PCT/US14/11361, dated Apr. 10, 2014, 4 pages.
Jamieson, "Iroquois Stew with Beef, Chicken and Pork," Epicurious, Nov. 1995, retrieved on Sep. 10, 2015, http://www.epicurious.com/recipes/food/printerfriendly/iroquois-stew-with-beef-chicken-and-pork-865, 2 pages.
Jensen, "Comparative Analysis of Autoxidation of Haemoglobin," J. Experimental Biology, 2001, 204:2029-2033.
Ju and Kilara, "Textural Properties of Cold-set Gels Induced from Heat-denatured Whey Protein Isolates," J. Food Science, 1998, 63(2): 288-292.
Jublot et al., "Quantitation of sulphur aroma compounds in maillard model reaction systems of different composition," Expression of Multidisciplinary Flavour Science, 4 pages (2010).
Kanani, "The Future of Meat is Meatless, Just as Tasty, And About to Change the World," Forbes, Mar. 6, 2014, retrieved on Sep. 11, 2015, http://www.forbes.com/sites/rahimkanani/2014/03/06/the-future-of-meat-is-meatless-just-as-tasty-and-about-to-change-the-world/, 8 pages.
Karahadian et al., "Action of Tocopherol-Type Compounds in Directing Reactions Forming Flavor Compounds in Autoxidizing Fish Oils," J. Amer. Oil Chem. Soc., 66:1302-8 (1989).
Kerscher et al., "Quantification of 2-Methyl-3-furnathiol, 2-Furfurylthiol, 3-Mercapto-2-pentanone in Heated Meat," J. Agric. Food Chem. 46:1954-1958 (1996).
Kerth and Miller, "Beef flavor: a review from chemistry to consumer," White Paper: Product Quality, Texas A&M University Dept of Animal Sciences, 25 pages (2013).
Khan et al., "Meat flavor precursors and factors influencing flavor precursors—A systematic review," Meat Science, 110:278-284 (Dec. 2010).
Konermann et al., "Acid-induced denaturation of myoglobin studied by time resolved electrospray ionization mass spectrometry", Biochemistry, 1997, vol. 36, pp. 6448-6454.
Koutsidis et al., "Water-soluble precursors of beef flavor: I. Effect of diet and breed," Meat Science, 79:124-130, 2008.
Kraft American Singles Package Ingredients, posted on or before Jun. 27, 2012, accessed on Jan. 7, 2014, http://www.kraftrecipes.com/Products/ProductInfoDisplay.aspx?SiteId=1&Product=2100060473, 1 page.
Kummer, "The Problem with Fake Meat," MIT Technology Review, Mar. 31, 2015, retrieved Apr. 20, 2016, <https://www.technologyreview.com/s/536296/the-problem-with-fake-meat/>, 11 pages.

(56) References Cited

OTHER PUBLICATIONS

Kung et al., "Tobacco as a Potential Food Source and Smoke Material: Nutritional Evaluation of Tobacco Leaf Protein," J. Food Sci., 1980, 45(2):320-322, 327.
Lane et al., "The Variety of Odors Produced in Maillard Model Systems and How They are Influenced by Reaction Conditions," The Maillard Reaction in Foods and Nutrition, American Chemical Society, pp. 141-158 (Apr. 1983).
Leahy Gardens Vegan & Delicious, Macaroni & Cheese and Cheese Flavored Sauce Mix Product and Nutrition Facts, posted on or before Feb. 8, 2010, retrieved Feb. 7, 2014, http://www.leaheyfoods.com/products/MacCheese.aspx, 3 pages.
Leduc et al., "Differentiation of fresh and frozen/thawed fish, European sea bass (*Dicentrarchus labrax*), gilthead seabream (*Sparus aurata*), cod (*Gadus morhua*) and salmon (*Salmo salar*), using volatile compounds by SPME/GC/MS," J. Sci. Food Agric., 92:2560-80 (2012).
Leghemoglobin, NCBI's database accession 004939, Mar. 1, 2002.
Lisanatti Foods, Vegan Cheeze Products and Nutrition Facts, posted on or before Mar. 26, 2013, retrieved Feb. 7, 2014, http://www.lisanatti.com/index.php?option=com_zoo&view=category&layout=category&Itemid=22, 5 pages.
Liu et al., "Intermolecular Interactions During Complex Coacervation Of Pea Protein Isolate And Gum Arabic," Journal of Agricultural and Food Chemistry, 2010, 58:552-556.
Lombardi et al., "Total Heme and Non-heme Iron in Raw and Cooked Meats," Journal of Food Science, 67(5):1738-1741 (2002).
Lopez, "We just tried the 'Impossible Burger'—the meatless burger NYC has been waiting for," Business Insider, Jul. 27, 2016, retrieved on Aug. 25, 2016, <http://www.businessinsider.com/what-the-impossible-burger-tastes-like-2016-7>, 5 pages.
Lugay and Kim, "Freeze alignment: A novel method for protein texturization," Utilization of Protein Resources, 1981, p. 177-187.
Luteness, "The Richest Source of Protein," Mosaic, May/Jun. 1979, 39-45.
Macleod, Glesni et al., "Natural and simulated meat flavors (with particular reference to beef)" Critical Reviews in Food Science & Nutrition, vol. 14, 309-437, 1981.
MacMunn, "An address on some of the applications of the spectroscope to medicine", The British Medical Journal, Jan. 3, 1891, pp. 3-9.
Maltais et al., "Formation of Soy Protein Isolate Cold-Set Gels: Proteins and Salt Effects," J. Food Science, 2005, 70 (1): C67-C73.
Maqsood et al., "Haemoglobin-mediated lipid oxidation in the fish muscle: A review," Trends in Food Science & Technology, 2012, 28:33-43.
Marshall et al., "We Tried the "Bleeding" Vegetarian Burger And It Was Actually Good," Jul. 27, 2016, retrieved Jul. 28, 2016 <https://www.buzzfeed.com/chelseamarshall/bleeding-vegetable-burger?utm_term=.jaa03Kyo7#.ogV0m7MAW>, 10 pages.
McGorrin, "Advances in Dairy Flavor Chemistry," Food Flavors and Chemistry: Advances of the New Millennium, Spanier, A. M.; Shahidi,F.; Parliment, T. H.; Mussinan, C. J.; Ho, C.-T.; Contis, E. T., Eds., RoyalSociety of Chemistry, Cambridge, pp. 67-84 (2001).
McGorrin, "Character-impact flavor and off-flavor compounds in foods," Flavor, Fragrance, and Odor Analysis, 2nd, 207-262 (2012).
McGorrin, "The significance of volatile sulfur compounds in food flavors," Volatile sulfur compounds in food 1068, 29 pages (2011).
Mercola, "Controversy over fake meat burger," 2011, https://articles.mercola.com/sites/articles/archive/2017/08/21/impossible-burger-meat-substitute.aspx (Year: 2011), 9 pages.
Moon et al., "Odour-active components of simulated beef flavour analyzed by solid phase microextraction and gas chromatography-mass spectrometry and -olfactometry," Food Research International, 39:294-308 (Apr. 2006).
Morita, "Comparison of aroma characteristics of 16 fish species by sensory evaluation and gas chromatographic analysis," J. Sci. Food Agric., 83:289-297 (2003).

Morningstar Farms Garden Veggie Patties Package Ingredients, posted on or before Jun. 26, 2013, accessed Jan. 7, 2014, https://www.morningstarfarms.com/products/burgers/garden-veggie-patties, 6 pages.
Mottram et al., "Formation of Sulfur Aroma Compounds in Reaction Mixtures Containing Cysteine and Three Different Forms of Ribose," J. Agric. Food Chem., 50:4080-4086 (2002).
Mottram, "Flavour formation in meat and meat products: a review," Food Chemistry, 62(4):415-24 (Aug. 1998).
Mottram,"An Overview of the Contribution of Sulfur-Containing Compounds to the Aroma in Heated Foods," Heteroatomic Aroma Compounds, American Chemical Society, pp. 73-92 (Aug. 2002).
Nacho Mom's Vegan Queso, Products and Nutrition Facts, posted on or before Sep. 20, 2010, retrieved on Feb. 7, 2014, http://fatgoblin.com/Home.html, 6 pages.
Naike, "Food Flavor Chemistry," 1st Edition China Light Industry Press, pp. 236-243 (1996) (English Translation).
Nielsen et al., "Improved Method for Determining Food Protein Degree of Hydrolysis", Journal of Food Science: Food Chemistry and Toxicology, vol. 66, 2001.
Nielson, Introduction to the Chemical Analysis of Foods, Jones & Bartlett Publishers, 1994.
Nutty Cow Nut Cheeses, Products and Nutrition Facts, posted on or before Jul. 23, 2012, retrieved Feb. 7, 2014, http://www.nuttycow.com/, 6 pages.
Oellingrath, "Heat Degradation of Heme In Met-hemoglobin and Met-myoglobin Model Systems Measured by Reversed-Phase Ion-Pair High Performance Liquid Chromatography," J Food Science, 1998, 53(1): 40-42.
Office Action in Chinese Application No. 201280041713.1, dated Jul. 13, 2017, 28 pages (English Translation).
Office Action in Chinese Application No. 201480013778.4, dated Aug. 8, 2017, 24 pages (English Translation).
Office Action in Chinese Application No. 201480014349.9, dated Jul. 24, 2017, 52 pages (English Translation).
Office Action in Japanese Patent Application No. 2015552865, dated Oct. 24, 2017, 15 pages (English Translation).
Office Action in Russian Patent Application No. 2014104812, dated May 23, 2017, 8 pages (English Translation).
Ofori and Hsieh, "The Use of Blood and Derived Products as Food Additives", Chapter 13 of book Food Additive Edited by Yehia El-Samragy Published: Feb. 22, 2012.
Oshodi et al., "In vitro protein digestibility, amino acid profile and available iron of infant-weaning food prepared from maize flour and bovine blood", Food Research International, vol. 30, No. 3-4, pp. 193-197, 1997.
PancakeNinja, "Beef and chicken cheese burgers"—Pancake Ninja, 2011, http://pancake-ninja.blogspot.com/2011/06/beef-and-chicken-cheese-burgers.html, downloaded Nov. 22, 2017, 8 pages.
Parmela Parmesan Style Aged Nut Cheese, Product and Nutrition Facts, 2012, retrieved Feb. 7, 2014, http://www.parmelafoods.com/your-health.html, 4 pages.
Pazos et al., "Effect of pH on Hemoglobin-Catalyzed Lipid Oxidation in Cod Muscle Membranes in Vitro and in Situ," J. Agric. Food Chem., 2005, 53:3605-3612.
Peace Cheese 100% Plant-based Cheese Alternative, Product and Nutrition Facts, posted on or before Jun. 6, 2012, retrieved Feb. 7, 2014, http://www.ilovepeacecheese.com/#/products/4571642621, 3 pages.
Peterson, "The Impact of the Enzymatic Hydrolysis Process on Recovery and Use of Proteins", In: Birch G.G., Blakebrough N., Parker K.J. (eds) Enzymes and Food Processing. Springer, Dordrecht (1981).
Proulx et al., "Iron Bioavailability of Hemoglobin from Soy Root Nodules Using a Caco-2 Cell Culture Model," J. Agricultural and Food Chemistry, Feb. 2006, 54(4):1518-1522.
Proulx, "Diversified strategies for improving iron bioavailability of maize," Iowa State University—Retrospective Theses and Dissertations, 2007 retrieved on Sep. 19, 2016, retrieved from <http://lib.dr.iastate.edu/rtd/15852/>, 144 pages.
Punk Rawk Labs: an ongoing experiment in optimal health, Nut Milk Cheese Products, posted on or before Jun. 8, 2011, retrieved Feb. 7, 2014, http://www.punkrawklabs.net/cheeses.html, 4 pages.

(56) References Cited

OTHER PUBLICATIONS

Ramos et al., "What is Masa?—Ingredient Intelligence," The Kitchen, retrieved on Dec. 1, 2016, http://www.thekitchn.com/whats-the-difference-between-masa-and-masa-harina-226434, 5 pages.
Rebellato et al., "Iron in fortified biscuits: A simple method for its quantification, bioaccessibility study and physicochemical quality," Food Research International, 2015, 77:385-391.
Reedy et al., "Development of a heme protein structure-electrochemical function database," Nucleic Acids Research, 2008, 36:307-313.
Richards et al., "Effects of Fish Heme Protein Structure and Lipid Substrate Composition on Hemoglobin-Mediated Lipid Oxidation," J. Agric. Food Chem., 2007, 55:3643-3654.
Richards et al., "Pro-oxidative Characteristics of Trout Hemoglobin and Myoglobin: A Role for Released Heme in Oxidation of Lipids," J. Agric. Food Chem., 2005, 53:10231-10238.
Richins et al., "Effect of Iron Source on Color and Appearance of Micronutrient-Fortified Corn Flour Tortillas," Cereal Chem., 85:561-5 (2008).
Road's End Organics, Cheese Sauce Mix Products and Nutrition Facts, posted on or before Oct. 28, 2009, retrieved Feb. 7, 2014, http://www.edwardandsons.com/reo_shop_chreese.itml, 6 pages.
Road's End Organics, Mac & Cheese Products and Nutrition Facts, posted on or before Oct. 28, 2009, retrieved Feb. 7, 2014, http://www.edwardandsons.com/reo_shop_pastas.itml, 7 pages.
Rochet and Chaintreau, "Carbonyl Odorants Contributing to the In-Oven Roast Beef Top Note," J. Agric. Food Chem., 53:9578-9585 (Nov. 2005).
Rowe, "Chemistry and technology of flavors and fragrances," Oxford:: Blackwell; 2005, 351 pages.
Rusli, "The Secret of These New Veggie Burgers: Plant Blood," The Wall Street Journal, Oct. 7, 2014, retrieved on Oct. 9, 2014, http://online.wsj.com/articles/the-secret-of-these-new-veggie-burgers-plant-blood-1412725267, 5 pages.
Schieberle et al., "Characterization of Key Odorants in Dry-Heated Cysteine-Carbohydrate Mixtures: Comparison with Aqueous Reaction Systems," Flavor Analysis, American Chemical Society, pp. 320-330 (Sep. 1998).
Schwartz, "Meet the Silicon Valley-Backed Vegan Cheese That You Might Actually Eat," Fast Company, Feb. 26, 2014, retrieved Sep. 11, 2015, http://www.fastcoexist.com/3025648/meet-the-silicon-valley-backed-vegan-cheese-that-you-might-actually-eat, 6 pages.
Segner, "Meatless burger made possible with local effort," Jul. 29, 2016, retrieved Aug. 1, 2016 <http://www.southernminn.com/owatonna_peoples_press/news/article_3d414149-1040-534d-blaf-bf4f8c486788.html>, 5 pages.
Selli et al., "Odour-active and off-odour components in rainbow trout (*Oncorhynchus mykiss*) extracts obtained by microwave assisted distillation-solvent extraction," Food Chemistry, 114:317-322 (2009).
Shahidi et al., "Meat flavor volatiles: A review of the composition, techniques of analysis, and sensory evaluation," CRC Critical Reviews in Food Science and Nutrition, 24(2):141-243 (Jan. 1986).
Shi et al., "Identification of characteristic flavour precursors from enzymatic hydrolysis-mild thermal oxidation tallow by descriptive sensory analysis and gas chromatography-olfactometry and partial least squares regression," Journal of Chromatography B, 913-914:96-76 (Jan. 2013).
Shimbayashi et al., "Free Amino Acids and Phosphorylethanolamine in Milk Whey of Cow" Agr. Biol. Chem, 29(1):13-19, 1965.
Shu et al., "Parameter Effects on the Thermal Reaction of Cystine and 2,5-Dimethyl-4-hydroxy-3(2H)-furanone," Thermal Generation of Aromas, American Chemical Society, pp. 229-241 (Oct. 1989).
Sister River Foods Parma!, Products and Nutrition Facts, Posted on or before Jun. 2, 2012, retrieved Feb. 11, 2014, http://www.veganstore.com/product/parma-vegan-parmesan/vegan-cheese-and-dairy-alternatives, 6 pages.
Soller, "The Impossible Burger is Ready for Its (Meatless) Close-Up," The Wall Street Journal, Jun. 14, 2016, retrieved Jun. 21, 2016 <http://www.wsj.com/articles/the-impossible-burger-is-ready-for-its-meatless-close-up-1465912323>, 8 pages.
Song, et al., "Contribution of oxidized tallow to aroma characteristics of beef-like process flavour assessed by gas chromatography-mass spectrometry and partial least squares regression," Journal of Chromatography A, 1254:115-124 (Sep. 2012).
Soy Kaas, Products, posted on or before Jan. 20, 2011, retrieved Feb. 11, 2014, http://www.soykaas.com/products, 1 page.
Soyco Cheese Products, Natural Pantry, retrieved Feb. 11, 2014, http://www.natural-pantry.com/search_results.asp?ct=All&site_search_qu=soyco&storeID=D92VLAQVMPDL9L5UHTS2WLU67NADEHUA, 10 pages.
Soymage Cheese Products, Good Earth Natural Foods, retrieved on Feb. 11, 2014, http://www.goodearthnaturalfoods.com/shop/brand2.asp?storeID=PJ102JRNHNGT8G0QMPEQ7LDC7GX6C2W2&alpha=S&brand=Soymage&brand_id=805, 6 pages.
Specht et al., "Identification of Volatile Flavor Compounds with High Aroma Values from Shallow-Fried Beef," J. Agric. Food Chem., 1994, 42:2246-2253.
Spence et al., "Multisensory Flavor Perception," Cell 161: 24-35 (2015).
Ste Martaen Cheese, Products and Nutrition Facts, posted on or before May 28, 2009, retrieved Feb. 11, 2014, http://stemartaen.bigcartel.com/, 14 pages.
Sterling, "Welcome to the Era of Plant-Based Meat," Food & Wine, Apr. 13, 2016, Retrieved Apr. 20, 2016, <http://www.foodandwine.com/blogs/welcome-era-plant-based-meat>, 3 pages.
Supplementary European Search Report for International No. EP 14737909.3, dated Oct. 7, 2016, 10 pages.
Supplementary European Search Report in European Application No. 15774164, dated Oct. 27, 2017, 11 pages.
Supplementary Partial European Search Report in European Application No. 14738061 dated Nov. 7, 2016, 11 pages.
Swanson, "Patenting the Quest for a More Perfect Veggie Burger," JDSUPRA Business Advisor, Jun. 21, 2016, retrieved Jun. 23, 2016 <http://www.jdsupra.com/legalnews/patenting-the-quest-for-a-more-perfect-72212/. 13 pages.
Tang et al., "Flavor chemistry of 2-methyl-3-furanthiol, an intense meaty aroma compound," Journal of Sulfur Chemistry, 11 pages, (2012).
The Daiya Advantage, Products and Nutrition Facts, posted on or before Jan. 26, 2010, retrieved on Feb. 7, 2014, http://us.daiyafoods.com/our-products, 126 pages.
The Good Scents Company, "The Good Scents Company Information System," 2015, retrieved on Dec. 1, 2016, http://www.thegoodscentscompany.com/, 2 pages.
The Vegetarian Express Parma Zaan Sprinkles, posted on or about Oct. 17, 2009, retrieved Feb. 11, 2014, http://www.thevegetarianexpress.com/cart/home.php?cat=250, 2 pages.
Tofu Rella Mozzarella Cheese, Natural Pantry, retrieved Feb. 11, 2014, http://www.natural-pantry.com/shop/product_view.asp?id=24684&StoreID=D92VLAQVMPDL9L5UHTS2WLU67NADEHUA&private_product=0, 2 pages.
Tofutti Cheese Products and Nutrition, posted on or before Jun. 26, 2013, retrieved Feb. 11, 2014, http://www.tofutti.com/dairy-free-cheeses/, 18 pages.
Tofutti Milk Free, "Premium Dairy Free Cheeses,", posted on or before Jun. 26, 2013, accessed Jan. 7, 2014, http://www.tofutti.com/dairy-free-cheeses/, 2 pages.
Tong et al. ,"Blood Composition of Different Beef Breed Types" Can. J. Anim. Sci, 66:915-924 (Dec. 1986).
Topunov, A.F., et al., "Hemoglobins: Evolution, Abundance, and Heterogeneity," Uspekhi Biologicheskoi Khimii, vol. 41, 2001, p. 207, partial translation, 1 page.
Trader Joe's Sliced Soy Cheese Alternative, Fotki, posted Oct. 27, 2008, retrieved Feb. 11, 2014, http://public.fotki.com/harwons/food/tj-sliced-soy-cheese.html, 1 pages.
Trader Joe's Vegan Mozzarella, A(soy) Bean, posted Jun. 7, 2013, retrieved Feb. 11, 2014, http://a-soy-bean.blogspot.com/2013/06/showdown-trader-joes-vegan-mozzarella.html, 13 pages.
Treeline Treenut Cheese, Products and Nutrition Facts, posted on or before Dec. 10, 2013, retrieved on Feb. 11, 2014, http://www.treelinecheese.com/treeline-cheese-products.html, 3 pages.

(56) References Cited

OTHER PUBLICATIONS

Tressl et al., "Formation of Amino Acid Specific Maillard Products and Their Contribution to Thermally Generated Aromas," Thermal Generation of Aromas, American Chemical Society, pp. 156-171 (Oct. 1989).
Uauy et al., "Iron Fortification of Foods: Overcoming Technical and Practical Barriers," J. Nutr. 132:849S-852S (2002).
United States Environmental Protection Agency Document EPA-745-B-99-0145, 1999.
Usami, Aya et al., "Heme-mediated binding of a-casein to ferritin: evidence for preferential a-casein binding to ferrous iron" Biometals, vol. 24, 1217-1224, 2011.
Van Ba et al., "Principles of Meat Aroma flavors and Future Prospect," Intech Open Science, Open Minds, 2012, Chapter 7, 145-176.
Van Den Ouweland et al., "Process Meat Flavor Development and the Maillard Reaction," In Thermal Generation of Aromas, ACS Symposium Series, American Chemical Society, 1989, 433-441.
Vasilescu et al., "Chapter 6: Meat Freshness: Peroxynitrite's Oxidative Role, Its Natural Scavengers, and New Measuring Tools," American Chemical Society, Dec. 2014, 30 pages.
VBites, "Cheezly," posted on or before 2013, accessed Jan. 7, 2014, http://www.vbitesfoods.com/meat-free/cheezly.html, 2 pages.
Vegan Sun Artisan Aged Raw Cheese, Vegan Essentials, retrieved Feb. 11, 2014, http://store.veganessentials.com/vegan-sun-artisan-aged-raw-cheese-p4201.aspx, 3 pages.
VegCuisine Soy Cheese Products, The Vegan Store, retrieved on Feb. 11, 2014, http://www.veganstore.com/category/s?keyword=vegcuisine, 5 pages.
Veggie Brothers Mozzarella Sticks, Vegan Essentials, Nov. 9, 2013, retrieved Feb. 11, 2014, http://store.veganessentials.com/vegan-mozzarella-sticks-by-veggie-brothers-p3761.aspx, 2 pages.
Victoria Vegan Sauces, Products and Nutrition Facts, posted on or about Sep. 16, 2012, retrieved Feb. 11, 2014, http://www.victoriafinefoods.com/products/specialty-sauces/victoria-vegan, 9 pages.
Walter et al, Effect of bovine-hemoglobin-fortified cookies on iron status of schoolchildren: a nationwide program in Child, Am J Clin Nutr, 1993, 57, pp. 190-194.
Wansink, B., "Overcoming the Taste Stigma of Soy" Journal of Food Science: Sensory and Nutritive Qualities of Food, vol. 68, 2604-2606, 2003.
Wayfare We Can't say It's Cheese Spread, Products and Nutrition Facts, posted on or about Oct. 12, 2013, retrieved Feb. 11, 2014, http://www.wayfarefoods.com/we-cant-say-its-cheese/, 5 pages.
Wisuthiphaet and Kongruang, "Production of Fish Protein Hydrolysates by Acid and Enzymatic Hydrolysis," J Med Bioeng, 2015, 4(6): 466-470.
Withycombe et al., "Identification of 2-Methyl-3-Furanthiol in the Steam Distillate from Canned Tuna Fish," Journal of Food Science, 53(2):658-660 (1988).
Wortham and Miller, "Venture Capitalists Are Making Bigger Bets on Food Start-Ups," The New York Times Online, Apr. 28, 2013, http://www.nytimes.com/2013/04/29/business/venture-capitalists-are-making-bigger-bets-on-food-start-ups.html?pagewanted=all&_r=1&, 4 pages.
Xiaoling, "Practical Technology and Quality Management of Deep Processing of Meat Products," China Textile & Apparel Press, pp. 9 and 10 (English Translation), 10 pages.
Yancey et al., "Effects of total iron, myoglobin, hemoglobin, and lipid oxidation of uncooked muscles on livery flavor development and volatiles of cooked beef steaks," Meat Science, 73:680-686 (2006).
Yves Veggie Cuisine The Good Slice, ShopWell, retrieved on Feb. 11, 2014, http://www.shopwell.com/yves-veggie-cuisine-the-good-slice-cheese-alternative-cheddar-style/soy-foods/p/6082260001, 1 page.
Zhengnong et al., "Cihai biological fascicle," Shanghai Lexicographical Publishing House, p. 243, Dec. 31, 1987 (English Translation).
Charkin, et al., "Fragmentation of heme and hemin+ with sequential loss of carboxymethyl groups: A DFT and mass-spectrometry study," Chemical Physics Letters, 2005, 415:362-369.
FDA Statement and Response, GRAS Notice 540, dated May 29, 2015, 13 pages.
FDA Statement, "Structural comparison of plant hemoglobins and animal myoglobins," annex to communication in opposition to EP Patent No. 2943072, 2019, 5 pages.
Fyrestam and Ostman, "Determination of heme in microorganisms using HPLC-MS/MS and cobalt(III) protoporphyirin IX inhibition of heme acquisition in *Escherichia coli*," Anal. Bioanal. Chem., 2017, 409:6999-7010.
GenBank Accession No. AFB70892.1, Sariam, "Non-symbiotic hemoglobin [*Vigna radiata*]," dated Feb. 26, 2012, 1 page.
Gledhill, "The detection of iron protoporphyrin (heme b) in phytoplankton and marine particulate material by electrospray ionisation mass spectrometry—comparison with diode array detection," Anal. Chim. Acta., 2014, 841:33-43.
Impossible Foods Response to Opponent's Reply in opposition to EP Patent No. 2943072, dated Nov. 21, 2019, 28 pages.
Jenschke, et al., "Unsaturated fatty acids and sodium affect the liver-like off-flavor in cooked beef," J. Anim. Sci., 2007, 85:3072-3078.
Jianjun Jiang, et al., "Food technology (vol. 1)," Higher Education Press, 2002, 1:31-32, English translation.
Kohler, et al., "Physiological Characterization of a Heme-Deficient Mutant of *Staphylococcus aureus* by a Proteomic Approach," Journal of Bacteriology 2003, 185:6928-6937.
Lane and Nursten, "The Variety of Odors Produced in Maillard Model Systems and How They Are Influenced by Reaction Conditions," in: The Maillard Reaction in Foods and Nutrition, Waller and Feather, eds., ACS Symposium Series, 1983, No. 215, pp. 141-158.
Opponent's Reply Letter in opposition to EP Patent. No. 2943072, dated Nov. 21, 2019, 15 pages.
Pashynska, et al., "Characterization of Noncovalent Complexes of Antimalarial Agents of the Artemisinin-Type and FE(III)-Heme by Electrospray Mass Spectrometry and Collisional Activation Tandem Mass Spectrometry," J. Am. Soc. Mass Spectrom., 2004, 15:1181-1190.
Song, et al., "Agricultural and sideline products processing value-added technology II: Processing of soybean products," Henan Science and Technology Press, 2009, 1:64-69, English translation.
Wang and Wang, "Principles and techniques of food nutrition and health care," China Light Industry Press, 1998, 1:446-449, English translation.
"happycow.net", [online], "For Love Of Sea Vegetables", dated Jul. 10, 2019, Internet URL: https://www.happycow.net/blog/for-love-of-sea-vegetables/, 5 pages.
"pacificharvest.com", [online], "Red Seaweeds—Nutritional Benefits & Quick Applications", dated Jul. 14, 2016, Retrieved from Internet on Jul. 26, 2019, Internet URL: https://www.pacificharvest.co.nz/blog/general-information/red-seaweeds, 11 pages.
"vitalitymagazine.com", [online], "Sprouts: The Miracle Food", Vitality Magazine, dated Feb. 1, 2005, Retrieved from Internet Jul. 29, 2019, Internet URL: https://vitalitymagazine.com/article/sprouts-the-miracle-food/, 10 pages.
"www.jackkruse.com", [online], "Brain Gut 6: Epi-Paleo Rx", dated Jul. 2012, Internet URL: https://jackkruse.com/brain-gut-6-epi-paleo-rx/?print=pdf, 12 pages.
"www.maraseaweed.com", [online], "Smoked Dulse", Applewood Smoked Dulse—Seaweed Flakes | Mara Seaweed, No Date, Retrieved from the Internet Jul. 15, 2019, Internet URL: https://maraseaweed.com/collections/products/products/smoked-dulse, 3 pages.
"www.myliquidsupplements.com", "Red seaweed is a rich source of nutrients, essential fatty acids, fiber, protein, complex cards, and minerals and now red sea vegetables are easy to find", Health Benefits of Red Seaweed, dated 2013, Retrieved from Internet Jul. 29, 2019, Internet URL: https//:www.myliquidsupplements.com/red-seaweed/, 10 pages.
"www.scotsman.com", [online], "Tom Kitchen: ideas for cooking with seaweed", dated Aug. 5, 2012, Retrieved from Internet Jul. 29, 2019, Internet URL: https://www.scotsman.com/news-2-15012/tom-kitchin-ideas-for-cooking-with-seaweed-1-2451932,12 pages.

(56) References Cited

OTHER PUBLICATIONS

"www.shop.healthyhealing.com", [online], "What Are Sea Vegetables? (/healthyhealing-safety/what-are-sea-vegetables)", dated Oct. 25, 2012, Retrieved from the Internet Jul. 15, 2019, Internet URL: (https://shop.healthyhealing.com/Seaweed-Products_c_140.html), 5 pages.
"www.universal-tao.com", [online], "Sprouts", No Date, Retrieved from Internet on Jul. 29, 2019, Internet URL: https://www.universal-tao.com/article/sprouts/html, 9 pages.
"www.wildfoodplants.com", [online], "Teriyaki Weed", dated Sep. 9, 2007, Retrieved from Internet Jul. 15, 2019, Internet URL: https://wildfoodplants.com/2007/09/teriyaki-weed/, 2 pages.
Abou El-Ella, "Hard cheese substitute from soy milk", Journal of Food Science, Wiley-Blackwell Publishing, Inc, US, vol. 45, No. 6, Jan. 1, 1980.
Ames et al., "Volatile Components of a Yeast Extract Composition", J Food Sci 50, pp. 125-131, 1985.
Ames, "Volatile Sulfur Compounds in Yeast Extracts", Chapter 12, Sulfur compounds in foods. Washington DC: ACS, pp. 147-159, 1994.
Anderson et al., "A new hemoglobin gene from soybean: A role for hemoglobin in all plants", Proc. Natl. Acad. Sci. USA, 93, 5682-5687, 1996.
Baek et al., "Aroma Extract Dilution Analysis of a Beef like Process Flavor from Extruded Enzyme-Hydrolyzed Soybean Protein", J. Agric. Food Chem., 49, 790-793, 2001.
Bodnar, "Novel approaches to improving qualities of maize endosperm", Graduate Theses and Dissertations. Paper 10271. Ames, Iowa, USA: Iowa State University Digital Repository @ Iowa State University, 2011, 147 pages.
Buttery et al., "Thiamin Odor and Bis(2-methyl-3-furyl) Disulfide", J. Agri. Food Chem., vol. 32, No. 3, pp. 674-676, 1984.
Buttery, "Flavor Chemistry and Odor Thresholds", In: Teranishi, R, Wick, EL, Hornstein, I, editors. Flavor chemistry: thirty years of progress, pp. 353-365, 1999.
Chohan et al., "Catalytic Effect of Cobalt, Copper, Iron, Magnesium, Manganese, Nickel and Zinc Metal ions on the Conversion of Glucose into 5-Bydroxymethylfurfuraldehyde.", Jour. Chem. Soc. Pak. vol. 19, No. 3, pp. 221-223, 1997.
Collman et al., "Regioselective and Enantioselective Epoxidation Catalyzed by Metalloporphyrins", Science, vol. 261, pp. 1404-1411, 1993.
Derwent, "Cheese-like, soybean-fermented foodstuff prodn.—by inoculating soybean milk with lactic acid bacteria and protein decomposing yeast", 1979.
Duff et al., "Hemoglobin expression in germinating barley.", Seed Science Research, 431-436, 1998.
Erickson et al., "Lipid Oxidation of Muscle Foods", Chapter 12, Food Lipids Chemistry, Nutrition, and Biotechnology Second Edition,48 pages, 2002.
Evers et al., "Furans Substituted at the Three Position with Sulfur", American Chemical Society: Washington, pp. 184-119, 1976.
Everse, "Heme Proteins.", In Encyclopedia of Biological Chemistry, Elsevier Inc., vol. 2, pp. 354-361, 2004.
Extended European Search Report in Application No. 18203176.5, dated May 31, 2019.
Farmer et al., "Interaction of Lipid in the Maillard Reaction between Cysteine and Ribose: the Effect of a Triglyceride and Three Phospholipids on the Volatile Products", J Sci Food Agric., 53, 505-525, 1990.
Gasser et al., "Identification of volatile flavour compounds with high aroma values from cooked beef", Z Lebensm Unlcrs Forsch, 186: 489-494, 1988.
Gasser et al., "Primary odorants of chicken broth", Z Lebensm Unters Forsch, 190: 3-8, 1990.
Groves et al., "Asymmetric Hydroxylation, Epoxidation, and Sulfoxidation Catalyzed by Vaulted Binaphthyl Metalloporphyrins", J. Org. Chem., 55, 3628-3634, 1990.
Güntert et al., "Identification and Formation of Some Selected Sulfur-Containing Flavor Compounds in Various Meat Model Systems", J. Agri. Food Chem., 38, 2027-2041, 1990.
Gupta e al., "Plant hemoglobin's: Important players at the crossroads between oxygen and nitric oxide.", FEBS Letters, pp. 3843-3849, 2011.
Hardison, R., "Hemoglobin's from bacteria to man: Evolution of different patterns of gene expression.", The Journal of Experimental Biology, 1099-1117, 1998.
Hargrove et al., Characterization of Recombinant Soybean Leghemoglobin and Apolar Distal Histidine Mutants, Journal of molecular biology, 1032-42, 1997.
Hofmann et al., "Evaluation of the Key Odorants in a Thermally Treated Solution of Ribose and Cysteine by Aroma Extract Dilution Techniques", J. Agri. Food Chem., 43, 2187-2194, 1995.
Hofmann et al., "Lactic Fermentation of Ground Soybean for Use in Imitation Cream Cheese Products", Journal of Food Science, vol. 50, No. 2, pp. 325-329, 1985.
Hofmann et al., "Studies on the Formation and Stability of the Roast-Flavor Compound 2-Acetyl-2-thiazoline", J. Agri. Food Chem., 43, 2946-2950, 1995.
Jin et al., "Aroma Properties of Some Oxazoles", Perfumer & Flavorist, vol. 9, Aug./Sep., 4 pages, 1984.
Lee et al., "Cloning and Expression Analysis of 2-on-2 Hemoglobin from Soybean.", Journal of Plant Biology, 47(2), 92-98, 2004.
Lendl, "Untersuchung des Rsstzwiebelaromas", Z. Lebensm. Unters.-Forsch. 157, 229-234, 1975.
Lira-Ruan et al., "Expression of non-symbiotic hemoglobin 1 and 2 genes in rice (*Oryza sativa*) embryonic organs.", Communicative and Integrative Biology, 4(4), 457-458, 2011.
Lu et al., "Catalytic C—H functionalization by metalloporphyrins: recent developments and future directions", Chem. Soc. Rev., 40, 1899-1909, 2011.
MacLeod, "The Scientific and Technological Basis of Meat Flavours", 12, 36 pages, 1986.
Meunier et al., "Metal-oxo species in P450 enzymes and biomimetic models. Oxo-hydroxo tautomerism with water-soluble metalloporphyrins", Topics in Catalysis vol. 21, Nos. 1-3, pp. 47-54, 2002.
Mintel, [Online], "Greek Style Cultured Almond Milk Yogurt", retrieved from www.gnpd.com, Nov. 2012 Database accession No. 1943001, 5 pages.
Mottram, "Flavor Compounds Formed during the Maillard Reaction", Chapter 10, 23 pages, 1993.
Mouritsen et al., "Seaweeds for umami flavour in the New Nordic Cuisine", Flavour 1:4, 12 pages, 2012.
Pittet et al., "Comparative Study of Flavor Properties of Thiazole Derivatives", J. Agri. Food Chem., vol. 22, No. 2, pp. 264-269, 1974.
Shaw et al., "Bioavailability of Iron from Purple Laver (*Porphyra spp.*) Estimated in a Rat Hemoglobin Regeneration Bioassay", J. Agric. Food Chem., 48, pp. 1734-1737, 2000.
Strelec et al., "Aminopeptidases of Germinated and Non-Germinated Barley", Barley Aminopeptidases, Food Technol. Biotechnol. 47 (3), 296-303, 2009.
Van Den Ouweland et al., "Components Contributing to Beef Flavor. Volatile Compounds Produced by the Reaction of 4-Hydroxy-5-methyl-3(2.ff)-furanone and Its Thio Analog with Hydrogen Sulfide", J. Agri. Food Chem., vol. 23, No. 3, pp. 501-505, 1975.
Vernin et al., "Mechanisms of Formation of Heterocyclic Compounds in Maillard and Pyrolysis Reactions", Chapter III, Heterocycles in Maillard and Pyrolysis Reactions, pp. 151-217, 1982.
Wajcman et al., "L 'Hemoglobin, from microorganism to man: a single structural motif, multiple functions.", Comptes Rendus Biologies, 325(12), 1159-1174, 2002.
Weenen, "Process Flavourings", Flavourings, pp. 233-258, 1998.
Weinberger et al., "Different regulation of haloperoxidation during agar oligosaccharide-activated defense mechanisms in two related red algae, *Gracilaria* sp. and *Gracilaria chilensis*", Journal of Experimental Botany, vol. 58, No. 15/16, pp. 4365-4372, 2007.
Werkhoff et al., "Isolation and Characterization of Volatile Sulfur-Containing Meat Flavor Components in Model Systems", J. Agri. Food Chem., 38, 777-791, 1990.

(56) References Cited

OTHER PUBLICATIONS

Whitfield et al., "Effect of Phospholipid on the Formation of Volatile Heterocyclic Compounds in Heated Aqueous Solutions of Amino Acids and Ribose", 1. Sci. Food Agric., 42, 261-272, 1988.
Wu et al., "Characterization of the Aroma of a Meat like Process Flavoring from Soybean-Based Enzyme-Hydrolyzed Vegetable Protein", J. Agric. Food Chem., 50, 2900-2907, 2002.
Yaylayan et al., "Microwave and Thermally Induced Maillard Reactions", Chapter 38, Thermally Generated Flavors, 8 pages, 1993.
Zampronio et al., "Catalytic oxidation of cyclohexane and cyclooctene over a new metalloporphyrin supported on VOPO4 catalyst", Catalysis Letters vol. 104, Nos. 1-2, 4 pages, 2005.
Zhang et al., "Comparison of the Volatile Compounds Formed from the Thermal Reaction of Glucose with Cysteine and Glutathione", J. Agri. Food Chem., 39, 760-76, 1991.
"Peas, green raw," FoodData Central, US Department of Agriculture, retrieved from URL <https:/fdc.nal.usda.gov/fdc-app.html#/food-details/170419/nutrients>, Apr. 1, 2019, 8 pages.
Berrios, et al., "Carbohydrate composition of raw and extruded pulse flours," Food Research International, 2010, 43:531-536.
Dinh et al., "Effects of USDA quality grade and cooking on water-soluble precursors of beef flavor," Meat Science, 2018, 146:122-130.
EP Opposition, in Application No. 14737766.7, dated Jul. 4, 2019, 8 pages.
Jahreis, et al., "Legume flours: nutritionally important sources of portein and dietary fiber," Ernahrungs Umschau, 2016, 63(2):36-42.
Liu, "Comparison of lipid content and fatty acid composition and their districtuion within seeds of 5 small grain species," J. Food Sco., 2011, 76(2):C334-C342.
Macnicol, "Developmental changes in the free amino acid pool and total protein amino acids of pea cotyledons (*Pisum sativum* L.)," Plant Physiol., 1983, 72:492-497.
Oldach, "Biochemistry of a Burger: Impossible Foods does science, makes food and tries to change the world," ASBMB Today, retrieved from URL <https://www.asbmb.org/asbmb-today/industry/100119/biochemistry-of-a-burger>, Oct. 1, 2019, 12 pages.
Opponent's Reply Letter in opposition to EP Patent. No. 2943072, dated Jan. 20, 2020, 18 pages.
Rebuttal Declaration of Dr. Jorge Ruiz-Carrascal and Supporting Exhibits, dated Jan. 20, 2020, 12 pages.
Warendorf, et al., "The flavour of bouillon: 2. Sensory analysis of non-volatiles and imitation of a bouillon," Z. Lebensm. Unters. Forsch., 1992, 195(3):215-223, English Abstract.
Wood, et al., "Fatty deposition, fatty acid composition and meat quality: a review," Meat Science, 2008, 78:343-358.
U.S. Appl. No. 14/796,970, filed Jul. 10, 2015, Marija Vrljic.
U.S. Appl. No. 15/786,776, filed Oct. 18, 2017, Marija Vrljic.
U.S. Appl. No. 16/238,802, filed Jan. 3, 2019, Marija Vrljic.
U.S. Appl. No. 16/238,769, filed Jan. 3, 2019, Marija Vrljic.
U.S. Appl. No. 14/152,499, filed Jan. 10, 2014, Patrick O'Reilly Brown M.D., Ph.D.
U.S. Appl. No. 14/752,540, filed Jun. 26, 2015, Patrick O'Reilly Brown M.D., Ph.D.
U.S. Appl. No. 15/985,694, filed May 21, 2018, Patrick O'Reilly Brown M.D., Ph.D.
U.S. Appl. No. 14/797,006, filed Jul. 10, 2015, Rachel Fraser.
U.S. Appl. No. 15/398,479, filed Jan. 4, 2017, Rachel Fraser.
U.S. Appl. No. 15/624,505, filed Jun. 15, 2017, Rachel Fraser.
U.S. Appl. No. 15/624,513, filed Jun. 15, 2017, Rachel Fraser.
U.S. Appl. No. 15/839,994, filed Dec. 13, 2017, Rachel Fraser.
U.S. Appl. No. 15/913,018, filed Mar. 6, 2018, Rachel Fraser.
U.S. Appl. No. 15/912,763, filed Mar. 6, 2018, Rachel Fraser.
U.S. Appl. No. 15/913,090, filed Mar. 6, 2018, Rachel Fraser.
U.S. Appl. No. 13/941,211, filed Jul. 12, 2013, Patrick O'Reilly Brown M.D., Ph.D.
U.S. Appl. No. 15/300,339, filed Sep. 29, 2016, Ranjani Varadan.
U.S. Appl. No. 16/238,698, filed Jan. 3, 2019, Ranjani Varadan.
U.S. Appl. No. 16/238,749, filed Jan. 3, 2019, Ranjani Varadan.

\* cited by examiner

US 10,863,761 B2

METHODS AND COMPOSITIONS FOR CONSUMABLES

CROSS REFERENCE

This application is a continuation of U.S. application Ser. No. 13/941,211 filed on Jul. 12, 2013, which is a continuation-in-part of International Application No. PCT/US2012/046560, filed Jul. 12, 2012, which claims the benefit of priority of U.S. Provisional Application 61/572,205, filed Jul. 12, 2011 and U.S. Provisional Application 61/671,069, filed Jul. 12, 2012, all of which are incorporated herein by reference.

BACKGROUND OF THE INVENTION

Animal farming has a profound negative environmental impact. Currently it is estimated that 30% of Earth's land surface is dedicated to animal farming and that livestock account for 20% of total terrestrial animal biomass. Due to this massive scale animal farming accounts for more than 18% of net greenhouse gas emissions. Animal farming may be the largest human source of water pollution, and animal farming is by far the world's largest threat to biodiversity. It has been estimated that if the worlds human population could shift from a meat containing diet to a diet free of animal products, 26% of Earth's land surface would be freed for other uses. Furthermore the shift to a vegetarian diet would massively reduce water and energy consumption.

The consumption of meat has a profound negative impact on human health. The heath benefits of a vegetarian diet are well established. If the human population would shift to a vegetarian diet the cost savings in health care would be significant.

Hunger is a worldwide problem, yet the world's 4 major commodity crops (soybeans, maize, wheat, and rice) already supply more than 100% of the human population's requirements for calories and protein, including every essential amino acid.

Plant based meat substitutes have largely failed to cause a shift to a vegetarian diet. The current state of the art for meat substitute compositions involves the extrusion of soy/grain mixture, resulting in products which largely fail to replicate the experience of cooking and eating meat. Common limitations of these products are a texture and mouth-feel that are more homogenous than that of equivalent meat products. Furthermore, as the products must largely be sold pre-cooked, with artificial flavors and aromas built in, they fail to replicate aromas, flavors, and other key features associated with cooking meat. As a result, these products appeal mainly to a limited consumer base that is already committed to vegetarianism/veganism, but have failed to appeal to the larger consumer segment accustomed to eating meat.

Disclosed herein are improved methods and compositions which more accurately replicate the characteristics that consumers value in the preparation and consumption of meat and which overcome the shortcomings and drawbacks of current meat substitutes.

SUMMARY OF THE INVENTION

In some aspects, the invention provides a meat substitute composition comprising a protein content, wherein one or more isolated and purified proteins accounts for 10% or more of said protein content by weight, wherein said meat substitute composition accurately mimics the taste, texture, or color of a meat product derived from animal sources.

In one embodiment, the meat substitute composition accurately mimics the color of said meat product in its raw state and in a cooked state after cooking.

In another embodiment, the one or more isolated and purified proteins accounts for 25% or more of said protein content by weight.

In another embodiment, the one or more isolated and purified proteins accounts for 50% or more of said protein content by weight.

In another embodiment, the one or more isolated and purified proteins accounts for 75% or more of said protein content by weight.

In another embodiment, the one or more isolated and purified proteins accounts for 90% or more of said protein content by weight.

In another embodiment, gluten does not account for 10% or more of said protein content by weight.

In another embodiment, each of said isolated, purified proteins is separately isolated and purified.

In another embodiment, the meat substitute composition comprises 1-7 isolated and purified proteins.

In another embodiment, said 1-7 isolated and purified proteins are each isolated from different plant species.

In some embodiments the meat substitute comprises less than 5, 6, 7, 8, 9, 10, 11, 12, 13, 14, 15, 16, 17, 18, 19, or 20 individual proteins isolated from one or more plant species.

In another embodiment, said protein content comprises no more than trace amounts of any other proteins derived from the one or more plant species.

In another embodiment, said one or more isolated and purified proteins are selected from the group consisting of leghemoglobin, non-symbiotic hemoglobin, hemoglobin, myoglobin, chlorocruorin, erythrocruorin, neuroglobin, cytoglobin, protoglobin, truncated 2/2 globin, HbN, cyanoglobin, HbO, Glb3, and cytochromes, Hell's gate globin I, bacterial hemoglobins, ciliate myoglobins, flavohemoglobins, ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, glyceraldehyde-3-phosphate dehydrogenases, pyruvate decarboxylases, actins, translation elongation factors, ribulose-1,5-bisphosphate carboxylase oxygenase (rubisco), ribulose-1,5-bisphosphate carboxylase oxygenase activase (rubisco activase), albumins, glycinins, conglycinins, globulins, vicilins, conalbumin, gliadin, glutelin, gluten, glutenin, hordein, prolamin, phaseolin (protein), proteinoplast, secalin, extensins, triticeae gluten, zein, any seed storage protein, oleosins, caloleosins, steroleosins or other oil body proteins, vegetative storage protein A, vegetative storage protein B, moong seed storage 8S globulin.

In another embodiment, said one or more isolated and purified proteins are not isolated from an animal.

In another embodiment, said one or more isolated and purified proteins are isolated from a single plant source.

In another embodiment, said one or more isolated and purified proteins are isolated from multiple plant sources.

In another embodiment, wherein said one or more isolated, purified proteins are isolated from a genetically modified organism.

In some embodiments, said genetically modified organism is a genetically modified bacteria or yeast organism.

In some embodiments, said isolated, purified protein has been formed into fibers.

In particular embodiments, said fibers resemble skeletal muscle fibers.

In yet more particular embodiments, said fibers are asymmetric fibers.

In some embodiments, the meat substitute composition further comprises one or more isolated and purified iron-containing proteins.

In some embodiments, said one or more isolated and purified iron-containing proteins is selected from the group consisting of hemoglobin, myoglobin, leghemoglobin, non-symbiotic hemoglobin, chlorocruorin, erythrocruorin, neuroglobin, cytoglobin, protoglobin, truncated 2/2 globin, HbN, cyanoglobin, HbO, Glb3, and Hell's gate globin I, bacterial hemoglobins, ciliate myoglobins, flavohemoglobins.

In a particular embodiment, said iron-containing protein comprises an amino acid sequence with at least 70% homology to SEQ ID NO 1. SEQ ID NO 1: MVAFTEKQDALVSSSFEAFKANIPQYSVVFYTSILEK-APAAKDLFSFLANGVDPTNPKLTGHAEKLFALVRDS-AGQLKASGTVVADAALGSVHAQKAVTDPQFVVVK-EALLKTIKAAVGDKWSDELSRAWEVAYDELAAAIK-KA.

In a particular embodiment, said iron-containing protein comprises an amino acid sequence with at least 70% homology to SEQ ID NO 2. SEQ ID NO 2: MIDQKEKELI KESWKRIEPN KNEIGLLFYA NLFKEEPTVS VLFQN-PISSQ SRKLMQVLGI LVQGIDNLEG LIPTLQDLGR RHKQYGVVDS HYPLVGDCLL KSIQEYLGQG FTEEAKAAWT KVYGIAAQVM TAE. In some embodiments said iron-containing protein comprises an amino acid sequence with at least 80% homology to SEQ ID NO 2. In some embodiments said iron-containing protein comprises an amino acid sequence with at least 90% homology to SEQ ID NO 2. In some embodiments said iron-containing protein comprises an amino acid sequence with at least 98% homology to SEQ ID NO 2.

In a particular embodiment, said iron-containing protein comprises an amino acid sequence with at least 70% homology to SEQ ID NO 3. SEQ ID NO 3: MRKQPTVFEK LGGQAAMHAA VPLFYKKVLA DDRVKHYFKN TNMEHQAKQQ EDFLTMLLGG PNHYKGKNMA EAHKGMNLQN SHFDAIIENL AATLKELGVS DQIIGEAAKV IEHTRKDCLG K. In some embodiments said iron-containing protein comprises an amino acid sequence with at least 80% homology to SEQ ID NO 3. In some embodiments said iron-containing protein comprises an amino acid sequence with at least 90% homology to SEQ ID NO 3. In some embodiments said iron-containing protein comprises an amino acid sequence with at least 98% homology to SEQ ID NO 3.

In some embodiments, the isolated and purified proteins are assembled into one or more gels.

In some embodiments, the meat substitute composition further comprises one or more fats.

In particular embodiments, said one or more fats are derived from a plant source.

In another aspect, the invention provides a meat substitute product that comprises an indicator that indicates cooking progression from a raw state to a cooked state, wherein said meat substitute product is derived from non-animal sources.

In some embodiments, said indicator is a visual indicator that accurately mimics the color transition of a meat product during said cooking progression.

In one embodiment, said color transition is from red to brown.

In one embodiment, said color transition is from pink to white or tan.

In one embodiment, said visual indicator transitions from a translucent to opaque color during said cooking progression.

In some embodiments, the indicator is an olfactory indicator that indicates cooking progression.

In one embodiment, said olfactory indicator is one or more volatile odorants released during cooking.

In some embodiments, said indicator comprises one or more isolated, purified iron-containing proteins.

In particular embodiments, said one or more isolated, purified iron-containing proteins is in a reduced state before cooking.

In one embodiment, said one or more isolated and purified iron-containing proteins is selected from the group consisting of hemoglobin, myoglobin, leghemoglobin, non-symbiotic hemoglobin, chlorocruorin, erythrocruorin, neuroglobin, cytoglobin, protoglobin, truncated 2/2 globin, HbN, cyanoglobin, HbO, Glb3, and cytochromes, Hell's gate globin I, bacterial hemoglobins, ciliate myoglobins, flavohemoglobins.

In a particular embodiment, said iron-containing protein comprises an amino acid sequence with at least 70% homology to SEQ ID NO 1. SEQ ID NO 1: MVAFTEKQDALVSSSFEAFKANIPQYSVVFYTSILEK-APAAKDLFSFLANGVDPTNPKLTGHAEKLFALVRDS-AGQLKASGTVVADAALGSVHAQKAVTDPQFVVVK-EALLKTIKAAVGDKWSDELSRAWEVAYDELAAAIK-KA.

In some embodiments, said one or more isolated and purified iron-containing proteins are not isolated from an animal. In some embodiments compositions of the invention do not contain any proteins from an animal.

In particular embodiments, said one or more isolated and purified iron-containing proteins are isolated from one or more plant sources.

In yet more particular embodiments, said one or more isolated, purified proteins are isolated from the root nodules, roots, seeds, leaves, or stems of said one or more plant sources.

In other particular embodiments, said one or more plant sources are soy or pea plants.

In one embodiment, said one or more plant sources comprises one or more plants of the legume family.

In some embodiments, said one or more isolated and purified iron carrying proteins in a reduced or oxidized state has a similar UV-VIS profile to a myoglobin protein derived from an animal source when in an equivalent reduced or oxidized state.

In a particular embodiment, the difference between the peak absorbance wavelength of said one or more isolated and purified iron-containing proteins and the peak absorbance wavelength of myoglobin derived from an animal source is less than 5%.

In some embodiments, said one or more isolated, purified proteins are isolated from a genetically modified organism.

In one embodiment, said genetically modified organism is a genetically modified bacteria or yeast organism.

In some embodiments, the meat substitute product contains no methylcellulose, no carrageenan, no caramel color, no konjac flour, no gum arabic, and no acacia gum.

In particular embodiments, the meat substitute product additionally contains less than 1% wheat gluten.

In a more particular embodiment, said meat substitute product contains no wheat gluten.

In other particular embodiments, said meat substitute product contains no soy protein isolate.

In other particular embodiments, said meat substitute product contains no soy protein concentrate.

In other particular embodiments, said meat substitute product contains no soy protein.

In a more particular embodiment, said meat substitute product contains less than 5% carbohydrates.

In other particular embodiments, said meat substitute product contains no tofu.

In some embodiments, said meat substitute product contains no tofu, and no wheat gluten.

In some embodiments, said meat substitute product contains no soy protein, and no wheat gluten.

In some embodiments, said meat substitute product contains no animal products and less than 5% carbohydrates.

In some embodiments, said meat substitute product contains less than 1% cellulose.

In some embodiments, said meat substitute product contains less than 5% insoluble carbohydrates.

In some embodiments, said meat substitute product contains no soy protein, and less than 1% cellulose.

In some embodiments, said meat substitute product contains no soy protein, and less than 5% insoluble carbohydrates.

In some embodiments, said meat substitute product contains no wheat gluten, and less than 1% cellulose.

In some embodiments, said meat substitute product contains no wheat gluten, and less than 5% insoluble carbohydrates.

In another aspect, the invention provides a muscle tissue replica comprising a protein content, wherein said protein content comprises one or more isolated and purified proteins, wherein said muscle tissue replica approximates the taste, texture, or color of an equivalent muscle tissue derived from an animal source.

In some embodiments, said one or more isolated and purified proteins accounts for at least 50% of said protein content by weight. In some embodiments, said one or more isolated and purified proteins accounts for at least 40% of said protein content by weight. In some embodiments, said one or more isolated and purified proteins accounts for at least 30% of said protein content by weight. In some embodiments, said one or more isolated and purified proteins accounts for at least 20% of said protein content by weight. In some embodiments, said one or more isolated and purified proteins accounts for at least 10% of said protein content by weight.

In some embodiments, said one or more isolated and purified proteins accounts for at least 50% of said composition content by weight. In some embodiments, said one or more isolated and purified proteins accounts for at least 40% of said composition content by weight. In some embodiments, said one or more isolated and purified proteins accounts for at least 30% of said composition content by weight. In some embodiments, said one or more isolated and purified proteins accounts for at least 20% of said composition content by weight. In some embodiments, said one or more isolated and purified proteins accounts for at least 10% of said composition content by weight. In some embodiments, said one or more isolated and purified proteins accounts for at least 5% of said composition content by weight. In some embodiments, said one or more isolated and purified proteins accounts for at least 1% of said composition content by weight.

In some embodiments, said protein content is derived from one or more non-animal sources.

In particular embodiments, said one or more non-animal sources is a plant source.

In other particular embodiments, said one or more non-animal sources is a genetically modified yeast or bacteria.

In some embodiments, each of said one or more isolated proteins is isolated and purified separately.

In some embodiments, said one or more isolated proteins are selected from the group consisting of hemoglobin, myoglobin, chlorocruorin, erythrocruorin, neuroglobin, cytoglobin, protoglobin, truncated 2/2 globin, HbN, cyanoglobin, HbO, Glb3, and cytochromes, Hell's gate globin I, bacterial hemoglobins, ciliate myoglobins, flavohemoglobins, ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, glyceraldehyde-3-phosphate dehydrogenases, pyruvate decarboxylases, actins, translation elongation factors, ribulose-1,5-bisphosphate carboxylase oxygenase (rubisco), ribulose-1,5-bisphosphate carboxylase oxygenase activase (rubisco activase), albumins, glycinins, conglycinins, globulins, vicilins, conalbumin, gliadin, glutelin, gluten, glutenin, hordein, prolamin, phaseolin (protein), proteinoplast, secalin, extensins, triticeae gluten, zein, any seed storage protein, oleosins, caloleosins, steroleosins or other oil body proteins, vegetative storage protein A, vegetative storage protein B, moong seed storage 8S globulin.

In one embodiment, said seed storage protein is moong bean 8S protein.

In some embodiments, said protein content is suspended in a gel.

In some embodiments, said protein content is in the form of a gel.

In one embodiment, said gel comprises an isolated, purified cross-linking enzyme.

In some embodiments, said isolated, purified cross-linking enzyme is selected from the group consisting of transglutaminase, lysyl oxidases, and amine oxidases.

In a particular embodiment, said isolated, purified cross-linking enzyme is transglutaminase.

In some embodiments, said protein content has been assembled into fibers.

In particular embodiments, said fibers are arranged isotropically.

In one embodiment, said fibers are asymmetric fibers.

In some embodiments, the muscle tissue replica further comprises one or more isolated and purified iron-containing proteins.

In some embodiments, said one or more isolated and purified iron-containing proteins is selected from the group consisting of hemoglobin, myoglobin, leghemoglobin, non-symbiotic hemoglobin, chlorocruorin, erythrocruorin, neuroglobin, cytoglobin, protoglobin, truncated 2/2 globin, HbN, cyanoglobin, HbO, Glb3, and cytochromes, Hell's gate globin I, bacterial hemoglobins, ciliate myoglobins, flavohemoglobins.

In a particular embodiment, said one or more isolated and purified iron-containing proteins comprises an amino acid sequence with at least 70% homology to SEQ ID NO 1. SEQ ID NO 1: MVAFTEKQDALVSSSFEAFKA-NIPQYSVVFYTSILEKAPAAKDLF SFLANGVDPTNPKLTGHAE KLFALVRD-SAGQLKASGTVVADAAL-GSVHAQKAVTDPQFVVVKEALLKTI-KAAVGDKWSDE LSRAWEVAYDELAAAIKKA. In a particular embodiment, said one or more isolated and purified iron-containing proteins comprises an amino acid sequence with at least 80% homology to SEQ ID NO 1. In a particular embodiment, said one or more isolated and purified iron-containing proteins comprises an amino acid sequence with at least 90% homology to SEQ ID NO 1. In a particular embodiment, said one or more isolated and purified iron-containing proteins comprises an amino acid sequence with at least 95% homology to SEQ ID NO 1. In a particular embodiment, said one or more isolated and purified iron-containing proteins comprises an amino acid sequence with at least 98% homology to SEQ ID NO 1.

In particular embodiments, the muscle tissue replica comprises a protein content, wherein (i) one isolated and purified protein that is not an iron-containing protein accounts for 40-95% of said protein content, (ii) one or more isolated and purified iron-containing proteins accounts for 1-20% of said protein content, and (iii) one or more cross-linking reagents accounts for 0.1-35% of said protein content.

In one embodiment, said protein content accounts for 5-50% of said replica by weight or by weight/volume.

In one embodiment, said one isolated and purified protein is moong bean 8S protein.

In one embodiment, said one or more isolated and purified iron-containing proteins is leghemoglobin.

In one embodiment, said one or more cross-linking reagents is transglutaminase.

In some embodiments, the muscle tissue replica contains no methylcellulose, no carrageenan, no caramel color, no konjac flour, no gum arabic, and no acacia gum.

In particular embodiments, the muscle tissue replica additionally contains less than 1% wheat gluten. In particular embodiments, the muscle tissue replica additionally contains less than 5% wheat gluten. In particular embodiments, the muscle tissue replica additionally contains less than 10% wheat gluten. In particular embodiments, the muscle tissue replica additionally contains less than 0.1% wheat gluten.

In a more particular embodiment, said muscle tissue replica contains no wheat gluten.

In other particular embodiments, said muscle tissue replica contains no soy protein isolate.

In other particular embodiments, said muscle tissue replica contains no soy protein concentrate.

In other particular embodiments, said muscle tissue replica contains no soy protein.

In a more particular embodiment, said muscle tissue replica contains less than 5% carbohydrates.

In other particular embodiments, said muscle tissue replica contains no tofu.

In some embodiments, said muscle tissue replica contains no tofu, and no wheat gluten.

In some embodiments, said muscle tissue replica contains no soy protein, and no wheat gluten.

In some embodiments, said muscle tissue replica contains no animal products and less than 5% carbohydrates.

In some embodiments, said muscle tissue replica contains less than 1% cellulose.

In some embodiments, said muscle tissue replica contains less than 5% insoluble carbohydrates.

In some embodiments, said muscle tissue replica contains no soy protein, and less than 1% cellulose.

In some embodiments, said muscle tissue replica contains no soy protein, and less than 5% insoluble carbohydrates.

In some embodiments, said muscle tissue replica contains no wheat gluten, and less than 1% cellulose.

In some embodiments, said muscle tissue replica contains no wheat gluten, and less than 5% insoluble carbohydrates.

In some embodiments, the muscle tissue replica contains no methylcellulose, no carrageenan, no caramel color, no konjac flour, no gum arabic, and no acacia gum.

In particular embodiments, the meat replica contains less than 1% wheat gluten. In particular embodiments, the meat replica contains less than 5% wheat gluten. In particular embodiments, the meat replica contains less than 10% wheat gluten. In particular embodiments, the meat replica contains less than 0.1% wheat gluten.

In a more particular embodiment, the meat replica contains no wheat gluten.

In other particular embodiments, the meat replica contains no soy protein isolate.

In other particular embodiments, the meat replica contains no soy protein concentrate.

In other particular embodiments, the meat replica contains no soy protein.

In a more particular embodiment, the meat replica contains less than 5% carbohydrates.

In other particular embodiments, the meat replica contains no tofu.

In some embodiments, the meat replica contains no tofu, and no wheat gluten.

In some embodiments, the meat replica contains no soy protein, and no wheat gluten.

In some embodiments, the meat replica contains no animal products and less than 5% carbohydrates.

In some embodiments, the meat replica contains less than 1% cellulose. In some embodiments, the meat replica contains less than 0.1% cellulose. In some embodiments, the meat replica contains less than 10% cellulose. In some embodiments, the meat replica contains less than 5% cellulose.

In some embodiments, the meat replica contains less than 5% insoluble carbohydrates.

In some embodiments, the meat replica contains no soy protein, and less than 1% cellulose.

In some embodiments, the meat replica contains no soy protein, and less than 5% insoluble carbohydrates.

In some embodiments, the meat replica contains no wheat gluten, and less than 1% cellulose.

In some embodiments, the meat replica contains no wheat gluten, and less than 5% insoluble carbohydrates.

In another aspect, the invention provides a fat tissue replica comprising a gelled emulsion, said gelled emulsion comprising a protein solution with fat droplets suspended therein.

In some embodiments, said fat droplets are derived from a non-animal source.

In some embodiments, said fat droplets are comprised of one or more plant oils.

In some embodiments, said one or more plant oils is selected from the group consisting of corn oil, olive oil, soy oil, peanut oil, walnut oil, almond oil, sesame oil, cottonseed oil, rapeseed oil, canola oil, safflower oil, sunflower oil, flax seed oil, algal oil, palm oil, palm kernel oil, coconut oil, babassu oil, shea butter, mango butter, cocoa butter, wheat germ oil, rice bran oil, oils produced by bacteria, algae, archaea or fungi or genetically engineered bacteria, algae, archaea or fungi, triglycerides, monoglycerides, diglycerides, sphingosides, glycolipids, lecithin, lysolecithin, phophatidic acids, lysophosphatidic acids, oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, conjugated oleic acid, or esters of: oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid, or glycerol esters of oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid, or triglyceride derivatives of oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid.

In one embodiment, said one or more plant oils is rice bran oil or canola oil.

In some embodiments, said protein solution comprises one or more isolated, purified proteins.

In some embodiments, said one or more isolated, purified proteins accounts for 75% or more of the protein in said protein solution.

In some embodiments, said one or more isolated, purified proteins are derived from a non-animal source.

In some embodiments, said non-animal source is a plant source.

In some embodiments, said non-animal source is a genetically modified yeast or bacteria.

In some embodiments, each of said one or more isolated proteins is isolated and purified separately.

In some embodiments, said one or more isolated proteins are selected from the group consisting of hemoglobin, myoglobin, chlorocruorin, erythrocruorin, neuroglobin, cytoglobin, protoglobin, truncated 2/2 globin, HbN, cyanoglobin, HbO, Glb3, and cytochromes, Hell's gate globin I, bacterial hemoglobins, ciliate myoglobins, flavohemoglobins, ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, glyceraldehyde-3-phosphate dehydrogenases, pyruvate decarboxylases, actins, translation elongation factors, ribulose-1,5-bisphosphate carboxylase oxygenase (rubisco), ribulose-1,5-bisphosphate carboxylase oxygenase activase (rubisco activase), albumins, glycinins, conglycinins, globulins, vicilins, conalbumin, gliadin, glutelin, gluten, glutenin, hordein, prolamin, phaseolin (protein), proteinoplast, secalin, extensins, triticeae gluten, zein, any seed storage protein, oleosins, caloleosins, steroleosins or other oil body proteins, vegetative storage protein A, vegetative storage protein B, moong seed storage 8S globulin.

In some embodiments, said one or more isolated, purified proteins is an albumin protein, a seed storage protein, or pea globulin protein.

In particular embodiments, said albumin protein is isolated pea albumin protein.

In some embodiments, said seed storage protein is moong bean 8S protein.

In some embodiments, said gelled emulsion comprises a protein solution comprising 1-3 isolated and purified proteins, wherein said solution accounts for 30-70% of the volume of said emulsion; a plant oil, wherein said plant oil accounts for 30-70% of the volume of said emulsion; and an isolated, purified cross-linking enzyme, wherein said cross-linking enzyme accounts for 0.5-5% of said emulsion by wt/volume; wherein said plant oil is emulsified in said protein solution, wherein said emulsion is formed into a gel by said cross-linking enzyme.

In other embodiments said gelled emulsion comprises a protein solution comprising 1-3 isolated and purified proteins, wherein said solution accounts for 1-30% of the volume of said emulsion; a plant oil, wherein said plant oil accounts for 70-99% of the volume of said emulsion; and an isolated, purified cross-linking enzyme, wherein said cross-linking enzyme accounts for 0.5-5% of said emulsion by wt/volume; wherein said plant oil is emulsified in said protein solution, wherein said emulsion is formed into a gel by said cross-linking enzyme.

In some embodiments, the fat replica further comprises a cross-linking enzyme.

In some embodiments, said cross-linking enzyme is transglutaminase.

In some embodiments, one of said 1-3 isolated and purified proteins is moong bean 8S protein, pea albumin protein, or pea globulin protein.

In particular embodiments, said plant oil is rice bran oil or canola oil.

In some embodiments, the fat tissue replica contains no methylcellulose, no carrageenan, no caramel color, no konjac flour, no gum arabic, and no acacia gum.

In particular embodiments, the fat tissue replica additionally contains less than 1% wheat gluten.

In a more particular embodiment, said fat tissue replica contains no wheat gluten.

In other particular embodiments, said fat tissue replica contains no soy protein isolate.

In other particular embodiments, said fat tissue replica contains no soy protein concentrate.

In other particular embodiments, said fat tissue replica contains no soy protein.

In a more particular embodiment, said fat tissue replica contains less than 5% carbohydrates.

In other particular embodiments, said fat tissue replica contains no tofu.

In some embodiments, said fat tissue replica contains no tofu, and no wheat gluten.

In some embodiments, said fat tissue replica contains no soy protein, and no wheat gluten.

In some embodiments, said fat tissue replica contains no animal products and less than 5% carbohydrates.

In some embodiments, said fat tissue replica contains less than 1% cellulose.

In some embodiments, said fat tissue replica contains less than 5% insoluble carbohydrates.

In some embodiments, said fat tissue replica contains no soy protein, and less than 1% cellulose.

In some embodiments, said fat tissue replica contains no soy protein, and less than 5% insoluble carbohydrates.

In some embodiments, said fat tissue replica contains no wheat gluten, and less than 1% cellulose.

In some embodiments, said fat tissue replica contains no wheat gluten, and less than 5% insoluble carbohydrates.

In another aspect, the invention provides a connective tissue replica, comprising a protein content comprising one or more isolated, purified proteins, wherein said protein content has been assembled into structures approximating the texture and visual appearance of connective tissue or skin.

In some embodiments, said protein content is derived from non-animal source.

In some embodiments, said non-animal source is a plant source.

In some embodiments, said non-animal source is a genetically modified yeast or bacteria.

In some embodiments, said one or more isolated proteins account for 50% or more of said protein content by weight.

In some embodiments, said one isolated and purified protein accounts for 90% or more of said protein content by weight.

In some embodiments, each of said one or more isolated proteins is isolated and purified separately.

In some embodiments, said one or more isolated proteins are selected from the group consisting of hemoglobin, myoglobin, chlorocruorin, erythrocruorin, neuroglobin, cytoglobin, protoglobin, truncated 2/2 globin, HbN, cyanoglobin, HbO, Glb3, and cytochromes, Hell's gate globin I, bacterial hemoglobins, ciliate myoglobins, flavohemoglobins, ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, glyceraldehyde-3-phosphate dehydrogenases, pyruvate decarboxylases, actins, translation elongation factors, ribulose-1,5-bisphosphate carboxylase oxygenase (rubisco), ribulose-1,5-bisphosphate carboxylase oxygenase activase (rubisco activase), albumins, glycinins, conglycinins, globulins, vicilins, conalbumin, gliadin, glutelin, gluten, glutenin, hordein, prolamin, phaseolin (protein), proteinoplast, secalin, extensins, triticeae gluten, zein, any seed storage protein, oleosins, caloleosins, steroleosins or other oil body proteins, vegetative storage protein A, vegetative storage protein B, moong seed storage 8S globulin.

In some embodiments, said one or more isolated and purified proteins is a prolamin family protein.

In some embodiments, said one or more isolated and purified proteins is zein.

In some embodiments, said protein content is suspended in a gel.

In some embodiments, said gel comprises an isolated, purified cross-linking enzyme.

In some embodiments, said isolated, purified cross-linking enzyme is selected from the group consisting of transglutaminase, lysyl oxidases, and amine oxidases.

In some embodiments, said isolated, purified cross-linking enzyme is transglutaminase.

In some embodiments, said protein content is formed into a fiber.

In some embodiments, said fiber is produced by an extrusion process.

In some embodiments, said fiber is stabilized by protein crosslinks.

In some embodiments, fiber contains an isolated, purified cross-linking enzyme.

In some embodiments, said isolated, purified cross-linking enzyme is selected from the group consisting of transglutaminase, lysyl oxidases, and amine oxidases.

In some embodiments, said isolated, purified cross-linking enzyme is transglutaminase.

In another aspect, the invention provides a meat substitute product, comprising a muscle replica; a fat tissue replica; and a connective tissue replica; wherein said muscle replica, fat tissue replica, and/or connective tissue replica are assembled in a manner that approximates the physical organization of meat.

In some embodiments, the meat substitute product comprises two or more of said muscle replica, fat tissue replica, and connective tissue replica.

In some embodiments of the meat substitute product, said muscle replica accounts for 40-90% of said product by weight, said fat tissue replica accounts for 1-60% of said product by weight, and said connective tissue replica accounts for 1-30% of said product by weight.

In some embodiments, the meat substitute product comprises 60-90% water; 5-30% protein content; and 1-20% of a fat or fat replica; wherein said protein content comprises one or more isolated, purified plant proteins.

In some embodiments, said protein content is derived from non-animal source.

In some embodiments, non-animal source is a plant source.

In some embodiments, said non-animal source is a genetically modified yeast or bacteria.

In some embodiments, 50% or more of said protein content by weight are one or more isolated purified proteins.

In some embodiments, each of said one or more isolated proteins is isolated and purified separately from different plant species.

In some embodiments, one or more of said isolated proteins is selected from the group consisting of: hemoglobin, myoglobin, chlorocruorin, erythrocruorin, neuroglobin, cytoglobin, protoglobin, truncated 2/2 globin, HbN, cyanoglobin, HbO, Glb3, and cytochromes, Hell's gate globin I, bacterial hemoglobins, ciliate myoglobins, flavohemoglobins, ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, glyceraldehyde-3-phosphate dehydrogenases, pyruvate decarboxylases, actins, translation elongation factors, ribulose-1,5-bisphosphate carboxylase oxygenase (rubisco), ribulose-1,5-bisphosphate carboxylase oxygenase activase (rubisco activase), albumins, glycinins, conglycinins, globulins, vicilins, conalbumin, gliadin, glutelin, gluten, glutenin, hordein, prolamin, phaseolin (protein), proteinoplast, secalin, extensins, triticeae gluten, zein, any seed storage protein, oleosins, caloleosins, steroleosins or other oil body proteins, vegetative storage protein A, vegetative storage protein B, moong seed storage 8S globulin.

In some embodiments, the meat substitute product further comprises one or more isolated and purified iron-containing proteins.

In some embodiments, said one or more isolated and purified iron-containing proteins is selected from the group consisting of hemoglobin, myoglobin, leghemoglobin, non-symbiotic hemoglobin, chlorocruorin, erythrocruorin, neuroglobin, cytoglobin, protoglobin, truncated 2/2 globin, HbN, cyanoglobin, HbO, Glb3, and Hell's gate globin I, bacterial hemoglobins, ciliate myoglobins, flavohemoglobins,. In some embodiments, said iron-containing protein comprises an amino acid sequence with at least 70% homology to SEQ ID NO 1. SEQ ID NO 1: MVAFTEKQDALVSSSFEAFKANIPQYSVVFYTSILEK-APAAKDLFSFLANGVDPTNPKLTGHAEKLFALVRDS-AGQLKASGTVVADAALGSVHAQKAVTDPQFVVVK-EALLKTIKAAVGDKWSDELSRAWEVAYDELAAAIK-KA In some embodiments, the meat substitute product contains no methylcellulose, no carrageenan, no caramel color, no konjac flour, no gum arabic, and no acacia gum.

In particular embodiments, the meat substitute product additionally contains less than 1% wheat gluten.

In a more particular embodiment, said meat substitute product contains no wheat gluten.

In other particular embodiments, said meat substitute product contains no soy protein isolate.

In other particular embodiments, said meat substitute product contains no soy protein concentrate.

In other particular embodiments, said meat substitute product contains no soy protein.

In a more particular embodiment, said meat substitute product contains less than 5% carbohydrates.

In other particular embodiments, said meat substitute product contains no tofu.

In some embodiments, said meat substitute product contains no tofu, and no wheat gluten.

In some embodiments, said meat substitute product contains no soy protein, and no wheat gluten.

In some embodiments, said meat substitute product contains no animal products and less than 5% carbohydrates.

In some embodiments, said meat substitute product contains less than 1% cellulose.

In some embodiments, said meat substitute product contains less than 5% insoluble carbohydrates.

In some embodiments, said meat substitute product contains no soy protein, and less than 1% cellulose.

In some embodiments, said meat substitute product contains no soy protein, and less than 5% insoluble carbohydrates.

In some embodiments, said meat substitute product contains no wheat gluten, and less than 1% cellulose.

In some embodiments, said meat substitute product contains no wheat gluten, and less than 5% insoluble carbohydrates.

In another aspect, the invention provides a food product comprising one or more isolated, purified iron-containing proteins, wherein said food product is configured for consumption by an animal.

In some embodiments, said one or more isolated, purified iron-containing proteins is derived from a non-animal source.

In some embodiments, said non-animal source is a plant source.

In some embodiments, said plant source comprises one or more plants of the legume family.

In some embodiments, said one or more plants of the legume family is a soy or pea plant.

In some embodiments, said non-animal source is a genetically modified yeast or bacteria.

In some embodiments, said iron-containing protein is selected from the group consisting of hemoglobin, myoglobin, leghemoglobin, non-symbiotic hemoglobin, chlorocruorin, erythrocruorin, neuroglobin, cytoglobin, protoglobin, truncated 2/2 globin, HbN, cyanoglobin, HbO, Glb3, and cytochromes, Hell's gate globin I, bacterial hemoglobins, ciliate myoglobins, flavohemoglobins.

In one embodiment, said iron-containing protein comprises an amino acid sequence with at least 70% homology to SEQ ID NO 1. SEQ ID NO 1:
MVAFTEKQDALVSSSFEAFKANIPQYSVVFYTSILEK-
APAAKDLFSFLANGVDPTNPKLTGHAEKLFALVRDS-
AGQLKASGTVVADAALGSVHAQKAVTDPQFVVVK-
EALLKTIKAAVGDKWSDELSRAWEVAYDELAAAIK-
KA In some embodiments, the food product contains no methylcellulose, no carrageenan, no caramel color, no konjac flour, no gum arabic, and no acacia gum.

In particular embodiments, the food product additionally contains less than 1% wheat gluten.

In a more particular embodiment, said food product contains no wheat gluten.

In other particular embodiments, said food product contains no soy protein isolate.

In other particular embodiments, said food product contains no soy protein concentrate.

In other particular embodiments, said food product contains no soy protein.

In a more particular embodiment, said food product contains less than 5% carbohydrates.

In other particular embodiments, said food product contains no tofu.

In some embodiments, said food product contains no tofu, and no wheat gluten.

In some embodiments, said food product contains no soy protein, and no wheat gluten.

In some embodiments, said food product contains no animal products and less than 5% carbohydrates.

In some embodiments, said food product contains less than 1% cellulose.

In some embodiments, said food product contains less than 5% insoluble carbohydrates.

In some embodiments, said food product contains no soy protein, and less than 1% cellulose.

In some embodiments, said food product contains no soy protein, and less than 5% insoluble carbohydrates.

In some embodiments, said food product contains no wheat gluten, and less than 1% cellulose.

In some embodiments, said food product contains no wheat gluten, and less than 5% insoluble carbohydrates.

In another aspect, the invention provides a method of making a meat substitute composition, comprising isolating and purifying one or more proteins; and assembling said one or more proteins into a physical organization that approximates the physical organization of meat.

In another aspect, the invention provides a method of making a muscle tissue replica, comprising isolating and purifying one or more proteins; and assembling said one or more proteins into a physical organization that approximates the physical organization of skeletal muscle.

In another aspect, the invention provides a method of making a fat tissue replica, comprising isolating and purifying one or more proteins; preparing a solution comprising one or more proteins; emulsifying one or more fats in said solution; and stabilizing said solution into a gelled emulsification with one or more cross-linking reagents.

In another aspect, the invention provides a method of making a connective tissue replica, comprising isolating and purifying one or more proteins; and precipitating said one or more proteins, wherein said precipitating results in said one or more proteins forming physical structures approximating the physical organization of connective tissue.

In some embodiments, said precipitating comprises solubilizing said one or more proteins in a first solution; and extruding said first solution into a second solution, wherein said one or more proteins is insoluble in said second solution, wherein said extruding induces precipitation of said one or more proteins.

In another aspect, the invention provides a food product comprising one or more isolated, purified iron-containing proteins, wherein said food product is configured for consumption by an animal.

In another aspect, the invention provides a food product comprising one or more isolated, purified iron-containing proteins, wherein said food product is configured for consumption by humans.

In another aspect, the invention provides a food product comprising one or more isolated, purified iron-containing proteins, wherein said food product is configured for consumption by an animal. In another aspect, the invention provides a food product comprising one or more isolated, purified iron-containing proteins, wherein said food product is configured for consumption by humans.

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

In FIG. 3, panel A shows an SDS_PAGE gels of lysed root-nodules of three legume plant species (1) Fava bean (2) English Pea (3) Soybean. Arrows mark respective leghemoglobins. Panel B shows the similarity of UV-VIS spectral profile of leghemoglobins from two different plant species (Favabean and Soybean).

(FIG. 4 panel C). Images of 10 µl liquid droplet of a 40 mg/ml solution of soybean leghemoglobin in the heme-Fe3+ state (left droplet) showing characteristic rusty red color and a 40 mg/ml solution of soybean leghemoglobin solution in the heme-Fe2+ state (right droplet) showing characteristic red color of and (right image) corresponding samples of equine myoglobin.

In FIG. 5 the UV-VIS spectrogram of purified soybean leghemoglobin in which the heme iron is in the oxidized (+3) state is represented by the blue curves in each panel (the blue curves have the higher peaks on the main graphs). The red curves in each panel represent the UV-VIS spectra of the same leghemoglobin species after reduction to the (+2) state (red lines) by addition of (Panel A) 1 mM sodium hydrosulfite or (Panel B) 0.24% (wt/v) titanium citrate in 20 mM potassium phosphate pH 7.3, 100 mM sodium chloride buffer. The Insets show a zoom-in of UV-VIS spectra in 450-700 nm region. For this example, leghemoglobin was purified from soybean root nodules using 60/90% ammonium sulfate fractionation and exchanged into 20 mM potassium phosphate pH 7.4, 100 mM sodium chloride buffer. Sodium hydrosulfite stock solution was prepared by dissolving 100 mM sodium hydrosulfite in 1 mM sodium hydroxide in water. Titanium citrate stock solution was prepared from 20% (wt/v) Ti-chloride in hydrochloric acid by mixing it with 0.2M sodium citrate (1:10 v/v). pH was adjusted using sodium carbonate to pH 7.0.

DETAILED DESCRIPTION OF THE INVENTION

Figure 1:
FIG. 1 depicts a portion of the root of a pea plant (*Pisum sativum*) with the root nodules sliced open to demonstrate the red color conferred by leghemoglobin contained therein. The sliced open rood nodule appears red.

Methods and compositions for the production of consumables are described herein. The consumables can be for animal consumption. For example the consumable can be food fit for human consumption. The consumable can be approved by suitable regulatory authorities. The consumables can be sold in grocery stores or prepared in restaurants, schools, hospitals, military facilities, prisons, shelters, long-term care facilities, similar to already existing human foods. The consumables could also be food for domestic animals. For instance, dog food could be produced according to the present inventions. The consumables may also be food for wild animals. For instance, the consumables could be provided to non-domesticated predatory animals.

The consumables of the present invention can compete with, supplement or replace animal based foods. For instance the consumables can be meat replicas made entirely from plant sources. The consumables can be made to mimic the cut or appearance of meat as it is currently sold. For instance a consumable may be visually similar to or indistinguishable from ground beef or a particular cut of beef. Alternatively, the consumables can be made with a unique look or appearance. For instance the consumable could contain patterns or lettering that is based upon the structure of the consumable. In some instances the consumables look like traditional meat products after they are prepared. For example a consumable may be produced which is larger than a traditional cut of beef but which, after the consumable is sliced and cooked appears the same as a traditional cooked meet. In some embodiments the consumable may resemble a traditional meat shape in two dimensions, but not in a third. For example the consumable may resemble a cut of meat in two dimensions (for example when viewed from the top), but may be much longer (or thinker) than the traditional cut. So in some embodiments a composition that can be cut repeatedly into traditionally meat shaped products is provided.

The consumable may be made entirely from plant based sources. In some instances the consumable can be made from organic sources. The consumables may also be made from a combination of plant based sources and animal based sources. For instance, the consumable may be a ground beef product supplemented with plant based products of the invention.

The consumables can be made from local products. For instance the consumables can be made from plants grown within a certain radius of the eventual consumer. That radius could be 1, 10, 100, or 1000 miles for example. So, in some embodiments, the invention provides a method for producing a meat replica which does not contain products which have been shipped over 1, 10, 100, or 1000 miles prior to producing the meat replica.

The present invention provides methods for producing consistent properties from the consumables when they are produced from various sources. So, for example, a plant based meat replica produced from local plants in Iowa, USA, will have substantially similar taste, odor, and texture as a plant based meat replica produced from local plants in Lorraine, France. This consistency allows for methods for advertising locally grown foods with consistent properties. The consistency can arise from the concentration or purification of similar components at different locations. These components can be combined in predetermined ratios to insure consistency. In some embodiments a high degree of characteristic consistency is possible using components (e.g. isolated or concentrated proteins and fats) which come from the same plant species. In some embodiments a high degree of characteristic consistency is possible using components (e.g. isolated or concentrated proteins and fats) which come from the different plant species. In some embodiments the same proteins can be isolated from different plant species. In some embodiments the invention provides for a method comprising isolating similar plant constituents from plant sources in different locations, assembling in both locations compositions provided herein, and selling the compositions, wherein the compositions assembled and sold at different the geographic locations have consistent physical and chemical properties. In some embodiments the isolated constituents are from different plant populations in different locations. In some embodiments one or more of the isolated constituents are shipped to the separate geographic locations.

The consumables may require fewer resources to produce than consumables produced from domesticated animals. Accordingly, the present invention provides for meat replicates which require less water or energy to produce than meat. For example a consumable can require less than about 10, 50, 100, 200, 300, 500, or 1000 gallons of water per pound of consumable. For comparison beef can require over 2000 gallons of water per pound of meat.

The consumable may require less land are to produce than a meat product with similar protein content. For example the consumable may require 30% or less of the land area required to produce a meat product with similar protein content.

The consumable may have health benefits compared to an animal product it replaces in the diet. For example it may have less cholesterol or lower levels of saturated fats than comparable meat products.

The consumable may have animal welfare benefits compared to an animal product it replaces in the diet. For instance it may be produced without requiring confinement, forced feeding, premature weaning, disruption of maternal-offspring interactions, or slaughter of animals for their meat.

The consumable may have a smaller "carbon footprint" than the meat products they replace. For example the consumable may result in net greenhouse gas emissions of 1%, 5%, 10%, 25%, 50% or 75% of the greenhouse gas emissions attributable to the animal product it replaces.

The consumable may provide alternatives to animal products or combinations of animal products whose consumption is forbidden by religious beliefs. For example, the consumable may be a kosher pork chop.

The consumable can also be shipped in components and produced or assembled at a different location. When available local components can be used for production of the consumable. These can be supplemented with components which are not locally available. This allows for methods of producing consumables, for instance meat replicates, using less energy in shipment than is required for meat. For example, local water can be used in combination with a kit which provides other components of the consumable. Using local water will reduce shipping weight thereby reducing cost and environmental impact.

The consumables can be produced or assembled wholly or in part in areas where animal farming is not practical or is not allowed. The consumable can be produced or assembled within an urban environment. For example a kit may be provided to a user to enable the user to produce the consumable. The user could use local water or use plants from a rooftop garden, for instance in Shanghai. In another example, the consumables could be produced aboard a space craft, space station, or lunar base. Accordingly, the present invention provides methods and systems for the production of meat replicas for use in space travel or for training for the same. For instance the present invention could be used in earth based training for space travel. The consumables could also be produced on an island or upon a manmade platform at sea where the keeping of livestock is difficult or prohibited.

The consumables are, in some embodiments, designed to replicate the experience of eating meat. The look, texture, and taste of the consumable can be such that it is similar or indistinguishable from meat. The invention therefore provides in certain embodiments methods for determining whether an animal or human can distinguish the consumable from meat.

One method to determine whether the consumable is comparable to meat is to a) define the properties of meat and b) determine whether the consumable has similar properties. Properties of meat that can be tested include mechanical properties such as hardness, cohesiveness, brittleness, chewiness, gumminess, viscosity, elasticity, and adhesiveness. Properties of meat that can be tested also include geometric properties such as particle size and shape, and particle shape and orientation. Additional properties can include moisture content and fat content. These properties can be described using terms such as "soft," "firm" or "hard" describe hardness; "crumbly," "crunchy," "brittle," "chewy," "tender," "tough," "short," "mealy," "pasty," or "gummy," to describe cohesiveness; "thin" or "viscous" to describe viscosity; "plastic" or "elastic" to describe elasticity; "sticky," "tacky" or "gooey" to describe adhesiveness; "gritty," "grainy" or "course" to describe particle shape and size; "fibrous," "cellular" or "crystalline" to describe particle shape and orientation, "dry," "moist," "wet," or "watery" to describe moisture content; or "oily" or "greasy" to describe fat content. So, in one embodiment a group of people can be asked to rate a certain meat, for instance ground beef, according to properties which describe the meat. These ratings can be used as an indication of the properties of the meat. The consumables of the present invention can then be compared to the meat to determine how similar the consumable is to the meat. In some instances the properties of the consumables are then altered to make the consumable more similar to the meat. So, in some embodiments, the consumable is rated similar to meat according to human evaluation. In some embodiments the consumable is indistinguishable from real meat to a human.

In some embodiments, subjects asked to identify the consumable identify it as a form of meat. In some embodiments one property of the compositions of the invention is that an animal, for example a human, will identify the composition as a meat. In some embodiments the human identifies the composition of the invention as having properties equivalent to meat. In some embodiments one or more properties of meat are equivalent according to a human's perception. Such properties include the properties that can be tested. In some embodiments a human identifies a consumable of the present invention as more meat like than meat substitutes found in the art.

In embodiments an experiment can demonstrate that consumable s acceptable to consumers. A panel can be used to screen a variety of consumables described herein. A number of human panelists can tested multiple consumable samples, namely, natural meats vs. the consumable compositions described herein. Variables such as fat content can be standardized for example to 20% fat using lean and fat meat mixes. Fat content can be determined using the Babcock for meat method (S. S. Nielson, Introduction to the Chemical Analysis of Foods (Jones & Bartlett Publishers, Boston, 1994)). Mixtures of ground beef and consumables of the invention prepared according to the procedure described herein can be formulated.

Panelists can be served samples in booths, under red lights or under white light, in an open consumer panel. Samples can be assigned random three-digit numbers and rotated in ballot position to prevent bias. Panelists can be asked to evaluate samples for tenderness, juiciness, texture, flavor, and overall acceptability using a hedonic scale from 1=dislike extremely, to 9=like extremely, with a median of 5=neither like nor, dislike. Panelists can be encouraged to rinse their mouths with water between samples, and given opportunity to comment on each sample.

The results of this experiment can indicate significant differences ($p<0.05$) or similarities between the traditional meats and the compositions of the invention.

These results will demonstrate that the compositions of the invention are judged as acceptably equivalent to real meat products. Additionally these results can demonstrate that compositions of the invention are preferred by panelist over other commercially available meat substitutes. So, in some embodiments the present invention provides for consumables that are significantly similar to traditional meats.

Consumables of the invention can also have similar physical characteristics as traditional meat. In one embodiment the force required to pierce a 1 inch thick structure (e.g. a patty) made of a consumable of the invention with a fixed diameter steel rod is not significantly different than the force required to pierce a 1 inch thick similar meat structure (e.g. a ground beef patty) with a similar fixed diameter steel rod. Accordingly, the invention provides for consumables with similar physical strength characteristics to meat.

In some embodiments composition of the invention have a similar cook loss characteristic as meat. In one embodiment a consumable of the invention with a similar fat and protein content as ground beef has the same reduction in size when cooked as real ground beef. Similar similarities in size loss profiles can be achieved for various compositions of consumables described herein matched to various meats.

In some embodiments the consumable is compared to real meat based upon olfactometer readings. In various embodiments the olfactometer can be used to assess odor concentration and odor thresholds, odor suprathresholds with comparison to a reference gas, hedonic scale scores to determine the degree of appreciation, or relative intensity of odors. In some embodiments the olfactometer allows the training and automatic evaluation of expert panels. So in some embodiments the consumable is a product that causes similar or identical olfactometer readings. In some embodiments the similarity is sufficient to be beyond the detection threshold of human perception.

Gas chromatography-mass spectrometry (GCMS) is a method that combines the features of gas-liquid chromatography and mass spectrometry to separate and identify different substances within a test sample. GCMS can, in some embodiments, be used to evaluate the properties of a consumable. For example volatile chemicals can be isolated from the head space around meat. These chemicals can be identified using GCMS. A profile of the volatile chemicals in the headspace around meat is thereby created. In some instances each peak of the GCMS can be further evaluated. For instance, a human could rate the experience of smelling the chemical responsible for a certain peak. This information could be used to further refine the profile. GCMS could then be used to evaluate the properties of the consumable. The GCMS profile could be used to refine the consumable.

Characteristic flavor and fragrance components are mostly produced during the cooking process by chemical reactions molecules including amino acids, fats and sugars which are found in plants as well as meat. Therefore in some embodiments the consumable is tested for similarity to meat during or after cooking. In some embodiments human ratings, human evaluation, olfactometer readings, or GCMS measurements, or combinations thereof, are used to create an olfactory map of cooked meat. Similarly, an olfactory map of the consumable, for instance a meat replica, can be created. These maps can be compared to assess how similar the cooked consumable it so meat. In some embodiments the olfactory map of the consumable during or after cooking is similar to or indistinguishable from that of cooked or cooking meat. In some embodiments the similarity is sufficient to be beyond the detection threshold of human perception.

In one aspect, the invention provides a meat substitute product (alternatively referred to herein as "consumable") that is substantially or entirely composed of ingredients derived from non-animal sources, yet recapitulates key features associated with the cooking and consumption of an equivalent meat product derived from animals. The equivalent meat product can be a white meat or a dark meat. The equivalent meat product can be derived from any animal. Non-limiting examples of animals used to derive the equivalent meat product include farmed animals such as, e.g., cattle, sheep, pig, chicken, turkey, goose, duck, horse, dog or game animals (whether wild or farmed) such as, e.g., rabbit, deer, bison, buffalo, boar, snake, pheasant, quail, bear, elk, antelope, pigeon, dove, grouse, fox, wild pig, goat, kangaroo, emu, alligator, crocodile, turtle, groundhog, marmot, possum, partridge, squirrel, raccoon, whale, seal, ostrich, capybara, nutria, guinea pig, rat, mice, vole, any variety of insect or other arthropod, seafood such as, e.g, fish, crab, lobster, oyster, muscle, scallop, abalone, squid, octopus, sea urchin, tunicate and others. Many meat products are typically derived from skeletal muscle of an animal but it is understood that meat can also come from other muscles or organs of the animal. In some embodiments, the equivalent meat product is a cut of meat derived from skeletal muscle. In other embodiments, the equivalent meat product is an organ such as, e.g., a kidney, heart, liver, gallbladder, intestine, stomach, bone marrow, brain, thymus, lung, tongue. Accordingly, in some embodiments the compositions of the present invention are consumables similar to skeletal muscle or organs.

In some aspects, the present invention provides meat substitute products comprising one or more of a first composition comprising a muscle tissue replica, a second composition comprising an adipose tissue replica, and/or a third composition comprising a connective tissue replica, wherein the one or more compositions are combined in a manner that recapitulates the physical organization of meat. In other aspects, the present invention provides compositions for a muscle tissue replica (herein referred to as "muscle replica"), an adipose tissue replica (herein referred to as "fat replica"), and a connective tissue replica (herein referred to as "connective tissue replica"). In some embodiments, the compositions and meat substitute products are principally or entirely composed of ingredients derived from non-animal sources. In alternative embodiments, the muscle, fat, and/or connective tissue replica, or the meat substitute products comprising one or more of said replicas, are partially derived from animal sources but supplemented with ingredients derived from non-animal sources. In yet other alternative embodiments, the invention provides meat products substantially derived from animal sources but which are supplemented with one or more of a muscle tissue replica, a fat replica, and/or a connective tissue replica, wherein said replicas are derived substantially or entirely from non-animal sources. A non-limiting example of such a meat product is an ultra-lean ground beef product supplemented with a non-animal derived fat replica which improves texture and mouthfeel while preserving the health benefits of a consumable low in animal fat. Such alternative embodiments result in products with properties that more closely recapitulate key features associated with preparing and consuming meat but which are less costly and associated with a lesser environmental impact, less animal welfare impact, or improved health benefits for the consumer.

The physical organization of the meat substitute product can be manipulated by controlling the localization, organization, assembly, or orientation of the muscle, fat, and/or connective tissue replicas described herein. In some embodiments the product is designed in such a way that the replicas described herein are associated with one another as in meat. In some embodiments the consumable is designed so that after cooking the replicas described herein are associated with one another as in cooked meat. In some embodiments, one or more of the muscle, fat, and/or connective tissue replicas are combined in a manner that recapitulate the physical organization of different cuts or preparations of meat. In an example embodiment, the replicas are combined in a manner that approximates the physical organization of natural ground meat. In other embodiments, the replicas are combined in a manner that approximates different cuts of beef, such as, e.g., ribeye, filet mignon, London broil, among others.

Proteins and Protein Sources

In some embodiments, any of the meat substitute products, muscle tissue replica, fat replica, or connective tissue replica, comprise one or more isolated, purified proteins. In some embodiments, the meat substitute products are comprised of one or more of a muscle replica, a fat replica, and/or connective tissue replica which comprise one or more isolated, purified proteins. In other embodiments, the muscle replica, fat replica, and/or connective tissue replica comprises one or more isolated, purified proteins. In some embodiments, about 0.1%, 0.2%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 99% or more of the protein component is comprised of one or more isolated, purified proteins. For the purposes of this document, "purified protein" will refer to a preparation in which the cumulative abundance by mass of protein components other than the specified protein, which can be a single monomeric or multimeric protein species, is reduced by a factor of 2 or more, 3 or more, 5 or more, 10 or more, 20 or more, 50 or more, 100 or more or 1000 or more relative to the source material from which the specified protein was isolated.

In some embodiments, the one or more isolated, purified proteins are derived from non-animal sources. Non-limiting examples of non-animal sources include plants, funghi, bacteria, archaea, genetically modified organisms such as genetically modified bacteria or yeast, chemical or in vitro synthesis. In particular embodiments, the one or more isolated, purified proteins are derived from plant sources. Non-limiting examples of plant sources include grains such as, e.g., corn, maize, rice, wheat, barley, rye, triticale, teff, oilseeds including cottonseed, sunflower seed, safflower seed, rapeseed, leafy greens such as, e.g., lettuce, spinach, kale, collard greens, turnip greens, chard, mustard greens, dandelion greens, broccoli, cabbage, green matter not ordinarily consumed by humans, including biomass crops, including switchgrass, miscanthus, sorghum, other grasses, alfalfa, corn stover, green matter ordinarily discarded from harvested plants, sugar cane leaves, leaves of trees, root crops such as cassava, sweet potato, potato, carrots, beets, turnips, plants from the legume family, such as, e.g., clover, peas such as cowpeas, english peas, yellow peas, green peas, beans such as, e.g., soybeans, fava beans, lima beans, kidney beans, garbanzo beans, mung beans, pinto beans, lentils, lupins, mesquite, carob, soy, and peanuts, vetch (vicia), stylo (stylosanthes), arachis, indigofera, acacia, leucaena, cyamopsis, and sesbania. One of skill in the art will understand that proteins that can be isolated from any organism in the plant kingdom may be used in the present invention.

Proteins that are abundant in plants can be isolated in large quantities from one or more source plants and thus are an economical choice for use in any of the muscle, fat, connective tissue replicas, or meat substitute products. Accordingly, in some embodiments, the one or more isolated proteins comprises an abundant protein found in high levels in a plant and capable of being isolated and purified in large quantities. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70% of the total protein content of the source plant. In some embodiments, the abundant protein comprises about 0.5-10%, about 5-40%, about 10-50%, about 20-60%, or about 30-70% of the total protein content of the source plant. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50% of the total weight of the dry matter of the source plant. In some embodiments, the abundant protein comprises about 0.5-5%, about 1-10%, about 5-20%, about 10-30%, about 15-40%, about 20-50% of the total weight of the dry matter of the source plant.

In particular embodiments, the one or more isolated proteins comprises an abundant protein that is found in high levels in the leaves of plants. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80% of the total protein content of the leaves of the source plant. In some embodiments, the abundant protein comprises about 0.5-10%, about 5%-40%, about 10%-60%, about 20%-60%, or about 30-70% of the total protein content of the leaves of the source plant. In particular embodiments, the one or more isolated proteins comprise ribulose-1,5-bisphosphate carboxylase oxygenase (rubisco activase). Rubisco is a particularly useful protein for meat replicas because of its high solubility and an amino acid composition with close to the optimum proportions of essential amino acids for human nutrition. In particular embodiments, the one or more isolated proteins comprise ribulose-1,5-bisphosphate carboxylase oxygenase activase (rubisco activase). In particular embodiments, the one or more isolated proteins comprise a vegetative storage protein (VSP).

In some embodiments, the one or more isolated proteins includes an abundant protein that is found in high levels in the seeds of plants. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85% or 90% or more of the total protein content of the seeds of the source plant. In some embodiments, the abundant protein comprises about 0.5-10%, about 5%-40%, about 10%-60%, about 20%-60%, or about 30-70% or >70% of the total protein content of the seeds of the source plant. Non-limiting examples of proteins found in high levels in the seeds of plants are seed storage proteins, e.g., albumins, glycinins, conglycinins, globulins, vicilins, conalbumin, gliadin, glutelin, gluten, glutenin, hordein, prolamin, phaseolin (protein), proteinoplast, secalin, triticeae gluten, zein, any seed storage protein, oleosins, caloleosins, steroleosins or other oil body proteins In some embodiments, the one or more isolated proteins includes proteins that interact with lipids and help stabilize lipids in a structure. Without wishing to be bound by a particular theory, such proteins may improve the integration of lipids and/or fat replicas with other components of the meat substitute product, resulting in improved mouthfeel and texture of the final product. A non-limiting example of a lipid-interacting plant protein is the oleosin family of proteins. Oleosins are lipid-interacting proteins that are found in oil bodies of plants. Other non-limiting examples of plant proteins that can stabilize emulsions include seed storage proteins from Great Northern Beans, albumins from peas, globulins from peas, 8S globulins from Moong bean, 8S globulins from Kidney bean.

Muscle Replicas

A large number of meat products comprise a high proportion of skeletal muscle. Accordingly, the present invention provides a composition derived from non-animal sources which replicates or approximates key features of animal skeletal muscle. In another aspect, the present invention provides a meat substitute product that comprises a composition derived from non-animal sources which replicates or approximates animal skeletal muscle. Such a composition will be labeled herein as "muscle replica". In some embodiments, the muscle replica and/or meat substitute product comprising the muscle replica are partially derived from animal sources. In some embodiments, the muscle replica and/or meat substitute product comprising the muscle replica are entirely derived from non-animal sources.

Many meat products comprise a high proportion of striated skeletal muscle in which individual muscle fibers are organized mainly in an isotropic fashion. Accordingly, in some embodiments the muscle replica comprises fibers that are to some extent organized isotropically. In some embodiments the fibers comprise a protein component. In some embodiments, the fibers comprise about 1%, about 2%, about 5%, about 10%, about 15%, about 20%, about 30%, about 40%, about 50%, about 60%, about 70%, about 80%, about 90%, about 95%, about 99% or more of a protein component.

In some embodiments, the protein component comprises one or more isolated, purified proteins. For example the one or more isolated, purified protein can comprise the 8S globulin from Moong bean seeds, or the albumin or globulin fraction of pea seeds. These proteins provide examples of proteins with favorable properties for constructing meat replicas because of their ability to form gels with textures similar to animal muscle or fat tissue. Examples and embodiments of the one or more isolated, purified proteins are described herein. The list of potential candidates here is essentially open and may include Rubisco, any major seed storage proteins, proteins isolated from fungi, bacteria, archaea, viruses, or genetically engineered microorganisms, or synthesized in vitro. The proteins may be artificially designed to emulate physical properties of animal muscle tissue. The proteins may be artificially designed to emulate physical properties of animal muscle tissue. In some embodiments, one or more isolated, purified proteins accounts for about 0.1%, 0.2%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 99% or more of the protein component by weight.

Skeletal muscle of animals such as beef cattle typically contain substantial quantities of glycogen, which can comprise on the order of 1% of the mass of the muscle tissue at the time of slaughter. After slaughter, a fraction of this glycogen continues to be metabolized yielding products including lactic acid, which contributes to lowering the pH of the muscle tissue, a desirable quality in meat. Glycogen is a branched polymer of glucose linked together by alpha (1->4) glycosidic bonds in linear chains, with branch points comprising alpha (1->6) glycosidic bonds. Starches from plants, particularly amylopectins are also branched polymers of glucose linked together by alpha (1->4) glycosidic bonds in linear chains, with branch points comprising alpha (1->6) glycosidic bonds and can therefore be used as an analog of glycogen in constructing meat replicas. Thus in some embodiments, the muscle or meat replica includes a starch or pectin.

Additional components of animal muscle tissue include sodium, potassium, calcium, magnesium, other metal ions, lactic acid, other organic acids, free amino acids, peptides, nucleotides and sulfur compounds. Thus in some embodiments, the muscle replica can include sodium, potassium, calcium, magnesium, other metal ions, lactic acid, other organic acids, free amino acids, peptides, nucleotides and sulfur compounds. In some embodiments the concentration of sodium, potassium, calcium, magnesium, other metal ions, lactic acid, other organic acids, free amino acids, peptides, nucleotides and/or sulfur compounds in the muscle replica or consumable are within 10% of the concentrations found in a muscle or meat being replicated.

In another aspect, the invention provides methods for making a muscle replica. In some embodiments, the composition is formed into asymmetric fibers prior to incorporation into the consumable. In some embodiments these fibers replicate muscle fibers. In some embodiments the fibers are spun fibers. In other embodiments the fibers are extruded fibers. Accordingly, the present invention provides for methods for producing asymmetric or spun protein fibers. In some embodiments, the fibers are formed by extrusion of the protein component through an extruder. Methods of extrusion are well known in the art, and are described in U.S. Pat. Nos. 6,379,738, 3,693,533, US20120093994, which are herein incorporated by reference.

In some embodiments extrusion can be conducted using an MPF19 twin-screw extruder (APV Baker, Grand Rapids, Mich.) with a cooling die. The cooling die can cool the extrudate prior to return of the extrudate to atmospheric pressure, thus substantially inhibiting expansion or puffing of the final product. In the MPF19 apparatus, dry feed and liquid can be added separately and mixed in the barrel. Extrusion parameters can be, for example: screw speed of 200 rpm, product temperature at the die of 150 C., feed rate of 23 g/min, and water-flow rate of 11 g/min. Product temperature can be measured during extrusion by a thermocouple at the end of the extrusion barrel. Observations can be made on color, opacity, structure, and texture for each collected sample. Collected samples can be optionally dried at room temperature overnight, then ground to a fine powder (<60 mesh) using a Braun food grinder. The pH of samples can be measured in duplicate using 10% (w/v) slurries of powdered sample in distilled water.

Fat Replica

Animal fat is important for the experience of eating cooked meat. Accordingly, the present invention provides a composition derived from non-animal sources which recapitulates key features of animal fat. In another aspect, the present invention provides a meat substitute product that comprises a composition derived from non-animal sources which recapitulates animal fat. Such a composition will be labeled herein as a "fat replica". In some embodiments, the fat replica and/or meat substitute product comprising the fat replica are partially derived from animal sources.

In some embodiments the meat substitute product has a fat component. In some embodiments the fat content of the consumable is 1%, 5%, 10%, 15%, 20%, 25%, 30%, 35%, 40%, 45%, 50%, 55%, or 60% fat. In some embodiments, the fat replica comprises a gel with droplets of fat suspended therein. In some embodiments, the gel is a soft, elastic gel comprising proteins and optionally carbohydrates. In particular embodiments, the proteins used in the gel are plant or microbial proteins. In some embodiments, the proteins used in the fat replica might include Rubisco, any major seed storage proteins, proteins isolated from fungi, bacteria, archaea, viruses, or genetically engineered microorganisms, or synthesized in vitro. The proteins may be artificially designed to emulate physical properties of animal fat. The proteins may be artificially designed to emulate physical properties of animal fat.

The fat droplets used in some embodiments of the present invention can be from a variety of sources. In some embodiments, the sources are non-animal sources. In particular embodiments, the sources are plant sources. Non-limiting examples of oils include corn oil, olive oil, soy oil, peanut oil, walnut oil, almond oil, sesame oil, cottonseed oil, rapeseed oil, canola oil, safflower oil, sunflower oil, flax seed oil, algal oil, palm oil, palm kernel oil, coconut oil, babassu oil, shea butter, mango butter, cocoa butter, wheat germ oil, rice bran oil, oils produced by bacteria, algae, archaea or fungi or genetically engineered bacteria, algae, archaea or fungi, triglycerides, monoglycerides, diglycerides, sphingosides, glycolipids, lecithin, lysolecithin, phophatidic acids, lysophosphatidic acids, oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, conjugated oleic acid, or esters of: oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid, or glycerol esters of oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid, or triglyceride derivatives of oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid.

In some embodiments, fat droplets are derived from pulp or seed oil. In other embodiments, the source may be yeast or mold. For instance, in one embodiment the fat droplets comprise triglycerides derived from *Mortierella isabellina*.

In some embodiments plant oils are modified to resemble animal fats. The plant oils can be modified with flavoring or other agents to recapitulate the taste and smell of meat during and after cooking. Accordingly, some aspects of the invention involve methods for testing the qualitative similarity between the cooking properties of animal fat and the cooking properties of plant oils in the consumable.

In some embodiments, the fat replica comprises a protein component comprising one or more isolated, purified proteins. The purified proteins contribute to the taste and texture of the meat replica. In some embodiments purified proteins can stabilize emulsified fats. In some embodiments the purified proteins can form gels upon denaturation or enzymatic crosslinking, which replicate the appearance and texture of animal fat. Examples and embodiments of the one or more isolated, purified proteins are described herein. In particular embodiments, the one or more isolated proteins comprise a protein isolated from the legume family of plants. Non-limiting examples of legume plants are described herein, although variations with other legumes are possible. In some embodiments, the legume plant is a pea plant. In some embodiments the isolated purified proteins stabilize emulsions. In some embodiments the isolated purified proteins form gels upon crosslinking or enzymatic crosslinking. In some embodiments, the isolated, purified proteins comprise seed storage proteins. In some embodiments, the isolated, purified proteins comprise albumin. In some embodiments, the isolated, purified proteins comprise globulin. In a particular embodiment, the isolated, purified protein is a purified pea albumin protein. In another particular embodiment, the isolated, purified protein is a purified pea globulin protein. In another particular embodiment the isolate purified protein is a Moong bean 8S globulin. In another particular embodiment, the isolated, purified protein is an oleosin. In another particular embodiment, the isolated, purified protein is a caloleosin. In another particular embodiment, the isolated, purified protein is Rubisco. In some embodiments, the protein component comprises about 0.1%, 0.5%, 1%, 2%, 5%, 10%, 15%, 20%, 25%, 30%, 35%, 40%, 45%, 50%, 55%, 60%, 65%, 70%, 75%, 80%, 85%, 90% or more of the fat replica by dry weight or total weight. In some embodiments, the protein component comprises about 0.1-5%, about 0.5-10%, about 1-20%, about 5-30%, about 10-50%, about 20-70%, or about 30-90% or more of the fat replica by dry weight or total weight. In some embodiments, the protein component comprises a solution containing one or more isolated, purified proteins.

In some embodiments, the fat replica comprises crosslinking enzymes that catalyze reactions leading to covalent crosslinks between proteins. Cross-linking enzymes can be used to create or stabilize the desired structure and texture of the adipose tissue replica, to mimic the desired texture of an equivalent desired animal fat. Non-limiting examples of cross-linking enzymes include, e.g., transglutaminase, lysyl oxidases, or other amine oxidases (e.g. *Pichia pastoris* lysyl oxidase). In some embodiments, the cross-linking enzymes are isolated and purified from a non-animal source, examples and embodiments of which are described herein.

In some embodiments, the fat replica comprises at least 0.0001%, or at least 0.001%, or at least 0.01%, or at least 0.1%, or at least 1% (wt/vol) of a cross-linking enzyme. In particular embodiments, the cross-linking enzyme is transglutaminase.

In another aspect, the invention provides methods for making a fat replica. In some embodiments, the fat droplets are suspended in a gel. In some embodiments the present invention provides for methods for producing droplets of fat suspended in the gel. The fat can isolated and homogenized. For example an organic solvent mixture can be used to help mix a lipid. The solvent can then be removed. At this point the lipid can be frozen, lyophilized, or stored. So in some aspects the invention provides for a method for isolating and storing a lipid which has been selected to have characteristics similar to animal fat. The lipid film or cake can then be hydrated. The hydration can utilize agitation or temperature changes. The hydration can occur in a precursor solution to a gel. After hydration the lipid suspension can be sonicated or extruded to further alter the properties of the lipid in the solution.

In some embodiments, the fat replica is assembled to approximate the organization adipose tissue in meat. In some embodiments some or all of the components of the fat replica are suspended in a gel. In various embodiments the gel can be a proteinaceous gel, a hydrogel, an organogel, or a a xerogel. In some embodiments, the gel can be thickened to a desired consistency using an agent based on polysaccharides or proteins. For example fecula, arrowroot, cornstarch, katakuri starch, potato starch, sago, tapioca, alginin, guar gum, locust bean gum, xanthan gum, collagen, egg whites, furcellaran, gelatin, agar, carrageenan, cellulose, methylcellulose, hydroxymethylcellulose, acadia gum, konjac, starch, pectin, amylopectin or proteins derived from legumes, grains, nuts, other seeds, leaves, algae, bacteria, of fungi can be used alone or in combination to thicken the gel, forming an architecture or structure for the consumable.

In particular embodiments, the fat replica is an emulsion comprising a solution of one or more proteins and one or more fats suspended therein as droplets. In some embodiments, the emulsion is stabilized by one or more cross-linking enzymes into a gel. In more particular embodiments, the one or more proteins in solution are isolated, purified proteins. In yet more particular embodiments, the isolated, purified proteins comprise a purified pea albumin enriched fraction. In other more particular embodiments, the isolated, purified proteins comprise a purified pea globulin enriched fraction. In other more particular embodiments, the isolated, purified proteins comprise a purified Moong bean 8S globulin enriched fraction. In yet more particular embodiments, the isolated, purified proteins comprise a Rubisco enriched fraction. In other particular embodiments, the one or more fats are derived from plant-based oils. In more particular embodiments, the one or more fats are derived from one or more of: corn oil, olive oil, soy oil, peanut oil, walnut oil, almond oil, sesame oil, cottonseed oil, rapeseed oil, canola oil, safflower oil, sunflower oil, flax seed oil, algal oil, palm oil, palm kernel oil, coconut oil, babassu oil, shea butter, mango butter, cocoa butter, wheat germ oil, rice bran oil, oils produced by bacteria, algae, archaea or fungi or genetically engineered bacteria, algae, archaea or fungi, triglycerides, monoglycerides, diglycerides, sphingosides, glycolipids, lecithin, lysolecithin, phophatidic acids, lysophosphatidic acids, oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, conjugated oleic acid, or esters of: oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid, or glycerol esters of oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid, or triglyceride derivatives of oleic acid, palmitoleic acid, palmitic acid, myristic acid, lauric acid, myristoleic acid, caproic acid, capric acid, caprylic acid, pelargonic acid, undecanoic acid, linoleic acid, 20:1 eicosanoic acid, arachidonic acid, eicosapentanoic acid, docosohexanoic acid, 18:2 conjugated linoleic acid, or conjugated oleic acid. In yet even more particular embodiments, the one or more fats is a rice bran oil. In another particular embodiment, the one or more fats is a canola oil. In other particular embodiments, the cross-linking enzyme is transglutaminase, lysyl oxidase, or other amine oxidase. In yet even more particular embodiments, the cross-linking enzyme is transglutaminase. In particular embodiments, the fat replica is a high fat emulsion comprising a protein solution of purified pea albumin emulsified with 40-80% rice bran oil, stabilized with 0.5-5% (wt/vol) transglutaminase into a gel. In particular embodiments, the fat replica is a high fat emulsion comprising a protein solution of partially-purified moong bean 8S globulin emulsified with 40-80% rice bran oil, stabilized with 0.5-5% (wt/vol) transglutaminase into a gel. In particular embodiments, the fat replica is a high fat emulsion comprising a protein solution of partially-purified moong bean 8S globulin emulsified with 40-80% canola oil, stabilized with 0.5-5% (wt/vol) transglutaminase into a gel. In particular embodiments, the fat replica is a high fat emulsion comprising a protein solution of purified pea albumin emulsified with 40-80% rice bran oil, stabilized with 0.0001-1% (wt/vol) transglutaminase into a gel. In particular embodiments, the fat replica is a high fat emulsion comprising a protein solution of partially-purified moong bean 8S globulin emulsified with 40-80% rice bran oil, stabilized with 0.0001-1% (wt/vol) transglutaminase into a gel. In particular embodiments, the fat replica is a high fat emulsion comprising a protein solution of partially-purified moong bean 8S globulin emulsified with 40-80% canola oil, stabilized with 0.0001-1% (wt/vol) transglutaminase into a gel.

Connective Tissue Replica

Animal connective tissue provides key textural features that are an important component of the experience of eating meat. Accordingly, the present invention provides a composition derived from non-animal sources which recapitulates key features of animal connective tissue. In another aspect, the present invention provides a meat substitute product that comprises a composition derived from non-animal sources which recapitulates important textural and visual features of animal connective tissue. Such a composition will be labeled herein as "connective tissue replica". In some embodiments, the connective tissue replica and/or meat substitute product comprising the connective tissue replica are partially derived from animal sources.

Animal connective tissue can generally be divided into fascia-type and cartilage-type tissue. Fascia-type tissue is highly fibrous, resistant against extension (has high elastic modulus), and has a high protein content, a moderate water content (ca. 50%), and low-to-none fat and polysaccharide content. Accordingly, the present invention provides a connective tissue replica that recapitulates key features of fascia type tissue. In some embodiments, the connective tissue replica comprises about 50% protein by total weight, about 50% by liquid weight, and has a low fat and polysaccharide component.

The protein content of most fascia-type connective tissue is comprised mainly of collagen. Collagen is characterized by a high fraction of proline and alanine, and also is assembled into characteristic elongated fibrils or rod-like, flexible structures. Prolamins are one family of proteins found in non-animal sources, such as plant sources. Prolamins are highly abundant in plants and are similar in amino acid composition to collagen. Among proteins we tested for this purpose, prolamins were particularly favorable because of their low cost and their ability to readily form fibers or sheets when spun or extruded. Non-limiting examples of prolamin family proteins include, e.g., zein (found in corn), these include hordein from barley, gliadin from wheat, secalin, extensins from rye, kafirin from sorghum, avenin from oats. In fascia-type connective tissue, the prolamin family of proteins, individually or combinations thereof, demonstrates suitability for the protein component because they are highly abundant, similar in global amino acid composition to collagen (high fraction of proline and alanine), and amenable to processing into films and fibers. In addition to zein (found in corn), these include hordein from barley, gliadin from wheat, secalin, extensins from rye, kafirin from sorghum, avenin from oats. Other proteins may be necessary to supplement prolamins in order to achieve targets specifications for physicochemical and nutritional properties. The list of potential candidates here is essentially open and may include Rubisco, any major seed storage proteins, proteins isolated from fungi, bacteria, archaea, viruses, or genetically engineered microorganisms, or synthesized in vitro. The proteins may be artificially designed to emulate physical properties of animal connective tissue. animal-derived or recombinant collagen, extensins (hydroxyproline-rich glycoproteins abundant in cell walls e.g. *Arabidopsis thaliana*, monomers of which are "collagen-like" rod-like flexible molecules). The proteins may be artificially designed to emulate physical properties of animal connective tissue.

Methods for forming fascia-type connective tissue will be as those practiced in the art with a bias towards methods producing fibrous or fibrous-like structures by biological, chemical, or physical means, individually or in combination, serially or in parallel, before final forming. These methods may include extrusion or spinning.

Cartilage-type tissue is macroscopically homogenous, resistant against compression, has higher water content (up to 80%), lower protein (collagen) content, and higher polysaccharide (proteoglycans) contents (ca. 10% each).

Compositionally, cartilage-type connective tissue will be very similar to fascia-type tissue with the relative ratios of each adjusted to more closely mimic 'meat' connective tissue.

Methods for forming cartilage-type connective tissue will be similar to those for fascia-type connective tissue, but with a bias towards methods producing isotropically homogenous structures.

The fat can be suspended in a gel. In some embodiments the present invention provides for methods for producing droplets of fat suspended in the proteinaceous gel. The fat can be isolated from plant tissues and emulsified. The emulsification can utilize high-speed blending, homogenization, agitation or temperature changes. The lipid suspension can be sonicated or extruded to further alter the properties of the lipid in the solution. At this point, in some embodiments other components of the consumable are added to the solution followed by a gelling agent. In some embodiments crosslinking agents (e.g. transglutaminase or lysyl oxidase) are added to bind the components of the consumable. In other embodiments the gelling agent is added and the lipid/gel suspension is later combined with additional components of the consumable. In fascia-type connective tissue, the prolamin family of proteins, individually or combinations thereof, demonstrates suitability for the protein component because they are highly abundant, similar in global amino acid composition to collagen (high fraction of proline and alanine), and amenable to processing into films. In addition to zein (found in corn), these include hordein from barley, gliadin from wheat, secalin, extensions from rye, kafirin from sorghum, avenin from oats. Other proteins may be necessary to supplement prolamins in order to achieve targets specifications for physicochemical and nutritional properties. The list of potential candidates here is essentially open and may include any major seed storage proteins, animal-derived or recombinant collagen, extensins (hydroxyproline-rich glycoproteins abundant in cell walls e.g. *Arabidopsis thaliana*, monomers of which are "collagen-like" rod-like flexible molecules).

In some embodiments some or all of the components of the consumable are suspended in a gel. In various embodiments the gel can be a hydrogel, an organogel, or a xerogel, The gel can be made thick using an agent based on polysaccharides or proteins. For example fecula, arrowroot, cornstarch, katakuri starch, potato starch, sago, tapioca, alginin, guar gum, locust bean gum, xanthan gum, collagen, egg whites, furcellaran, gelatin, agar, carrageenan, cellulose, methylcellulose, hydroxymethylcellulose, acadia gum, konjac, starch, pectin, amylopectin or proteins derived from legumes, grains, nuts, other seeds, leaves, algae, bacteria, of fungi can be used alone or in combination to thicken the gel, forming an architecture or structure for the consumable. Enzymes that catalyze reactions leading to covalent cross-links between proteins can also be used alone or in combination to form an architecture or structure for the consumable. For example transclutaminase, lysyl oxidases, or other amine oxidases (e.g. *Pichia pastoris* lysyl oxidase (PPLO)) can be used alone or in combination to form an architecture or structure for the consumable. In some embodiments multiple gels with different components are combined to form the consumable. For example a gel containing a plant-based protein can be associated with a gel containing a plant-based fat. In some embodiments fibers or stings of proteins are oriented parallel to one another and then held in place by the application of a gel containing plant based fats.

The compositions of the invention can be puffed or expanded by heating, such as frying, baking, microwave heating, heating in a forced air system, heating in an air tunnel, and the like, according to methods well known in the art.

In some embodiments multiple gels with different components are combined to form the consumable. For example a gel containing a plant-based protein can be associated with a gel containing a plant-based fat. In some embodiments fibers or strings of proteins are oriented parallel to one another and then held in place by the application of a gel containing plant based fats.

In some embodiments the meat replica contains no animal products, less than 1% wheat gluten, no methylcellulose, no carrageenan, no caramel color and no Konjac flour, no gum Arabic, and no acacia gum.

In some embodiments the meat replica contains no animal products, no wheat gluten, no methylcellulose, no carrageenan, no caramel color and no Konjac flour, no gum Arabic, and no acacia gum.

In some embodiments the meat replica contains no animal products, no soy protein isolate, no wheat gluten, no methylcellulose, no carrageenan, no caramel color and no Konjac flour, no gum Arabic, and no acacia gum.

In some embodiments the meat replica contains no animal products, no soy protein concentrate, no wheat gluten, no methylcellulose, no carrageenan, no caramel color and no Konjac flour, no gum Arabic, and no acacia gum.

In some embodiments the meat replica contains no animal products, no soy protein, no wheat gluten, no methylcellulose, no carrageenan, no caramel color and no Konjac flour, no gum Arabic, and no acacia gum.

In some embodiments the meat replica contains no animal products, no tofu, no wheat gluten, no methylcellulose, no carrageenan, no caramel color and no Konjac flour, no gum Arabic, and no acacia gum.

In some embodiments the meat replica contains no animal products, no tofu, and no wheat gluten.

In some embodiments the meat replica contains no animal products, no soy protein, and no wheat gluten.

In some embodiments the meat replica contains no methylcellulose, no carrageenan, no caramel color, no Konjac flour, no gum Arabic, and no acacia gum.

In some embodiments the meat replica contains no animal products and less than 5% carbohydrates.

In some embodiments the meat replica contains no animal products, no soy protein, no wheat gluten, no methylcellulose, no carrageenan, no caramel color and no Konjac flour, no gum Arabic, and no acacia gum and less than 5% carbohydrates.

In some embodiments the meat replica contains no animal products, and less than 1% cellulose.

In some embodiments the meat replica contains no animal products, and less than 5% insoluble carbohydrates.

In some embodiments the meat replica contains no animal products, no soy protein, and less than 1% cellulose.

In some embodiments the meat replica contains no animal products, no soy protein, and less than 5% insoluble carbohydrates.

In some embodiments the meat replica contains no animal products, no wheat gluten, and less than 1% cellulose.

In some embodiments the meat replica contains no animal products, no wheat gluten, and less than 5% insoluble carbohydrates.

The percentage of different components may also be controlled. For example non-animal-based substitutes for muscle, fat tissue, connective tissue, and blood components can be combined in different ratios and physical organizations to best approximate the look and feel of meat. The various can also components can be arranged to insure consistency between bites of the consumable. The components can be arranged to insure that no waste is generated from the consumable. For example, while a traditional cut of meat may have portions that are not typically eaten, a meat replicate can improve upon meat by not including these inedible portions. Such an improvement allows for all of the product made or shipped to be consumed, which cuts down on waste and shipping costs. Alternatively, a meat replica may include inedible portions to mimic the experience of meat consumption. Such portions can include bone, cartilage, connective tissue, or other materials commonly referred to as gristle, or materials included simulating these components. In some embodiments the consumable may contain simulated inedible portions of meat products which are designed to serve secondary functions. For example a simulated bone can be designed to disperse heat during cooking, making the cooking of the consumable faster or more uniform than meat. In other embodiments a simulated bone may also serve to keep the consumable at a constant temperature during shipping. In other embodiments, the simulated inedible portions may be biodegradable.

In some embodiments the meat substitute compositions contains no animal protein, comprising between 10-30% protein, between 5-80% water, between 5-70% fat, comprising one or more isolated purified proteins. In particular embodiments, the meat substitute compositions comprise transglutaminase.

In some embodiments the consumable contains components to replicate the components of meat. The main component of meat is typically skeletal muscle. Skeletal muscle typically consists of roughly 75 percent water, 19 percent protein, 2.5 percent intramuscular fat, 1.2 percent carbohydrates and 2.3 percent other soluble non-protein substances. These include organic acids, sulfur compounds, nitrogenous compounds, such as amino acids and nucleotides, and inorganic substances such as minerals. Accordingly, some embodiments of the present invention provide for replicating approximations of this composition for the consumable. For example, in some embodiments the consumable is a plant-based meat replica can comprise roughly 75% water, 19% protein, 2.5% fat, 1.2% carbohydrates; and 2.3 percent other soluble non-protein substances. In some embodiments the consumable is a plant-based meat replica comprising between 60-90% water, 10-30% protein, 1-20% fat, 0.1-5% carbohydrates; and 1-10 percent other soluble non-protein substances. In some embodiments the consumable is a plant-based meat replica comprising between 60-90% water, 5-10% protein, 1-20% fat, 0.1-5% carbohydrates; and 1-10 percent other soluble non-protein substances. In some embodiments the consumable is a plant-based meat replica comprising between 0-50% water, 5-30% protein, 20-80%% fat, 0.1-5% carbohydrates; and 1-10 percent other soluble non-protein substances. In some embodiments, the replica contains between 0.01% and 5% by weight of a heme protein. In some embodiments, the replica contains between 0.01% and 5% by weight of leghemoglobin. Some meat also contains myoglobin, a heme protein, which accounts for most of the red color and iron content of some meat. In some embodiments, the replica contains between 0.01% and 5% by weight of a heme protein. In some embodiments, the replica contains between 0.01% and 5% by weight of leghemoglobin. It is understood that these percentages can vary in meat and the meat replicas can be produced to approximate the natural variation in meat. Additionally, in some instances, the present invention provides for improved meat replicas, which comprise these components in typically unnatural percentages. For example a meat replica can be produced with a higher than typical average fat content. The percentages of these components may also be altered to increase other desirable properties.

In some instances a meat replica is designed so that, when cooked, the percentages of components are similar to cooked meat. So, in some embodiments, the uncooked consumable has different percentages of components than uncooked meat, but when cooked the consumable is similar to cooked meat. For example, a meat replica may be made with a higher than typical water content for raw meat, but when cooked in a microwave the resulting product has percentages of components similar to meat cooked over a fire.

In some embodiments the consumable is a meat replica with a lower that typical water content for meat. In some embodiments the inventions provides for methods for hydrating a meat replica to cause the meat replica to have a content similar to meat. For example a meat replica with a water content that would be low for meat, for example 1%, 10%, 20%, 30%, 40% or 50% water, is hydrated to roughly 75% water. Once hydrated, in some embodiments, the meat replica is then cooked for human consumption.

The consumable can have a protein component. In some embodiments the protein content of the consumable is 10%, 20%, 30%, or 40%. In some embodiments the protein content of the consumable is similar to meat. In some embodiments the protein content in the consumable is greater than that of meat. In some embodiments the consumable has less protein than meat.

The protein in the consumable can come from a variety or combination of sources. Non-animal sources can provide some or all of the protein in the consumable. Non-animal sources can include vegetables, fruits, nuts, grains, algae, bacteria, or fungi. The protein can be isolated or concentrated from one or more of these sources. In some embodiments the consumable is a meat replica comprising protein only obtained from non-animal sources.

In some embodiments protein is formed into asymmetric fibers for incorporation into the consumable. In some embodiments these fibers replicate muscle fibers. In some embodiments the protein are spun fibers. Accordingly, the present invention provides for methods for producing asymmetric or spun protein fibers. In some embodiments the consumable contains a protein or proteins that have all of the amino acids found in proteins that are essential for human nutrition. In some embodiments the proteins added to the consumable are supplemented with amino acids.

Indicators of Cooking Meat

The release of odorants upon cooking is an important aspect of meat consumption. In some embodiments, the consumable is a meat replica entirely composed of non-animal products that when cooked generates an aroma recognizable by humans as typical of cooking beef. In some embodiments, the consumable when cooked generates an aroma recognizable by humans as typical of cooking pork. In some embodiments, the consumable is a meat replica entirely composed of non-animal products that when cooked generates an aroma recognizable by humans as typical of cooking bacon. In some embodiments, the consumable is a meat replica entirely composed of non-animal products that when cooked generates an aroma recognizable by humans as typical of cooking chicken. In some embodiments, the consumable is a meat replica entirely composed of non-animal products that when cooked generates an aroma recognizable by humans as typical of cooking lamb. In some embodiments, the consumable is a meat replica entirely composed of non-animal products that when cooked generates an aroma recognizable by humans as typical of cooking fish. In some embodiments, the consumable is a meat replica entirely composed of non-animal products that when cooked generates an aroma recognizable by humans as typical of cooking turkey. In some embodiments the consumable is a meat replica principally or entirely composed of ingredients derived from non-animal sources, with an odorant that is released upon cooking. In some embodiments the consumable is a meat replica principally or entirely composed of ingredients derived from non-animal sources, with an odorant that is produced by chemical reactions that take place upon cooking. In some embodiments the consumable is a meat replica principally or entirely composed of ingredients derived from non-animal sources, containing mixtures of proteins, peptides, amino acids, nucleotides, sugars and polysaccharides and fats in combinations and spatial arrangements that enable these compounds to undergo chemical reactions during cooking to produce odorants and flavor-producing compounds. In some embodiments the consumable is a meat replica principally or entirely composed of ingredients derived from non-animal sources, with a volatile or labile odorant that is released upon cooking. In some embodiments the consumable is a method for preparing a meat replica where meat replicas principally or entirely composed of ingredients derived from non-animal sources are heated to release a volatile or labile odorant.

Odorants released during cooking of meat are generated by reactions that can involve as reactants fats, protein, amino acids, peptides, nucleotides, organic acids, sulfur compounds, sugars and other carbohydrates. In some embodiments the odorants that combine during the cooking of meat are identified and located near one another in the consumable, such that upon cooking of the consumable the odorants combine. So, in some embodiments, the characteristic flavor and fragrance components are produced during the cooking process by chemical reactions involving amino acids, fats and sugars found in plants as well as meat. So, in some embodiments, the characteristic flavor and fragrance components are mostly produced during the cooking process by chemical reactions involving one or more amino acids, fats, peptides, nucleotides, organic acids, sulfur compounds, sugars and other carbohydrates found in plants as well as meat.

Some reactions that generate odorants released during cooking of meat can be catalyzed by iron, in particular the heme iron of myoglobin. Thus in some embodiments, some of the characteristic flavor and fragrance components are produced during the cooking process by chemical reactions catalyzed by iron. In some embodiments, some of the characteristic flavor and fragrance components are produced during the cooking process by chemical reactions catalyzed by heme. In some embodiments, some of the characteristic flavor and fragrance components are produced during the cooking process by chemical reactions catalyzed by the heme iron in leghemoglobin. In some embodiments, some of the characteristic flavor and fragrance components are produced during the cooking process by chemical reactions catalyzed by the heme iron in a heme protein.

Evidence that the presence of leghemoglobin contributes favorably to aroma of meat replicas: A muscle replica comprising pea flour, sunflower oil, and glucose was heated for 10 minutes at 140 C in the presence of either reduced leghemoglobin (LHb) or a mixture of iron ($Fe^{3+}$), sodium and EDTA (EFS) in sealed containers carrying solid phase microextraction (SPME) fibers. These fibers contain polydimethylsiloxane (PDMS) which adsorbs volatile compounds for analysis by GC-MS. Analysis of GC-MS data from multiple replicas reveal consistent differences between the LHb and EFS samples. Non-limiting examples of compounds found exclusively or more abundantly in the LHb samples are: 2-octanone, 2-methyl furan, which are often associated with the aroma of cooked meat, and many other unidentified compounds.

Color Indicators

The color of meat is an important part the experience of cooking and eating meat. For instance, cuts of beef are of a characteristic red color in a raw state and gradually transition to a brown color during cooking. As another example, white meats such as chicken or pork have a characteristic pink color in their raw state and gradually transition to a white or brownish color during cooking. The amount of the color transition is used to indicate the cooking progression of beef and titrate the cooking time and temperature to produce the desired state of done-ness. In some aspects, the invention provides a non-meat based meat substitute product that provides a visual indicator of cooking progression. In some embodiments, the visual indicator is a color indicator that undergoes a color transition during cooking. In particular embodiments, the color indicator recapitulates the color transition of a cut of meat as the meat progresses from a raw to a cooked state. In more particular embodiments, the color indicator colors the meat substitute product a red color before cooking to indicate a raw state and causes the meat substitute product to transition to a brown color during cooking progression. In other particular embodiments, the color indicator colors the meat substitute product a pink color before cooking to indicate a raw state and causes the meat substitute product to transition to a white or brown color during cooking progression.

The main determinant of the nutritional definition of the color of meat is the concentration of iron carrying proteins in the meat. In the skeletal muscle component of meat products, one of the main iron-carrying proteins is myoglobin. It is estimated that the white meat of chicken has under 0.05%; pork and veal have 0.1-0.3%; young beef has 0.4-1.0%; and old beef has 1.5-2.0%. So, in some embodiments, the consumable is a meat replica which comprises an iron-carrying protein. In some embodiments, the meat replica comprises about 0.05%, about 0.1%, about 0.2%, about 0.3%, about 0.4%, about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, about 2%, or more than about 2% of an iron-carrying protein by dry weight or total weight. In some cases, the iron carrying protein has been isolated and purified from a source. In other cases, the iron carrying protein has not been isolated and purified. In some cases, the source of the iron-carrying protein is an animal source, or a non-animal source such as a plant, fungus, or genetically modified organisms such as, e.g., bacteria or yeast. In some cases, the iron-carrying protein is myoglobin. In some embodiments the consumable is a plant based meat replica that has animal myoglobin added. So, for example a replica of young beef can have about 0.4-1% myoglobin. In some cases, the iron-carrying protein is leghemoglobin. In some embodiments the consumable is a plant based meat replica that has leghemoglobin added. So, for example a replica of young beef can have about 0.4-1% leghemoglobin. In some cases, the iron-carrying protein is a cytochrome. In some embodiments the consumable is a plant based meat replica that has a cytochrome added. So, for example a replica of young beef can have about 0.4-1% of a cytochrome.

Another example of iron-carrying proteins is hemoglobin, the iron-containing oxygen-binding protein in the red blood cells of vertebrates. Hemoglobin is similar in color to myoglobin. In some embodiments the invention provides methods of saving and recycling blood from animal farming to supplement the color of a consumable. For example blood is saved from a slaughter house, hemoglobin from the blood is used to enhance the color of a consumable. In some aspects the consumable is a plant-based meat replica containing hemoglobin.

Additional iron containing proteins exist in nature. In some embodiments the consumable comprises an iron containing protein that is not myoglobin. In some embodiments the consumable does not contain myoglobin. In some embodiments the consumable does not contain hemoglobin. In some embodiments the consumable is a meat replica that comprises an iron containing protein other than myoglobin or hemoglobin.

Examples of iron containing proteins include hemoglobin, myoglobin, neuroglobin, cytoglobin, leghemoglobin, non-symbiotic hemoglobin, Hell's gate globin I, bacterial hemoglobins, ciliate myoglobins, flavohemoglobins. In various embodiments these iron containing proteins are added to the consumable to alter the visual characteristics or iron content of the consumable. In some embodiments the consumable comprises a hemoprotein (e.g. hemoglobin, myoglobin, neuroglobin, cytoglobin, leghemoglobin, non-symbiotic hemoglobin, Hell's gate globin I, bacterial hemoglobins, ciliate myoglobins, flavohemoglobins,).

Leghemoglobin, similar in structure and physical properties to myoglobin, is readily available as an unused by-product of commodity legume crops (eg., soybean, pea). The leghemoglobin in the roots of these crops in the US exceeds the myoglobin content of all the red meat consumed in the US. In some embodiments the consumable is a meat replica principally or entirely composed of ingredients derived from non-animal sources, including a muscle tissue replica, an adipose tissue replica, a connective tissue replica, and leghemoglobin. In some embodiments the consumable is a meat replica principally or entirely composed of ingredients derived from non-animal sources, containing a heme protein. In some embodiments the consumable is a meat replica principally or entirely composed of ingredients derived from non-animal sources, containing a leghemoglobin. In some embodiments the consumable is a meat replica principally or entirely composed of ingredients derived from non-animal sources, containing a member of the globin protein family. In some embodiments the consumable is a meat replica principally or entirely composed of ingredients derived from non-animal sources, with a high iron content from a heme protein. In some embodiments the iron content is similar to meat. In some embodiments the consumable has the distinctive red color of meat, such color provided by leghemoglobin.

Leghemoglobin is, in some embodiments, used as an indicator that the consumable is finished cooking. So, one embodiment of the invention is a method for cooking a consumable comprising detecting leghemoglobin which has migrated from the interior of the consumable to the surface when the product is cooked. Another embodiment of the invention is a method for cooking a consumable comprising detecting the change in color of from red to brown when the product is cooked.

A heme protein is, in some embodiments, used as an indicator that the consumable is finished cooking. So, one embodiment of the invention is a method for cooking a consumable comprising detecting leghemoglobin which has migrated from the interior of the consumable to the surface when the product is cooked. Another embodiment of the invention is a method for cooking a consumable comprising detecting the change in color of from red to brown when the product is cooked.

A heme protein from the group of: Hemoglobin, myoglobin, neuroglobin, cytoglobin, leghemoglobin, non-symbiotic hemoglobin, Hell's gate globin I, bacterial hemoglobins, ciliate myoglobins, flavohemoglobins, is, in some embodiments, used as an indicator that the consumable is finished cooking. So, one embodiment of the invention is a method for cooking a consumable comprising detecting leghemoglobin which has migrated from the interior of the consumable to the surface when the product is cooked. Another embodiment of the invention is a method for cooking a consumable comprising detecting the change in color of from red to brown when the product is cooked.

Food Products Comprising Isolated, Purified Leghemoglobin

In some embodiments leghemoglobin is added to meat to enhance the properties of meat. For example, a leghemglobin containing solution can be injected into raw or cooked meat. In another example a leghemoglobin solution is dripped over meat or a consumable of the invention to enhance appearance. In one embodiment advertising, photography, or videography of food products such as meat or a meat substitute is enhanced with leghemoglobin.

Sources of Leghemoglobin

Figure 2:
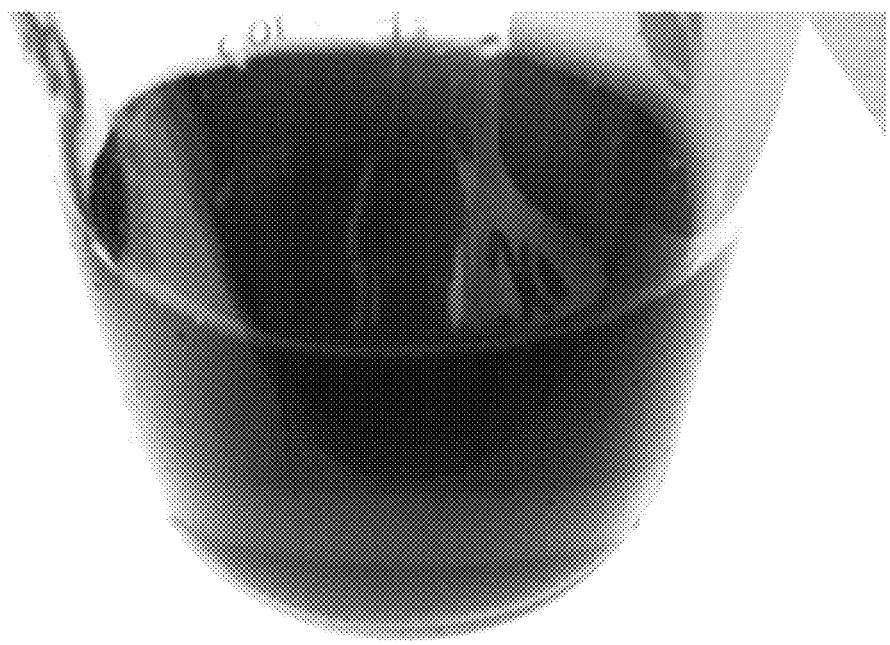
FIG. 2 depicts leghemoglobin isolated from 1 oz of pea roots. The red color commonly attributed to meat is evident in the color photo.
Figure 3:
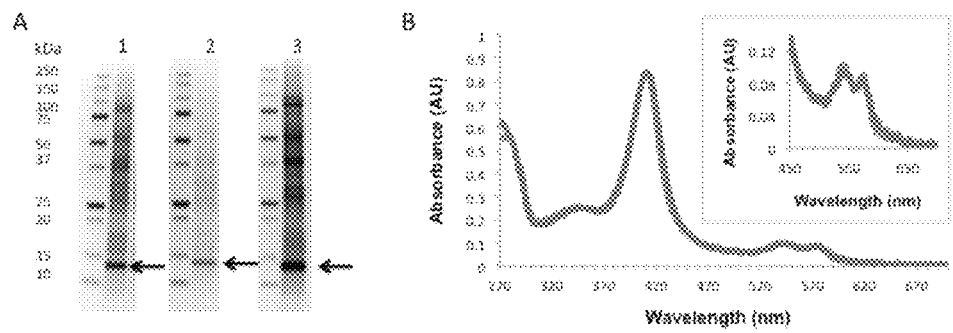
FIG. 3 shows that leghemoglobins from different species are homologs and have similar color properties.

In some embodiments the present invention provides methods for obtaining leghemoglobin from plants. Leghemoglobin can be obtained from a variety of plants. Various legumes species and their varieties, for example, Soybean, Fava bean, Lima bean, Cowpeas, English peas, Yellow peas, Lupine, Kidney bean, Garbanzo beans, Peanut, Alfalfa, Vetch hay, Clover, Lespedeza and Pinto bean, contain nitrogen-fixing root nodules in which leghemoglobin has a key role in controlling oxygen concentrations (for example root nodules from a pea plant, FIG. 1). FIG. 2 shows 100 mls of leghemoglobin solution isolated from 30 grams of pea root nodules. Leghemoglobins from different species are homologs and have similar color properties (FIG. 3). In FIG. 3, panel A shows an SDS_PAGE gels of lysed root-nodules of three legume plant species (1) Fava bean (2) English Pea (3) Soybean. Arrows mark respective leghemoglobins. Note that leghemoglobin is the most abundant soluble protein in each lysate. Panel B shows the similarity of UV-VIS spectral profile of leghemoglobins from two different plant species (Favabean and Soybean). We purified leghemoglobin from fava bean (green curve) and Soybean (red curve) root nodules using the protocol described elsewhere in the specification. UV-VIS spectra of both proteins shows that the heme iron is in the reduced (+2) state. Note that they are almost perfectly superimposed, consistent with their visually identical red color. The heme iron in the respective leghemoglobins was reduced to the +2 oxidation state by incubating Fava bean and Soybean leghemoglobin with 10 mM sodium hydrosulfite in 20 mM potassium-phosphate pH 7.4, 100 mM sodium chloride buffer. Sodium hydrosulfite was then removed from the leghemoglobin solution using gel-exclusion chromatography. Inset shows a zoom-in of UV-VIS spectra in 450 nm to 700 nm region. Some plant species express several leghemoglobin isoforms (for example soybean has four leghemoglobin isoforms). Minor variations in precise amino acid sequence can modify overall charge of the protein at a particular pH and can modify precise structural conformation of iron containing heme group in leghemoglobin. Differences in structural conformation of heme group of different leghemoglobins can influence oxidation and reduction rates of the heme iron. These differences may contribute to color and flavor generation properties of different leghemoglobins.

Figure 4:
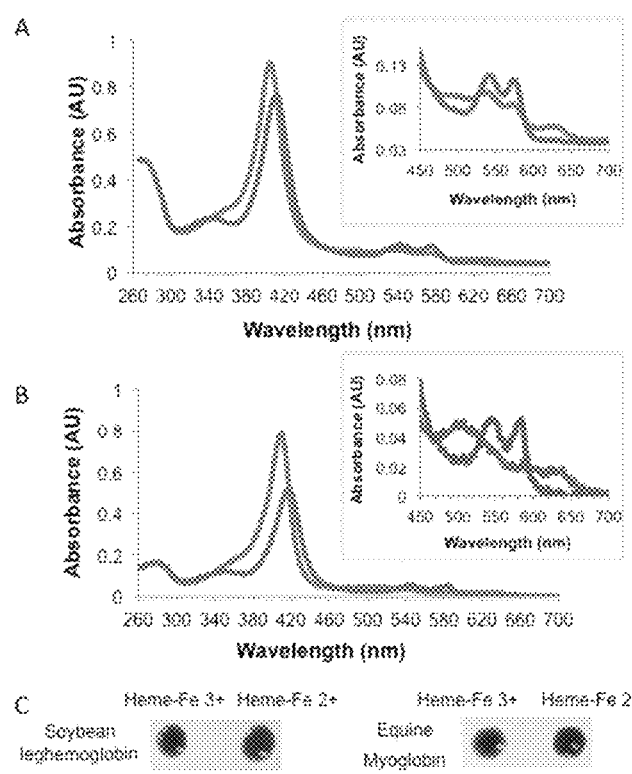
FIG. 4 shows a comparison of reduced (heme iron 2+) and oxidized (heme iron 3+) soybean leghemoglobin (FIG. 4 panel A) and equine heart muscle myoglobin (FIG. 4 panel B) showing similarity of UV-VIS absorption profiles of two proteins. We purified soybean leghemoglobin from soybean root-nodules using here described protocol. Purified equine myoglobin was purchased from SigmaAldrich. Soybean leghemoglobin (FIG. 4 panel A) and equine myoglobin (FIG. 4 panel B) were reduced with 1mm sodium hydrosulfite. Shown are UV-VIS absorption spectra of heme Fe3+ (blue line—the higher peak in FIGS. 4 and 5) and heme Fe2+ (red line) of soybean leghemoglobin (FIG. 4 panel A) and equine myoglobin (FIG. 4 panel B). Insets show a zoom-in of UV-VIS spectra in 450 nm to 700 nm region.

Leghemoglobin has a virtually identical absorbance spectrum and visual appearance to myoglobin from animal muscle. FIG. 4 shows a comparison of reduced (heme iron 2+) and oxidized (heme iron 3+) soybean leghemoglobin (FIG. 4 panel A) and equine heart muscle myoglobin (FIG. 4 panel B) showing similarity of UV-VIS absorption profiles of two proteins. We purified soybean leghemoglobin from soybean root-nodules using here described protocol. Purified equine myoglobin was purchased from SigmaAldrich. Soybean leghemoglobin (FIG. 4 panel A) and equine myoglobin (FIG. 4 panel B) were reduced with 1 mm sodium hydrosulfite. Shown are UV-VIS absorption spectra of heme $Fe^{3+}$ (blue line) and heme $Fe^{2+}$ (red line) of soybean leghemoglobin (FIG. 4 panel A) and equine myoglobin (FIG. 4 panel B). Insets show a zoom-in of UV-VIS spectra in 450 nm to 700 nm region. (FIG. 4 panel C) Images of 10 ul liquid droplet of a 40 mg/ml solution of soybean leghemoglobin in the heme-$Fe^{3+}$ state (left droplet) showing characteristic rusty red color and a 40 mg/ml solution of soybean leghemoglobin solution in the heme-$Fe^{2+}$ state (right droplet) showing characteristic red color of and (right image) corresponding samples of equine myoglobin.

In other embodiments, leghemoglobin can be sourced from non-plant sources, such as from organisms such as bacteria or yeast which have been genetically modified to express high levels of leghemoglobin.

Figure 5:
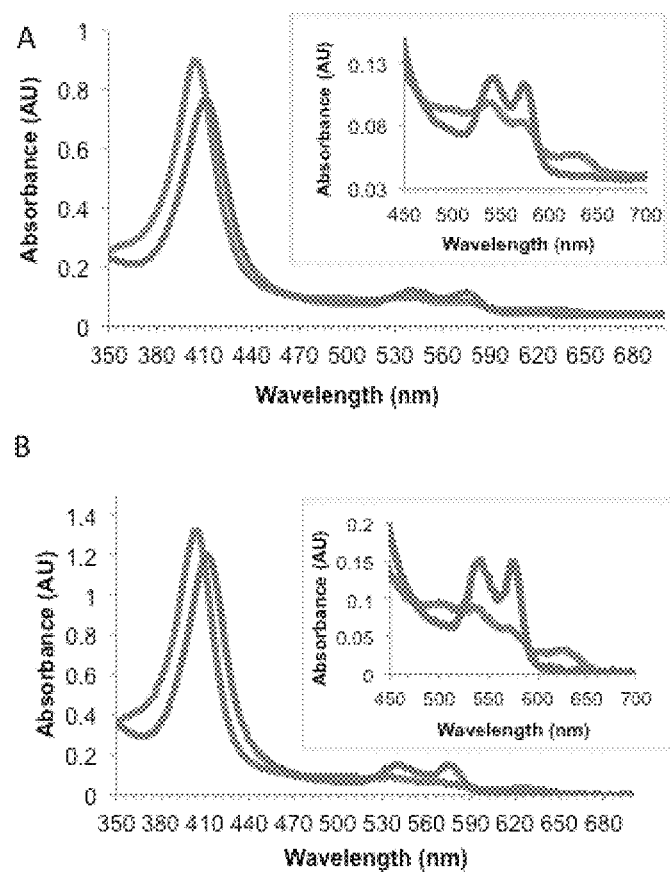
FIG. 5 depicts examples of successful reduction of leghemoglobin heme iron with sodium hydrosulfite and titanium citrate.

The oxidation state of the iron ion in leghemoglobin is important for its color. Leghemoglobin with the heme iron in the +2 oxidation state appears vivid red in color, while leghemoglobin with the heme iron in the +3 oxidation state appears brownish red. Thus, in using leghemoglobin as a source of red color in a meat replica, it is desireable to reduce the heme iron from the +3 state to the +2 state. Heme iron in leghemoglobin can be switched from oxidized (+3) state to reduced (+2) state with reducing reagents. Examples of successful reduction of leghemoglobin heme iron with sodium hydrosulfite and titanium citrate are illustrated in FIG. 5. In FIG. 5 the UV-VIS spectrogram of purified soybean leghemoglobin in which the heme iron is in the oxidized (+3) state is represented by the blue curves in each panel. The red curves in each panel represent the UV-VIS spectra of the same leghemoglobin species after reduction to the (+2) state (red lines) by addition of (Panel A) 1 mM sodium hydrosulfite or (Panel B) 0.24% (wt/v) titanium citrate in 20 mM potassium phosphate pH 7.3, 100 mM sodium chloride buffer. The Insets show a zoom-in of UV-VIS spectra in 450-700 nm region. For this example, leghemoglobin was purified from soybean root nodules using 60/90% ammonium sulfate fractionation and exchanged into 20 mM potassium phosphate pH 7.4, 100 mM sodium chloride buffer. Sodium hydrosulfite stock solution was prepared by dissolving 100 mM sodium hydrosulfite in 1 mM sodium hydroxide in water. Titanium citrate stock solution was prepared from 20% (wt/v) Ti-chloride in hydrochloric acid by mixing it with 0.2M sodium citrate (1:10 v/v). pH was adjusted using sodium carbonate to pH 7.0.

Figure 6:
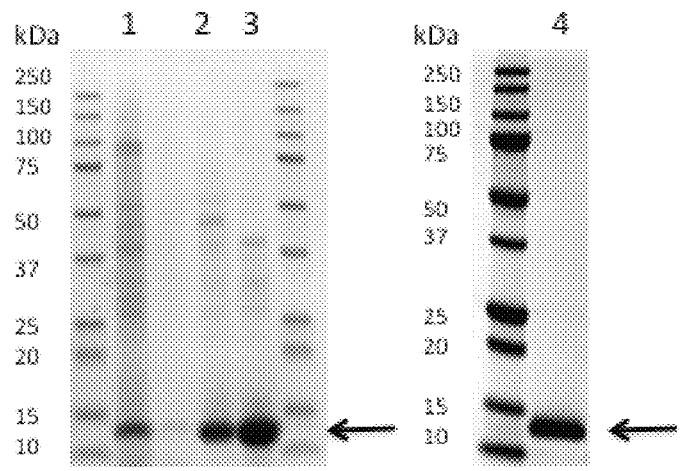
FIG. 6 depicts an example of the leghemoglobin purification flow from soybean root nodules. The figure shows SDS-PAGE fractionation of different soybean leghemoglobin purification steps (Lane 1) Soybean root-nodule lysate; (Lane 2) Soybean root-nodule lysate purified by 60/90% (wt/v) ammonium sulfate fractionation. Shown is the protein content of 90% ammonium sulfate fractionated protein pellet resuspended in 20 mm potassium phosphate pH 7.4, 100 mM sodium chloride, 1 mM EDTA buffer; Proteins from 90% ammonium sulfate pellet were further purified by anion-exchange chromatography (FFQ GE Healthcare) in 20 mM potassium phosphate ph 7.4, 100 mM sodium chloride. Leghemoglobin collected in the flowthrough is shown in Lane 3. Anion-exchange flowthrough was fractionated using size-exclusion chromatography (Sephacryl S-100 GE Healthcare) and resulting leghemoglobin fraction is shown in Lane 4. Leghemoglobin content at different purification steps was determined by determining the fraction of leghemoglobin band on SDS-PAGE gel in a respective sample using ImageDoc analysis software (BioRad). Purity (partial abundance) of leghemoglobin at respective steps in the purification steps was: lysate: 32.7% (lane 1), 60/90% (wt/v) ammonium sulfate fractionation 78% (lane 2), anion-exchange chromatography ~83% (lane 3), and size-exclusion chromatography to ~95% (lane 4).

Leghemoglobin can be purified from legume root nodules, such as the root nodules of peas or soybeans (FIG. 1 shows Leghemoglobin isolated frompea root nodules). Root nodules from soy beans were thoroughly cleaned to remove soil and extraneous root tissues prior to root nodule lysis in 20 mM potassium phosphate pH 7.4, 100 mM sodium chloride, 1 mm EDTA and 1 mM ascorbic acid. Root nodules were lysed by grinding root-nodules using a Vitamix blender. For some samples Polyvinylpyrrolidone polymer was added at 30% wt/v to aid in removal of plant phenolic small molecules that mediate oxidation of leghemoglobin heme-iron. Root nodule lysate was fractionated using ammonium sulfate in two steps, first ammonium sulfate was added to 60% wt/v. Pellet was discarded and supernatant brought to 90% wt/v. ammonium sulfate. Leghemoglobin was collected as a precipitated pellet in 90% ammonium sulfate fraction. Ammonium sulfate precipitated leghemoglobin was resuspended in 20 mM potassium phosphate, 1 mM EDTA, 50 mM sodium chloride and ammonium sulfate was removed using dialysis or size-exclusion chromatography in the same buffer. In some instances this was the last purification step, while in other instances leghemoglobin was further purified using anion-exchange chromatography (FFQ GE Healthcare), which was sometimes followed by size-exclusion chromatography (Sephacryl S-100, GE Healthcare). Soybean leghemoglobin from 90% ammonium sulfate pellet was loaded on anion exchange columns (FFQ or DEAE, GE Healthcare) in different buffers (20 mM potassium phosphate pH 7.4, containing 0 to 100 mM sodium chloride, 20 mM Tris pH 8 containing 0 to 100 mM sodium chloride, 20 mM sodium borax pH 9.8, 20 mM sodium chloride, 20 mM sodium carbonate pH 9, 20 mM sodium chloride) and purified either in flow-through or using sodium chloride (0-1M salt gradient). An example of the leghemoglobin purification flow from soybean root nodules is represented in FIG. 6. The figure shows SDS-PAGE fractionation of different soybean leghemoglobin purification steps (Lane 1) Soybean root-nodule lysate; (Lane 2) Soybean root-nodule lysate purified by 60/90% (wt/v) ammonium sulfate fractionation. Shown is the protein content of 90% ammonium sulfate fractionated protein pellet resuspended in 20 mm potassium phosphate pH 7.4, 100 mM sodium chloride, 1 mM EDTA buffer; Proteins from 90% ammonium sulfate pellet were further purified by anion-exchange chromatography (FFQ GE Healthcare) in 20 mM potassium phosphate ph 7.4, 100 mM sodium chloride. Leghemoglobin collected in the flow-through is shown in Lane 3. Anion-exchange flowthrough was fractionated using size-exclusion chromatography (Sephacryl S-100 GE Healthcare) and resulting leghemoglobin fraction is shown in Lane 4. Leghemoglobin content at different purification steps was determined by determining the fraction of leghemoglobin band on SDS-PAGE gel in a respective sample using ImageDoc analysis software (Bio-Rad). Purity (partial abundance) of leghemoglobin at respective steps in the purification steps was: lysate: 32.7% (lane 1), 60/90% (wt/v) ammonium sulfate fractionation 78% (lane 2), anion-exchange chromatography ~83% (lane 3), and size-exclusion chromatography to ~95% (lane 4).

Figure 7:
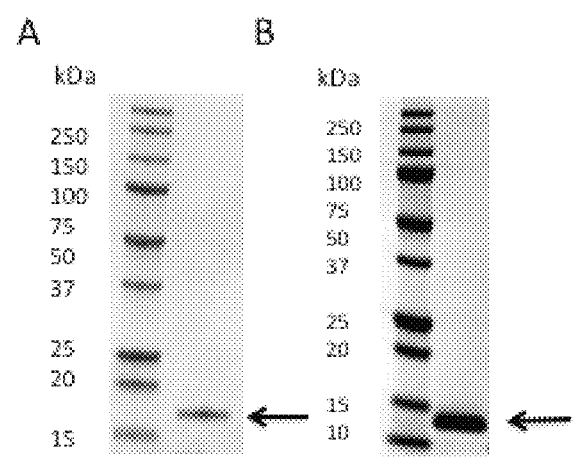
FIG. 7 shows stained SDS-PAGE gel analysis of (A) soybean leghemoglobin expressed and purified using recombinant protein technology and (B) soybean leghemoglobin purified from soybean root nodules. (A) Recombinant Soybean leghemoglobin A carrying His-tag and TEV protease His-tag removal site was expressed in *E.coli* BL21 strain and purified using His-tag affinity chromatography (Talon resin, CloneTech). The left lane contains molecular weight standards, the right lane contains purified recombinant soybean leghemoglobin A (arrow). Expected molecular weight of the recombinant soybean leghemoglobin A is 17.1 kDa. (B) SDS-PAGE gel of purified Soybean leghemoglobin from root nodules. The left lane contains molecular weight standards, the right lane contains purified soybean leghemoglobin A (arrow). Mass spectrometry analysis of purified material determined that all four soybean leghemoglobin isoforms are present, and are full length (data not shown). Expected molecular weights (MW) of soybean leghemoglobin isoforms range from MW15.4 to 15.8 kDa.

Leghemoglobin can also be produced by genetically engineering a bacterium or fungus to produce it. One illustrative example is shown in FIG. 7. FIG. 7 shows stained SDS-PAGE gel analysis of (A) soybean leghemoglobin expressed and purified using recombinant protein technology and (B) soybean leghemoglobin purified from soybean root nodules. (A) Recombinant Soybean leghemoglobin A carrying His-tag and TEV protease His-tag removal site was expressed in E.coli BL21 strain and purified using His-tag affinity chromatography (Talon resin, CloneTech). The left lane contains molecular weight standards, the right lane contains purified recombinant soybean leghemoglobin A (arrow). Expected molecular weight of the recombinant soybean leghemoglobin A is 17.1 kDa. (B) SDS-PAGE gel of purified Soybean leghemoglobin from root nodules. The left lane contains molecular weight standards, the right lane contains purified soybean leghemoglobin A (arrow). Mass spectrometry analysis of purified material determined that all four soybean leghemoglobin isoforms are present, and are full length (data not shown). Expected molecular weights (MW) of soybean leghemoglobin isoforms range from MW15.4 to 15.8 kDa.

Leghemoglobin purified from soybean and fava root nodules, respectively was tasted by a panel of volunteers and in each case described as tasting like blood.

Leghemoglobin can be isolated from the roots nodules of legumes such as soy beans, fava beans, cow peas, lima beans, garbanzo beans, peas, lupine, lotus japonicum or other legumes. The root nodule (for example root nodules from a pea plant) is obtained and homogenized in an aqueous solution, soluble proteins including leghemoglobin are recovered after insoluble matter is removed by precipitation or filtration. Leghemoglobin can be purified by selective precipitation and/or chromatography and/or the use of molecules with specific affinity for leghemoglobin. (FIG. 1, showing 100 mls of solution of leghemoglobin isolated from 30 grams of pea root nodules).

Heme proteins, for example leghemoglobin, can be combined with other plant based meat replica components. In some embodiments the heme proteins are captured in a gel which contains other components, for example lipids and or proteins. In some aspects a multiple gels are combined with non-gel based heme proteins. In some embodiments the combination of the heme proteins and the other compounds of the consumable are done to insure that the heme proteins are able to diffuse through the consumable. In some embodiments the consumable is ed in a heme-protein containing solution, for instance a leghemoglobin solution. In some embodiments the consumable is soaked in a heme protein containing solution, for instance a leghemoglobin solution for 1, 5, 10, 15, 20 or 30 hours. In some embodiments the consumable is soaked in a heme containing solution, for instance a leghemoglobin solution for 1, 5, 10, 15, 30, or 45 minutes.

Figure 8:
FIG. 8 shows an example of 6 cubes of a commercial meat analog (Quorn chicken analog), about 1 cm on a side, 4 of which (Left and lower right) have been soaked in a solution of about 10 mg/ml soybean leghemoglobin in 20 mM Potassium phosphate pH 7.4 and 100 mM NaCl; the remaining two (Upper right) were soaked in the same buffer without leghemoglobin. A deep pink color of the leghemoglobin-infused cubes is apparent in color photos contrasting the pale tan color of the un-infused cubes.

FIG. 8 shows an example of 6 cubes of a commercial meat analog (Quorn chicken analog), about 1 cm on a side, 4 of which (Left and lower right) have been soaked in a solution of about 10 mg/ml soybean leghemoglobin in 20 mM Potassium phosphate pH 7.4 and 100 mM NaCl; the remaining two (Upper right) were soaked in the same buffer without leghemoglobin. Note the deep pink color of the leghemoglobin-infused cubes in contrast to the pale tan color of the un-infused cubes.

Figure 9:
FIG. 9 shows the 4 leghemoglobin-infused cubes of Quorn chicken analog in the process of cooking in a pan at 350° C. The two lower cubes have been turned over to expose the grilled surface, which has turned brown. In the upper two cubes that the heated portion has turned grey-brown, while the cooler top surface retains its pink color. In some embodiments the consumable is injected with a heme containing solution, for instance a leghemoglobin solution, until the consumable is the color of uncooked meat.

FIG. 9 shows the 4 leghemoglobin-infused cubes of Quorn chicken analog in the process of cooking in a pan at 350° C. The two lower cubes have been turned over to expose the grilled surface, which has turned brown. Note in the upper two cubes that the heated portion has turned grey-brown, while the cooler top surface retains its pink color. In some embodiments the consumable is injected with a heme containing solution, for instance a leghemoglobin solution, until the consumable is the color of uncooked meat.

Given the usefulness of heme proteins for coloring consumables it will be useful to detect whether a product contains a particular heme protein. Accordingly the present invention includes in some embodiments methods to determine whether a product contains a heme protein. Methods for detecting proteins are well known in the art. For example an ELISA or proximity-ligation assoacy or luninex assay or western blot analysis can be performed to determine whether leghemoglobin is present in a food product such as meat or a meat replica. In one embodiment the detection methods are performed to determine whether meat has been altered with leghemoglobin.

EXAMPLES

An exemplary muscle replica composition comprising one or more isolated, purified plant proteins is described herein.

Protein Purification for Components of the Replica

Moong bean seeds, Green Pea dry seed were purchased as milled flour and used for purification of respective seed storage proteins. Rubsico was purified from fresh alfalfa plant. Protein composition at individual fractionation steps was monitored by SDS-PAGE and protein concentrations were measured by standard UV-VIS and Pierce assay methods.

Moong bean 8S globulins: Moong bean flour was resuspended in in 50 mM potassium phosphate buffer pH 7 and 0.5M NaCl at 1:4 (wt/v) ratio, and mixture was incubated for 1 hr. Unsoluble material was separated by centrifugation and proteins in the supernatant were fractionated by addition of ammonium sulfate in 2 steps: 50% (wt/v) followed by 90% (wt/v). Protein precipitated in 90% fraction contained the moong bean 8S globulins and was stored at −20 C until further use.

Pea-albumins: Green pea dry seed flour was resuspended at 1:10 (wt/v) ratio in 50 mM sodium acetate buffer pH 5 and incubated for 1 hr. Unsoluble material was separated by centrifugation and proteins in the supernatant were fractionated by ammonium sulfate precipitation in two steps: 50% (wt/v) followed by 90% (wt/v). Ammonium sulfate solutions were stirred for 1 hour and ammonium sulfate precipitated proteins removed by centrifugation. Proteins of interest precipitated in 90% (wt/v) ammonium sulfate. Pellet was stored at −20 C until further use.

Pea-globulins: Green pea dry seed flour was resuspended at 1:10 (wt/v) ratio in 20 mM potassium phosphate buffer pH 8, 0.4M sodium chloride and stirred for 1 hr. After centrifugation, the supernatant was subjected to ammonium sulfate fractionation. First, supernatant was brought to 50% (wt/v) ammonium sulfate, and precipitated proteins removed. Second, 50% (wt/v) ammonium sulfate supernatant was brought to 80% (wt/v) ammonium sulfate saturation. The 80% (wt/v) ammonium sulfate pelleted protein contained globulins of interest. Pellet was stored at −20° C. until further use.

RuBisCO: RuBisCO was fractionated from alfalfa greens (or other green plants eg soybean plants, spinach etc) by first grinding leaves with 4 volumes of cold 50 mM KPhosphate buffer pH 7.4 buffer (with (in lab) or without (in field) 0.5M NaCl+2 mM DTT+1 mM EDTA) in a blender. The resulting slurry was centrifuged to remove debris, and the supernatant (crude lysate) was used in further purification steps. Proteins in the crude lysate were fractionated by addition of ammonium sulfate to 30% (wt/v) saturation. The solution was stirred for 1 hr and then centrifuged. The pellet from this step was discarded and additional ammonium sulfate was added to the supernatant to 50% (wt/v) ammonium sulfate saturation. The solution was centrifuged again after stirring for 1 hr. The pellet from this step contains RuBisCO, and was kept at −20 C until used.

Obtaining Plant Proteins.

Moong bean seed 8S protein was purified by ammonium sulfate fractionation as described. Pellet was resuspended in 20 mM potassium phosphate pH pH 7.4 and 0.5M sodium chloride and ammonium sulfate removed by dialysis against the same buffer. Any precipitate was removed by centrifugation at 16 000 g, 10 min and protein concentrated to desired concentration. Pea globulins purified by ammonium sulfate fractionation as described. Protein pellet was resuspended in 20 mM potassium phosphate pH pH 7.4 and 0.4M sodium chloride and ammonium sulfate removed by dialysis against the same buffer. Any precipitate was removed by centrifugation at 16 000 g, 10 min and protein concentrated to desired concentration. Pea albumin purified by ammonium sulfate fractionation as described. Protein pellet was resuspended in 20 mM potassium phosphate pH pH 7.4 and 0.1M sodium chloride and ammonium sulfate removed by dialysis against the same buffer. Any precipitate was removed by centrifugation at 16 000 g, 10 min and protein concentrated to desired concentration.

Constructing a Muscle Tissue Analog

Moong bean seed 8S protein was purified by ammonium sulfate fractionation as described above, For preparation of gels, 200 g of pellet was dissolved in 400 ml of dialysis buffer (20 mM potassium phosphate, 400 mM NaCl, pH 7.3) and the resulting solution dialyzed for 6 hours against 5 l of dialysis buffer, replaced twice with fresh buffer. Protein solution was centrifuged at 12,000 g for 15 min to remove debris. Protein was concentrated by dialyzing for 36 hours against 5 l of 30% w/w solution of PEG 8000 (polyethylene glycol, molecular weight 8000) in dialysis buffer. Final protein concentration was 150 mg/ml.

Leghemoglobin was purified from soybean root nodules. Legume root nodules were cleaned to remove soil and extraneous root tissues prior to root nodule lysis in 20 mM potassium phosphate pH 7.4, 100 mM sodium chloride, 1 mm EDTA and 1 mM ascorbic acid. Root nodules were lysed by grinding root-nodules using juicer blender. Unsoluble material was separated by centrifugation. Root nodule lysate was fractionated using ammonium sulfate in two steps, first ammonium sulfate was added to 60% wt/v and solution incubated for 1hr, 4' C. Pellet was discarded and supernatant brought to 90% wt/v ammonium sulfate and incubated for 12 hr, 4' C. Leghemoglobin was collected as a precipitated pellet in 90% ammonium sulfate fraction and resuspended in 20 mM potassium phosphate, 1 mM EDTA, 100 mM sodium chloride. SDS-PAGE gel analysis determined that protein solution contains 70% leghemoglobin and 30% other root nodule proteins. Ammonium sulfate was removed using size-exclusion chromatography in the same buffer. Leghemoglobin was concentrated by dialyzing for 48 hr against 30% PEG 8000 (polyethylene glycol, molecular weight 8000) in 20 mM potassium phosphate pH 7.3, 100 mM sodium chloride. Total protein concentration was 57 mg/ml. UV-VIS spectra suggested that leghemoglobin was in heme-iron oxidized state. Thus, leghemoglobin was incubated with 5 mM sodium hydrosulfite for 5 min and sodium hydrosulfite was removed using size-exclusion chromatography in 20 mM potassium phosphate, 100 mM sodium chloride buffer. Leghemoglobin was further concentrated to 35.4 mg/ml. UV-VIS spectra analysis confirmed that leghemoglobin is in heme-iron reduced state.

Transglutaminase was obtained commercially from (Activa TI, Ajimoto). Stock solution (20% wt/v) was made in 20 mM potassium phosphate pH 7.3, 100 mM sodium chloride buffer.

Figure 10:
FIG. 10 depicts 43 ml of moong bean protein solution (150 mg/ml in dialysis buffer) were mixed with 37 ml of leghemoglobin solution (46.5 mg/ml leghemoglobin and 20 mg/ml of other soybean root nodule protein) in 20 mM potassium phosphate, 100 mM NaCl, pH 7.3). 20 ml of transglutaminase solution (20% w/w) were added, solutions thoroughly mixed, divided into two 50 ml Falcon tubes and incubated overnight at room temperature. Final protein concentrations were 65 mg/ml for moong bean protein, 18 mg/ml of leghemoglobin, 91 mg/ml total protein.

To prepare "dark" muscle tissue analog (FIG. 10), 43 ml of moong bean protein solution (150 mg/ml in dialysis buffer) were mixed with 37 ml of leghemoglobin solution (46.5 mg/ml leghemoglobin and 20 mg/ml of other soybean root nodule protein) in 20 mM potassium phosphate, 100 mM NaCl, pH 7.3). 20 ml of transglutaminase solution (20% w/w) were added, solutions thoroughly mixed, divided into two 50 ml Falcon tubes and incubated overnight at room temperature. Final protein concentrations were 65 mg/ml for moong bean protein, 18 mg/ml of leghemoglobin, 91 mg/ml total protein.

Figure 11:
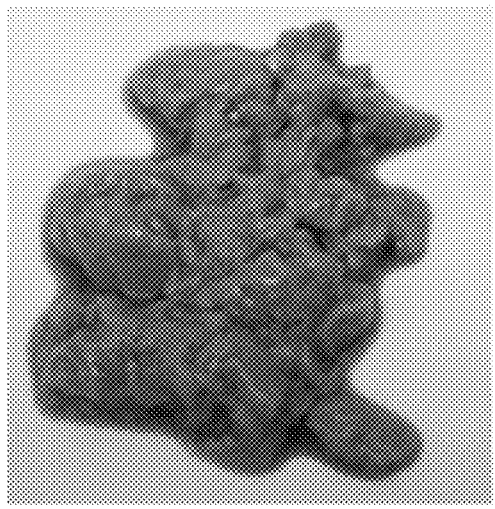
FIG. 11 depicts "White" muscle analog prepared by mixing 43 ml moong bean protein solution (150 mg/ml) with 45 ml of 11.7 mg/ml solution of leghemoglobin and 0.8% (wt/v) of transglutaminase solution. Final protein concentrations were 63 mg/ml for moong bean protein, 5.2 mg/ml of leghemoglobin, 68 mg/ml total protein.

"White" muscle analog (FIG. 11) was prepared by mixing 43 ml moong bean protein solution (150 mg/ml) with 45 ml of 11.7 mg/ml solution of leghemoglobin and 0.8% (wt/v) of transglutaminase solution. Final protein concentrations were 63 mg/ml for moong bean protein, 5.2 mg/ml of leghemoglobin, 68 mg/ml total protein.

The "dark" muscle tissue analog formed an opaque gel of dark chocolate color, smooth uniform texture, with glistening surface, and a small amount (<1 ml) of dark red, venous blood colored liquid on top. The gel was freely standing, elastic but fragile, similar in appearance to thin Jell-O. The gel has a medium aroma with notes of beans and blood clearly discernible. The flavor is dominated by notes of beans and iron/blood, with weaker grassy and medicinal/chemical flavors. The taste is salty, with a long aftertaste of blood.

The "white" muscle tissue analog was very similar, but with much lighter, cappuccino-like, color. It was also more fragile, 2-3-fold less strong against compression.

Fat Tissue Analog

Fat tissue analog using moong bean 8S globulin fraction was prepared as follows: 15 ml of moong bean protein solution (150 mg/ml in dialysis buffer) were mixed with 15 ml of rice bran oil. 6 ml of transglutaminase solution (20% w/w) were added, solutions thoroughly emulsified using a homogenizer (VWR) at speed #2. Emulsion was aliquoted into 1.6 eppendorf tubes and incubated overnight at room temperature. After that, tubes were heated at 95° C. for 5 min in a heat block, and allowed to cool down to room temperature on a bench. Final concentrations were 75 mg/ml for moong bean protein, 50% w/w oil.

Fat tissue analog using pea globulin (100 mg/ml) was prepared by the same method. Additionally, fat tissue analog was prepared from pea globulin, and either rice bran or canola oil, in bulk by the same method, but without aliquoting emulsions into eppendorf tubes. Instead, emulsions in 50 ml Falcon tubes were rotated overnight on a nutator, and were subsequently incubated at 90° C. for 30 min.

Figure 12:
FIG. 12 depicts a fat tissue analog based on moong beans and prepared in eppendorf tubes formed an opaque gel of off-white color, smooth uniform texture, with no visible discernible liquid that was not incorporated into the gel. The gel was freely standing, elastic and springy. The gel has a slight, pleasant aroma and a mild and pleasant flavor. The taste is mildly salty.

Fat tissue analog based on moong beans (FIG. 12) and prepared in eppendorf tubes formed an opaque gel of off-white color, smooth uniform texture, with no visible discernible liquid that was not incorporated into the gel. The gel was freely standing, elastic and springy. The gel has a slight, pleasant aroma and a mild and pleasant flavor. The taste is mildly salty.

Figure 13:
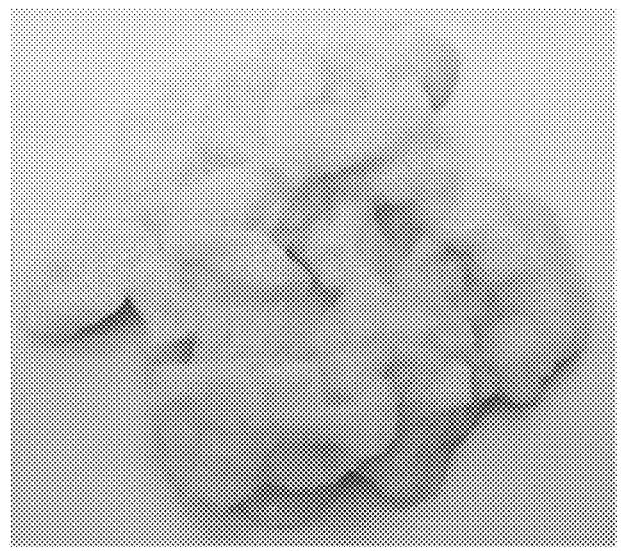
FIG. 13 depicts at tissue analog based on pea globulin and prepared in eppendorf tubes very similar to moong bean-based fat analog, except that it gave up a little of oil upon compression.

Fat tissue analog based on pea globulin (FIG. 13) and prepared in eppendorf tubes was very similar to moong bean-based fat analog, except that it gave up a little of oil upon compression. Fat tissue analog prepared in 50 ml Falcon tubes were similar in appearance, texture and aromas, but substantially softer (2-fold softer for canola oil, and 3-fold softer for rice bran oil, according to compressibility measurements).

Connective Tissue Analog

Figure 14:
FIG. 14 shows connective-tissue analog strands that were created using a 1:3 ratio in 70% ethanol, loaded into a syringe with a 23 gauge needle (ID 0.337 mm). The solution was slowly extruded from the bottom of a 5 inch-high vessel into an excess of 5 M NaCl solution. The ethanol-zein solution being less dense than the NaCl solution, floated upward, drawing out a fibrous stand of solidifying zein. The NaCl was constantly stirred as the strands began to develop to assist in the strand lengthening. The strands bunch together and become a hard, dense mass.

Connective tissue analog prototypes were developed using zein protein sourced from 100% yellow corn gluten meal, or from commercial sources, such as Amazein (Prairie Gold, Bloomington, Ill.). Zein proteins were solubilized in 70-90% ethanol with desired ratios at 1:3 to 1:5 (solids: solution). By precipitating zein proteins, for example by a change in pH, in a controlled manner, large zein structures result with physicochemical properties that can be manipulated as desired. For example, FIG. 14 shows connective-tissue analog strands that were created using a 1:3 ratio in 70% ethanol, loaded into a syringe with a 23 gauge needle (ID 0.337 mm). The solution was slowly extruded from the bottom of a 5 inch-high vessel into an excess of 5 M NaCl solution. The ethanol-zein solution being less dense than the NaCl solution, floated upward, drawing out a fibrous stand of solidifying zein. The NaCl was constantly stirred as the strands began to develop to assist in the strand lengthening. The strands bunch together and become a hard, dense mass.

Ground beef replica prototypes made from gels of plant proteins and plant oils.

Figure 15:
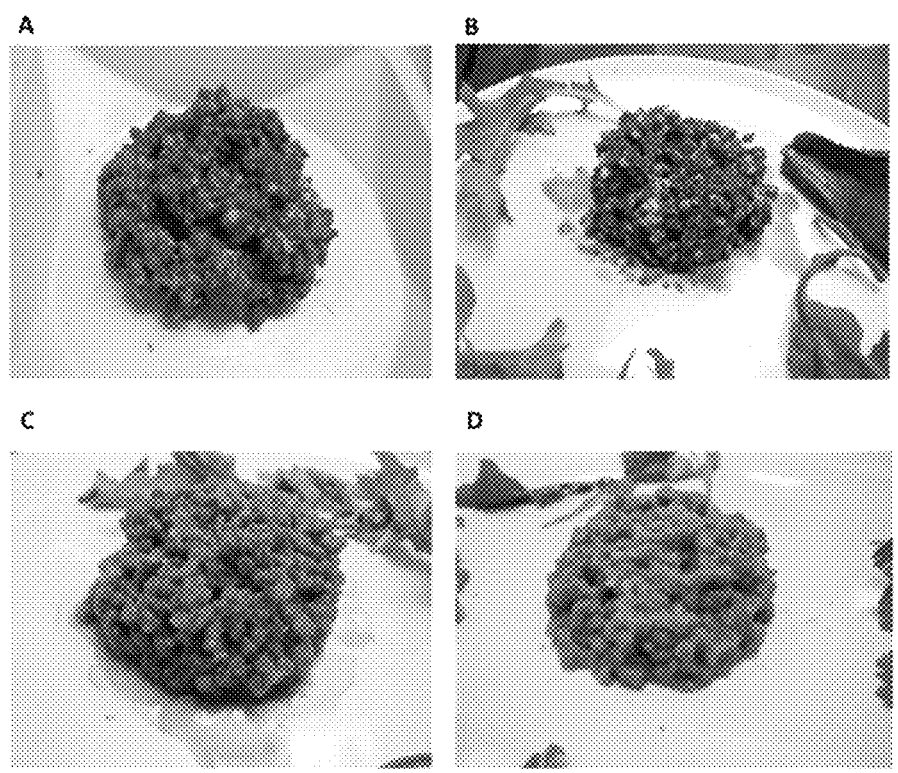
FIG. 15 depicts a ground beef prototype patty was made by combining 62% (wt/wt) muscle analog (62% (wt/wt) "dark muscle analog" and 38% (wt/wt) "white muscle analog"), 29% (wt/wt) fat tissue analog (from pea globulin and canola oil), 5% (wt/wt) connective tissue analog (FIG. 15 panel A). A ground beef prototype patty was made by combining 62% muscle analog (62% "dark muscle analog" and 38% "white muscle analog), 29% fat tissue analog (from moong bean seed 8S protein and rice bran oil), 5% connective tissue analog (FIG. 15 panel B). A ground beef prototype patty was made by combining 71% (wt/wt) muscle tissue analog (composed of 60% "white" muscle analog, 40% "dark" muscle analog), 23% fat tissue (from pea seed globulin proteins and canola oil) (FIG. 15 panel C). A ground beef prototype patty was made by combining 67% "White" muscle analog, with 28% fat tissue analog (from pea globulins and rice bran oil), (FIG. 15, panel D)

A ground beef prototype patty was made by combining 62% (wt/wt) muscle analog (62% (wt/wt) "dark muscle analog" and 38% (wt/wt) "white muscle analog"), 29% (wt/wt) fat tissue analog (from pea globulin and canola oil), 5% (wt/wt) connective tissue analog (FIG. 15 panel A). A ground beef prototype patty was made by combining 62% muscle analog (62% "dark muscle analog" and 38% "white muscle analog), 29% fat tissue analog (from moong bean seed 8S protein and rice bran oil) , 5% connective tissue analog (FIG. 15 panel B). A ground beef prototype patty was made by combining 71% (wt/wt) muscle tissue analog (composed of 60% "white" muscle analog, 40% "dark" muscle analog) , 23% fat tissue (from pea seed globulin proteins and canola oil) (FIG. 15 panel C). A ground beef prototype patty was made by combining 67% "White" muscle analog, with 28% fat tissue analog (from pea globulins and rice bran oil), (FIG. 15, panel D)

Figure 16:
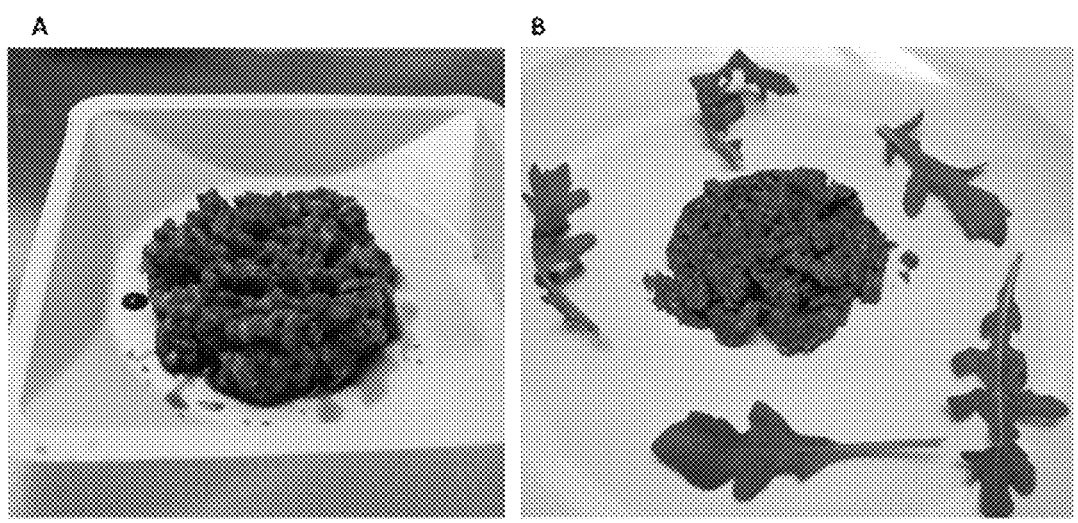
FIG. 16 depicts a ground beef patty analog was made by combining 62% (wt/wt) muscle tissue analog (62% (wt/wt) "dark muscle analog" and 38% (wt/wt) "muscle analog"), 29% (wt/wt) fat tissue analog (from pea globulin and canola oil), 5% (wt/wt) connective tissue analog. The panel on the left (Panel A) shows the patty before cooking and the panel on the right (Panel B) shows the same patty after cooking for about 2 minutes. Observers described the aroma of the cooking ground beef replica as distinctly "beefy".

In a further test, the effect of cooking the ground beef replica patties was evaluated by grilling on a 350° F. pan. A ground beef patty analog was made by combining 62% (wt/wt) muscle tissue analog (62% (wt/wt) "dark muscle analog" and 38% (wt/wt) "muscle analog"), 29% (wt/wt) fat tissue analog (from pea globulin and canola oil), 5% (wt/wt) connective tissue analog (FIG. 16). The panel on the left shows the patty before cooking and the panel on the right shows the same patty after cooking for about 2 minutes. Observers described the aroma of the cooking ground beef replica as distinctly "beefy".

What is claimed is:

1. A beef replica product, comprising:
   a) a muscle replica comprising 0.1%-5% of a heme-containing protein, at least one sugar compound and at least one sulfur compound; and
   b) a fat tissue replica comprising at least one plant oil and a denatured plant protein,
      wherein said muscle replica and fat tissue replica are assembled in a manner that approximates the physical organization of meat.

2. The beef replica product of claim 1, further comprising a connective tissue replica.

3. The beef replica product of claim 1, wherein the denatured plant protein comprises one or more isolated non-heme-containing proteins.

4. The beef replica product of claim 3, wherein each of said one or more isolated non-heme-containing proteins is derived from a different plant species.

5. The beef replica product of claim 3, wherein said one or more isolated non-heme-containing proteins is selected from the group consisting of: ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, glyceraldehyde-3-phosphate dehydrogenases, pyruvate decarboxylases, translation elongation factors, ribulose-1,5-bisphosphate carboxylase oxygenase (Rubisco), ribulose-1,5- bisphosphate carboxylase oxygenase activase (Rubisco activase), albumins, glycinins, conglycinins, globulins, vicilins, conalbumin, gliadin, glutelin, gluten, glutenin, hordein, prolamin, phaseolin protein, proteinoplast, secalin, extensins, triticeae gluten, zein, a seed storage protein, oleosins, caloleosins, steroleosins or other oil body proteins, vegetative storage protein A, vegetative storage protein B, and moong seed storage 8S globulin.

6. The beef replica product of claim 1, wherein said beef replica product does not contain one or more of methylcellulose, carrageenan, caramel color, konjac flour, gum arabic, and acacia gum.

7. The beef replica product of claim 1, wherein said beef replica product contains less than 1% wheat gluten.

8. The beef replica product of claim 1, wherein said beef replica product contains no wheat gluten.

9. The beef replica product of claim 1, wherein said beef product does not contain one or more of soy protein isolate, soy protein concentrate, or tofu.

10. The beef replica product of claim 1, wherein said beef product contains less than 5% carbohydrates.

11. The beef replica product of claim 1, wherein said beef replica product is characterized by one or more of the following: contains no tofu, contains no soy protein, contains less than 1% cellulose, contains less than 5% insoluble carbohydrates, or contains no wheat gluten.

12. The beef replica product of claim 1, wherein said beef replica product contains no animal products and less than 5% carbohydrates.

13. The beef replica product of claim 1, wherein said beef replica product contains no wheat gluten and less than 5% insoluble carbohydrates.

14. The beef replica product of claim 3, comprising:
   a) 60-90% water;
   b) 5-30% protein content;
   c) 1-20% of a fat; wherein said one or more isolated non-heme-containing protein comprises one or more isolated plant proteins.

15. The beef replica product of claim 1, wherein said plant protein is an oil body protein.

16. The beef replica product of claim 2, wherein (i) said muscle replica accounts for 40-90% of said product by weight, (ii) said fat tissue replica accounts for 1-60% of said product by weight.

17. The beef replica product of claim 2, wherein the connective tissue replica comprises a precipitated plant protein.

\* \* \* \* \*

UNITED STATES PATENT AND TRADEMARK OFFICE
CERTIFICATE OF CORRECTION

PATENT NO. : 10,863,761 B2  
APPLICATION NO. : 15/985697  
DATED : December 15, 2020  
INVENTOR(S) : Patrick O'Reilly Brown et al.

It is certified that error appears in the above-identified patent and that said Letters Patent is hereby corrected as shown below:

On the Title Page

Column 1 Item (63), and continued on Page 2 delete:
"Continuation of application No. 13/941,211, filed on Jul. 12, 2013, now abandoned, which is a continuation-in-part of application No. PCT/US2012/046560, filed on. Jul. 12, 2012."

And insert:
-- Continuation of application No. 13/941,211, filed on Jul. 12, 2013, now abandoned, which is a continuation-in-part of application No. PCT/US2012/046560, filed on. Jul. 12, 2012, which claims the benefit of U.S. Application 61/572,205, filed Jul. 12, 2011. --

On Page 2 Column 1 Item (60), delete:
"Provisional application No. 61/671,069, filed on Jul. 12, 2012, provisional application No. 61/572,205, filed on Jul. 12, 2011."

And insert:
-- Provisional application No. 61/671,069, filed on Jul. 12, 2012. --

In the Specification

In Column 1, Lines 6-13 CROSS REFERENCE, delete:
"This application is a continuation of U.S. application Ser. No. 13/941,211 filed on Jul. 12, 2013, which is a continuation-in-part of International Application No. PCT/US2012/046560, filed Jul. 12, 2012, which claims the benefit of priority of U.S. Provisional Application 61/572,205, filed Jul. 12, 2011 and U.S. Provisional Application 61/671,069, filed Jul. 12, 2012, all of which are incorporated herein by reference."

And insert:
-- This application is a continuation of U.S. Application No. 13/941,211 filed on Jul. 12, 2013, which claims the benefit of U.S. Application No. 61/671,069, filed Jul. 12, 2012, and is a continuation-in- Signed and Sealed this  
First Day of April, 2025

Coke Morgan Stewart  
*Acting Director of the United States Patent and Trademark Office* part of International Application No. PCT/US2012/ 046560, filed Jul. 12, 2012, which claims the benefit of U.S. Application 61/572,205, filed Jul. 12, 2011, all of which are incorporated herein by reference. --

SEQUENCE LISTING

```
<160> NUMBER OF SEQ ID NOS: 3

<210> SEQ ID NO 1
<211> LENGTH: 144
<212> TYPE: PRT
<213> ORGANISM: Glycine max

<400> SEQUENCE: 1

Met Val Ala Phe Thr Glu Lys Gln Asp Ala Leu Val Ser Ser Ser Phe
1               5                   10                  15

Glu Ala Phe Lys Ala Asn Ile Pro Gln Tyr Ser Val Val Phe Tyr Thr
            20                  25                  30
```

-continued

Ser Ile Leu Glu Lys Ala Pro Ala Lys Asp Leu Phe Ser Phe Leu
            35                  40                  45

Ala Asn Gly Val Asp Pro Thr Asn Pro Lys Leu Thr Gly His Ala Glu
 50                  55                  60

Lys Leu Phe Ala Leu Val Arg Asp Ser Ala Gly Gln Leu Lys Ala Ser
 65                  70                  75                  80

Gly Thr Val Val Ala Asp Ala Leu Gly Ser Val His Ala Gln Lys
                85                  90                  95

Ala Val Thr Asp Pro Gln Phe Val Val Lys Glu Ala Leu Leu Lys
            100                 105                 110

Thr Ile Lys Ala Val Gly Asp Lys Trp Ser Asp Glu Leu Ser Arg
            115                 120                 125

Ala Trp Glu Val Ala Tyr Asp Glu Leu Ala Ala Ile Lys Lys Ala
            130                 135                 140

<210> SEQ ID NO 2
<211> LENGTH: 133
<212> TYPE: PRT
<213> ORGANISM: Methylacidiphilum infernorum

<400> SEQUENCE: 2

Met Ile Asp Gln Lys Glu Lys Glu Leu Ile Lys Glu Ser Trp Lys Arg
 1               5                  10                  15

Ile Glu Pro Asn Lys Asn Glu Ile Gly Leu Leu Phe Tyr Ala Asn Leu
            20                  25                  30

Phe Lys Glu Glu Pro Thr Val Ser Val Leu Phe Gln Asn Pro Ile Ser
            35                  40                  45

Ser Gln Ser Arg Lys Leu Met Gln Val Leu Gly Ile Leu Val Gln Gly
 50                  55                  60

Ile Asp Asn Leu Glu Gly Leu Ile Pro Thr Leu Gln Asp Leu Gly Arg
 65                  70                  75                  80

Arg His Lys Gln Tyr Gly Val Val Asp Ser His Tyr Pro Leu Val Gly
                85                  90                  95

Asp Cys Leu Leu Lys Ser Ile Gln Glu Tyr Leu Gly Gln Gly Phe Thr
            100                 105                 110

Glu Glu Ala Lys Ala Ala Trp Thr Lys Val Tyr Gly Ile Ala Ala Gln
            115                 120                 125

Val Met Thr Ala Glu
            130

<210> SEQ ID NO 3
<211> LENGTH: 121
<212> TYPE: PRT
<213> ORGANISM: Tetrahymena thermophile

<400> SEQUENCE: 3

Met Arg Lys Gln Pro Thr Val Phe Glu Lys Leu Gly Gly Gln Ala Ala
 1               5                  10                  15

Met His Ala Ala Val Pro Leu Phe Tyr Lys Val Leu Ala Asp Asp
            20                  25                  30

Arg Val Lys His Tyr Phe Lys Asn Thr Asn Met Glu Gln Ala Lys
            35                  40                  45

Gln Gln Glu Asp Phe Leu Thr Met Leu Leu Gly Gly Pro Asn His Tyr
 50                  55                  60

Lys Gly Lys Asn Met Ala Glu Ala His Lys Gly Met Asn Leu Gln Asn
 65                  70                  75                  80

```
                                 -continued

Ser His Phe Asp Ala Ile Ile Glu Asn Leu Ala Ala Thr Leu Lys Glu
                85              90                  95

Leu Gly Val Ser Asp Gln Ile Ile Gly Glu Ala Ala Lys Val Ile Glu
            100             105                 110

His Thr Arg Lys Asp Cys Leu Gly Lys
        115             120
```